United States Patent [19]
Sato et al.

[11] Patent Number: 5,382,997
[45] Date of Patent: Jan. 17, 1995

[54] EXPOSURE CONTROL APPARATUS OF CAMERA

[75] Inventors: Osamu Sato; Satoshi Nakano; Isamu Hirai; Toshiyuki Kitazawa; Takayuki Sensui; Masato Yamamoto; Toshimasa Yamanaka; Takenao Shishikura; Akio Takahashi; Nobuhiko Matsudo, all of Tokyo, Japan

[73] Assignee: Asahi Kogaku Kogyo Kabushiki Kaisha, Tokyo, Japan

[21] Appl. No.: 133,269

[22] Filed: Oct. 7, 1993

Related U.S. Application Data

[63] Continuation of Ser. No. 868,433, Apr. 15, 1992, abandoned.

[30] Foreign Application Priority Data

Apr. 15, 1991 [JP] Japan ................................. 3-173495
May 21, 1991 [JP] Japan ................................. 3-214834
Nov. 28, 1991 [JP] Japan ................................. 3-361198

[51] Int. Cl.$^6$ ............................................. G03B 7/08
[52] U.S. Cl. .................................... 354/441; 354/443
[58] Field of Search ............................... 354/441, 443

[56] References Cited

U.S. PATENT DOCUMENTS

| 4,103,307 | 7/1978 | Shinoda et al. |
| 4,204,755 | 5/1980 | Toyoda et al. ........................ 354/443 |
| 4,329,034 | 5/1982 | Murakami et al. |
| 4,358,188 | 11/1982 | Uchidoi et al. |
| 4,653,893 | 3/1987 | Inoue et al. ........................... 354/443 |
| 4,792,823 | 12/1988 | Fujino et al. |
| 4,841,322 | 6/1989 | Kawasaki et al. |
| 4,945,376 | 7/1990 | Kawasaki et al. |
| 5,012,268 | 4/1991 | Hirai . |

FOREIGN PATENT DOCUMENTS

| 3505306 | 9/1985 | Germany . |
| 3708134 | 9/1987 | Germany . |
| 60-242436 | 12/1985 | Japan . |
| 60-242437 | 12/1985 | Japan . |
| 60-242438 | 12/1985 | Japan . |
| 60-242439 | 12/1985 | Japan . |
| 60-258523 | 12/1985 | Japan . |
| 61-99130 | 6/1986 | Japan . |
| 62-168123 | 7/1987 | Japan . |
| 62-212635 | 9/1987 | Japan . |
| 925517 | 5/1963 | United Kingdom . |
| 1552597 | 9/1979 | United Kingdom . |

OTHER PUBLICATIONS

Nikon FA, Firm Brochure.
English Translation of German Office Action of Mar. 10, 1994.
United Kingdom Search Report.
English Abstract of Japanese Unexamined Patent Publication SHO 60-242436.
English Abstract of Japanese Unexamined Patent Publication SHO 60-242437.
English Abstract of Japanese Unexamined Patent Publication SHO 60-242438.
English Abstract of Japanese Unexamined Patent Publication SHO 60-242439.
English Abstract of Japanese Unexamined Patent Publication SHO 60-258523.
English Abstract of Japanese Unexamined Patent Publication SHO 62-168123.
English Language Translation of the Claims and Description of the Drawings of Japanese Unexamined Patent Publication SHO 61-99130.
French Search Report dated 20 Aug. 1993.
Examiner's First Report issued by Australian Patent Office on 9 Nov. 1993.
United Kingdom Search Report.

Primary Examiner—Russell E. Adams
Attorney, Agent, or Firm—Sandler Greenblum & Bernstein

[57] ABSTRACT

An exposure control apparatus of a camera, wherein a pair of exposure factors that include a shutter speed and a diaphragm value can be manually and independently set. Furthermore, in the exposure control apparatus, an exposure value determined in accordance with the exposure factors can be locked, and one of the exposure factors can be varied, based on the locked exposure value, when the other exposure factor is varied by the associated manual setting means.

20 Claims, 58 Drawing Sheets

*Fig. 36*

| AM | Hyp-Tv | Hyp-Av | Lens "A" mode | | | Lens "M" mode | | |

LCD display panel  
Indicator unit display within finder display when the switch is off program standby ES standby EE standby Manual standby Program Hyper- program (Initial state)

EE

Hyper Tv

Hyper Av

Fig. 43A
Hyper manual        (a) Optimum    (b) Over    (c) Under
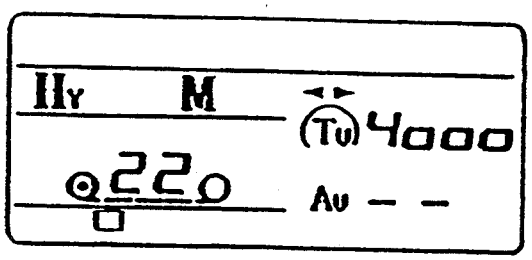 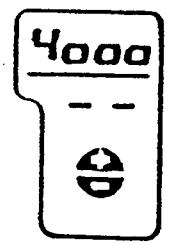  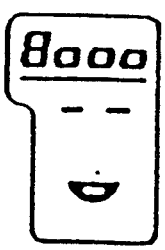
Fig. 43B
ES
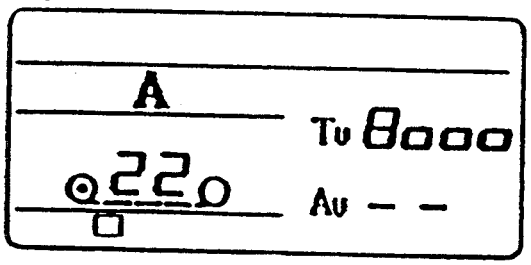 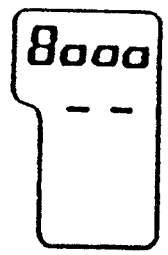
Fig. 43C
Bulb
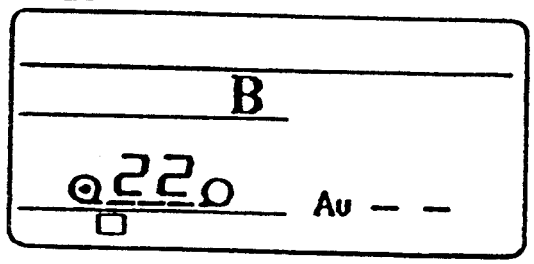 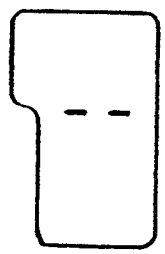

EXPOSURE CONTROL APPARATUS OF CAMERA

This application is a continuation of application Ser. No. 07/868,433, filed Apr. 15, 1992, now abandoned.

BACKGROUND OF THE INVENTION

1. Field of the Invention

The present invention relates to an exposure control apparatus of a camera having a plurality of exposure modes.

2. Description of Related Art

In a conventional camera having a plurality of exposure modes, a photographer can select a desired exposure mode by actuating an associated switch or button, etc.

In a recent camera having modes other than the exposure modes, such as a continuous shot mode, etc., the mode selection is effected by actuating a plurality of switches in combination.

However, ordinary photographers do not frequently use all of the exposure modes. Namely, only a few specific exposure modes are used. Therefore, for ordinary photographers, the need to actuate several switches in combination to select a mode is troublesome and complicated.

Furthermore, in a program exposure mode of a known camera, a shutter speed and a diaphragm value are automatically determined in a certain relationship (combination). Accordingly, it is impossible for the photographer to set optional shutter speed and diaphragm values which do not satisfy the predetermined relationship while in the same mode. For example, when an operation switch is actuated in a program exposure mode of a known camera, both the shutter speed and the diaphragm value are modified simultaneously while maintaining a specific relationship therebetween, and accordingly, it is impossible to vary only the shutter speed or diaphragm value. Consequently, if the photographer wants to vary only the shutter speed or diaphragm value while in the program exposure mode, it is necessary for the photographer to first switch the program exposure mode to a diaphragm priority automatic exposure mode or a shutter speed priority automatic exposure mode.

Furthermore, in a manual exposure mode of a known camera, the photographer manually sets the optimum shutter speed and diaphragm value, while observing an exposure meter provided in a field of view of a finder. Namely, since the photographer manually sets both the optimum shutter speed and diaphragm value by himself of herself, it is possible for him or her to create more artistic or technical pictures.

However, the adjustment of both the shutter speed and diaphragm value is troublesome, especially for the ordinary photographer. In particular, if one of either the shutter speed or diaphragm value is readjusted after the shutter speed and the diaphragm value are adjusted to obtain an optimum exposure value, the other of either the diaphragm value or shutter speed must also be readjusted to maintain the optimum exposure value, which changes as a result of the readjustment.

SUMMARY OF THE INVENTION

The primary object of the present invention is to eliminate the above-mentioned drawbacks of a known exposure control system having a plurality of exposure modes by providing a simple exposure control apparatus in which, one of the exposure factors (diaphragm value and shutter speed) is varied in the manual exposure mode, the other exposure factor is automatically adjusted so as to obtain an optimum exposure value by a simple operation.

To achieve the object mentioned above, according to the present invention, there is provided an exposure control apparatus of a camera having a manual setting means for manually and independently setting a pair of exposure factors, including a shutter speed and a diaphragm value. The exposure control apparatus further includes an exposure value locking means for locking an exposure value determined in accordance with the exposure factors and an exposure factor varying means for varying one of the exposure factors, based on the locked exposure value, when the other exposure factor is varied by the associated manual setting means.

With the above provisions, it is possible for a photographer to vary only the shutter speed or diaphragm value without first switching the program exposure mode to, for example, a diaphragm priority automatic exposure mode or a shutter speed priority automatic exposure mode, and without breaking the predetermined relationship between the values.

The present disclosure relates to subject matter contained in Japanese patent application Nos. HEI 3-173495 (filed on Apr. 15, 1991), 03-214834 (filed on May 21, 1991), and HEI 3-361198 (filed on Nov. 28, 1991) which are expressly incorporated herein by reference in their entirety.

BRIEF DESCRIPTION OF THE DRAWINGS

The invention will be described below in detail with reference to the accompanying drawings, in which:

FIG. 36 is an example of data storage in a RAM of an IPU;

FIGS. 43A, 43B and 43C show various exposure modes in a lens manual mode, as indicated on an LCD panel and an indication unit within a finder;

DESCRIPTION OF THE PREFERRED EMBODIMENTS

The invention will be discussed below with reference to preferred embodiments of the present invention.

Figure 1:
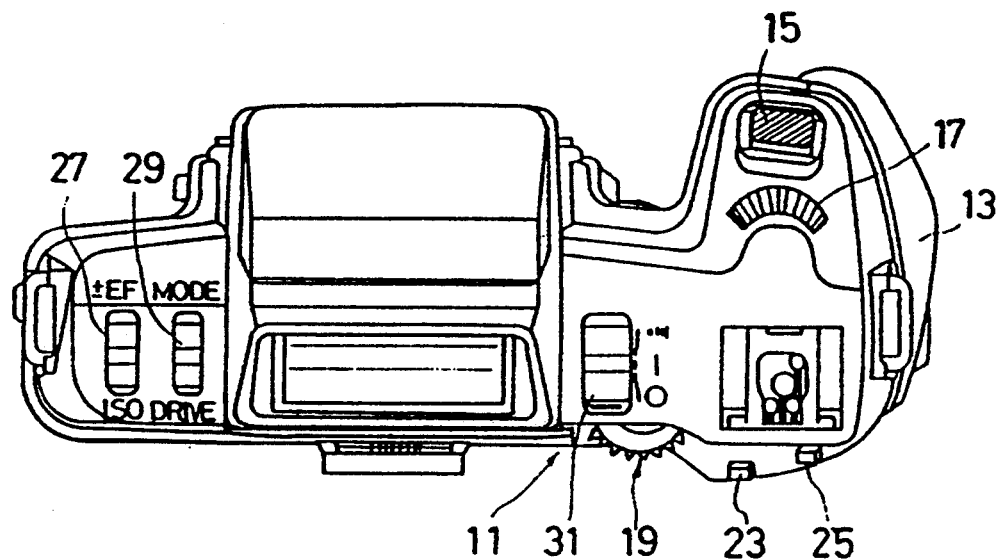
FIG. 1 is a plan view of a single lens reflex camera to which the present invention is applied.
Figure 2:
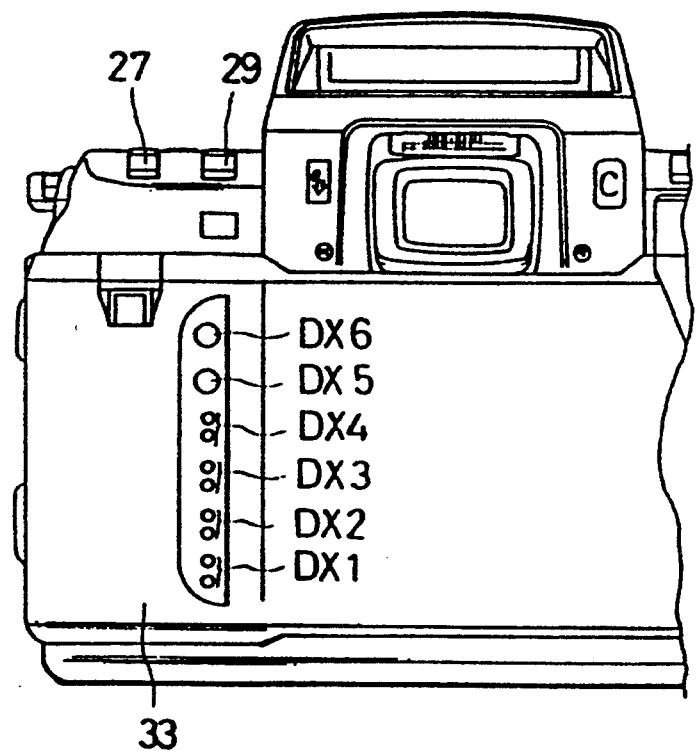
FIGS. 2 and 3 are a back view and a front elevational view of a main part of a single lens reflex camera shown in FIG. 1, respectively.
Figure 3:
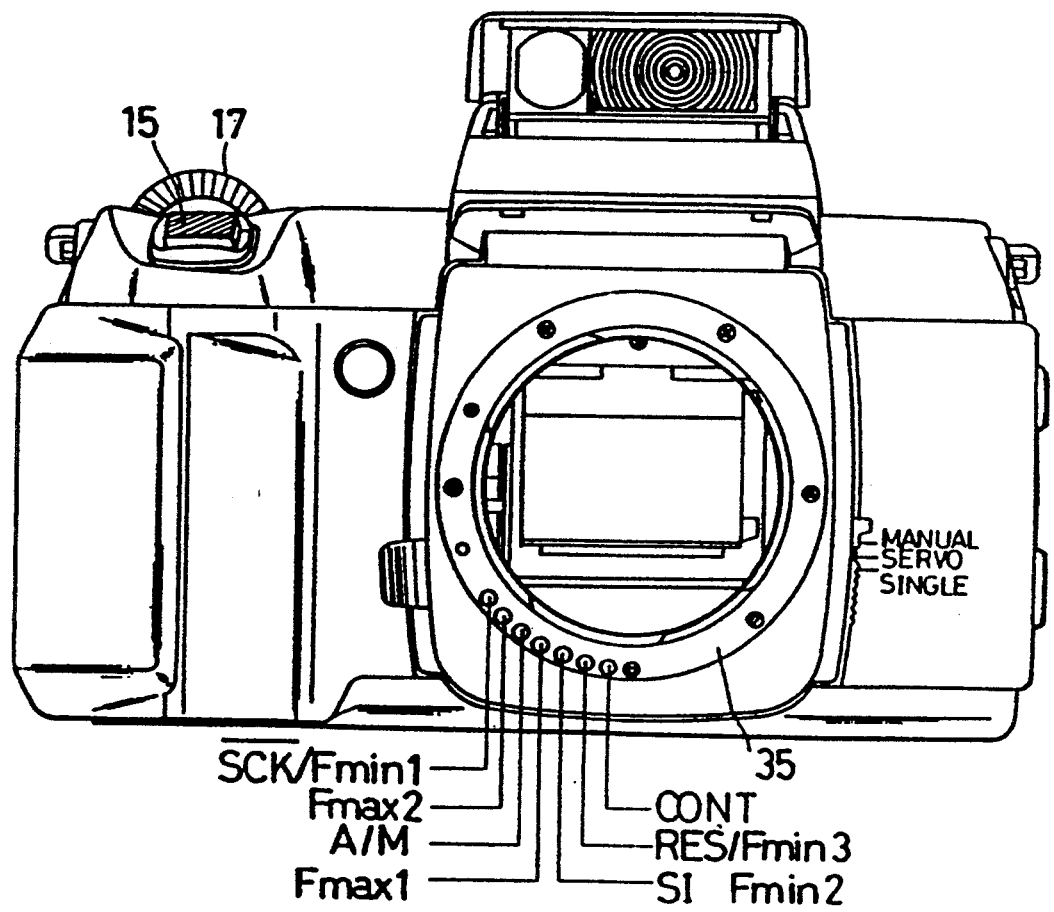

FIGS. 1 and 3 are a plan view and a front elevational view of a single lens reflex camera body having an exposure control apparatus according to the present invention, respectively. FIG. 2 is a back view of a DX code reading portion of the camera body shown in FIGS. 1 and 3.

The camera body 11 has a grip portion 13 which is provided, on a front end (i.e., the object side) of an upper surface thereof, with a shutter button 15. A Tv electronic dial 17 and an Av electronic dial 19 are provided behind the shutter button 15 and on an upper end of the back surface of the grip portion 13, respectively. Both the Tv electronic dial 17 and the Av electronic dial 19 are in the form of rotary dials, which will be discussed below in detail. When the Tv electronic dial 17 and the Av electronic dial 19 are rotated, the shutter speed Tv, the diaphragm value Av and the exposure mode can be changed. The Tv electronic dial 17 and the Av electronic dial 19 constitute part of a first and second manual setting means or a first and second shutter speed and diaphragm value manual setting means, respectively.

A clear button 23 is provided on the upper portion of the back surface of the camera body 11 in the vicinity of the Av electronic dial 19. A hold button 25 is provided on the right side of the clear button 23. The clear button 23 constitutes a part of a clear switch means.

The electronic dials 17 and 19, the clear button and the hold button 25 are arranged so that when a photographer holds the camera body 11 in a normal posture, they can be actuated by his or her thumb or forefinger without having to shift the camera body 11.

A slidable exposure correction/ISO lever 27 and a slidable exposure mode/drive lever 29, both being slidable in opposite directions from a neutral position, are located on the top surface of the camera body 11 to the left of a pentagonal prism (not numbered). A main switch 31 is located on the top surface of the camera body 11 to the right of the pentagonal prism and can be moved to three different positions in a slidable manner.

DX pins DX1~DX6 are provided in a patrone receiving chamber 33 of the camera body 11 and come into contact with DX codes, which are printed on the surface of a film patrone, to thereby read the data. In particular, the DX pins DX1~DX6 are brought into contact with the portion of the DX codes which represents an ISO sensitivity Sv, so as to read the data thereof.

A group of mount pins (CONT, RES/Fmin3, SI/Fmin2, Fmax1, A/M, Fmax2, and −SCK− /Fmin1) are provided on a body mount 35 of the camera body 11 to effect, for example, data communication between the camera body 11 and a taking lens. When the body mount 35 is attached to a lens mount of the taking lens, the mount pins of the body mount 35 are electrically connected to the corresponding mount pins of the taking lens, so that the camera body 11 can read lens data, including a minimum F number Fmin (open F number) and a maximum F number, from the taking lens and perform data communication with a control means (ROM or CPU). The control means (ROM or CPU) is provided in the taking lens to read additional lens data, such as focal length data f, or data representing the kind of taking lens attached, etc. Note that a mark or a symbol, etc., with an affix "−" and a suffix "−" (e.g., −SCK−, as mentioned above) represent an active low or an inverted value in this specification.

Figure 4:
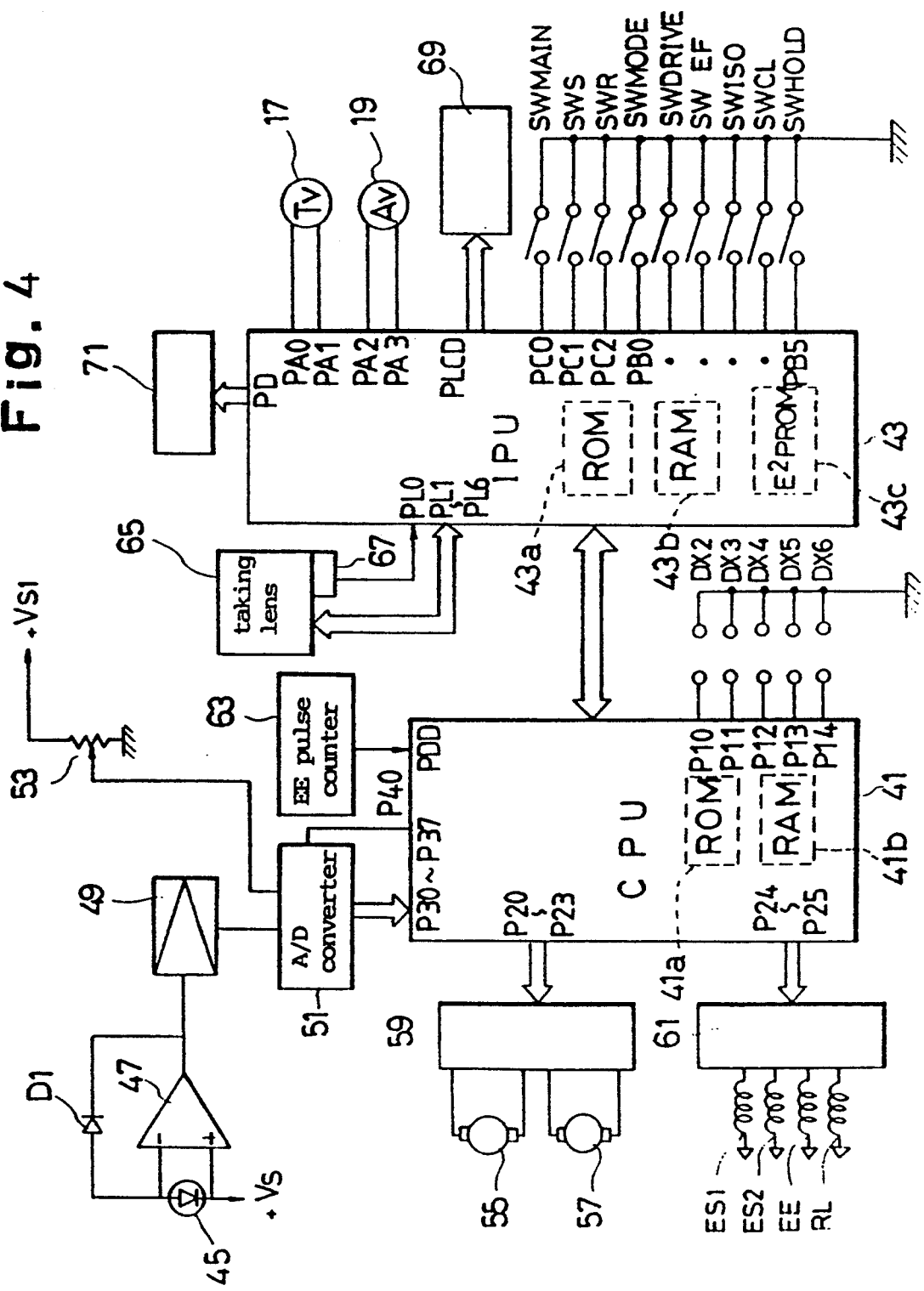
FIG. 4 is a block diagram of a circuit arrangement of the single lens reflex camera shown in FIG. 1.

FIG. 4 shows a circuit arrangement of a control unit of a camera system according to the present invention.

The camera body 11 has CPU 41 and IPU 43 as a control means. The CPU 41 performs the fundamental photographic calculations and control functions, such as the calculation and determination of the exposure factors (i.e., diaphragm value Av and shutter speed Tv), exposure control, calculation of data necessary for automatic focus control, etc. The CPU 41 also functions as a means for compulsively changing the mode, returning an exposure mode, changing a priority exposure factor, compulsively changing an exposure mode within a specific exposure mode, setting a limit value, holding an exposure value, manual shifting, and switching a set mode.

IPU 43 functions as an input interface of the switches, such as the shutter button 15, the Tv electronic dial 17, the Av electronic dial 19, etc. The IPU 43 also functions as an exposure mode setting means, a means for controlling the indicators, a regulator for turning the power source of the CPU 41 ON and OFF (power holding), and memory means for storing the set data and shutter speed Tv, etc. The IPU 43 has a ROM 43a which stores programs determining the input of the switch data, indication of the modes, communication with the CPU 41, communication with the taking lens, etc. The IPU 43 also has a RAM 43b which temporarily stores the set modes, the shutter speed Tv, and the diaphragm value, etc. The IPU 43 further has an E²PROM (EEPROM) 43c which holds the number of the film, the ISO sensitivity, etc., even after the camera power source is turned OFF.

IPU 43 communicates with the taking lens 65 and receives lens data, such as a maximum F number Fmax, the minimum F number Fmin and the focal length f, etc. The IPU 43 communicates with the CPU 41 to transmit and receive the data therebetween to control the photographic operation and the indication of the data.

The output of a light receiving element 45 is logarithmically compressed by an operational amplifier 47 and a diode D1, amplified by an amplifier 49, converted to a digital value (Bv, BV) corresponding to an apex value by an A/D converter 51, and inputted to the CPU 41 through input ports P30∼P37.

A/D converter 51 operates at a predetermined time to input the level signals of the ports P30∼P37 to the CPU 41, which reads object brightness signals and diaphragm value signals set by the taking lens 65 and converts the signals to corresponding apex values. Port P40 is an input switching control port which switches the logarithmically compressed voltages amplified by the amplifier 49 and the diaphragm voltages set by diaphragm volume 53. Diaphragm volume 53 generates a diaphragm voltage which corresponds to the value set by the photographer when rotating the diaphragm ring of a taking lens (not shown) in the manual mode.

Ports P10–P14 of the CPU 41 are connected to DX pins DX2∼DX6. The CPU 41 checks the levels of ports P10–P14 at a predetermined time to read the ISO sensitivity Sv. The CPU 41 then stores the input data, including the diaphragm value Av, the object brightness by and the ISO sensitivity Sv, etc., in RAM 41b at predetermined addresses.

A winding motor 55 winds and rewinds the film, and a mirror motor 57 moves a mirror up and down. The operations of the motors 55 and 57 are controlled by the CPU 41 through a motor drive circuit 59.

A release magnet RL releases the mechanical engagement of the shutter to begin a release operation. A shutter mechanism (shutter curtain) thus released from the mechanical engagement by the release magnet RL is disengageably engaged by a leading curtain magnet ES1 and a trailing curtain magnet ES2, so that the movement of the shutter curtain is controlled thereby. A diaphragm magnet EE stops the stop-down operation of the the taking lens diaphragm. The operations of these magnets are controlled by the CPU 41 through a magnet drive circuit 61.

An EE pulse counter 63 generates EE pulses in association with the stop-down operation, which is in turn associated with the up-down movement of the mirror, subsequent to the shutter release and sends the outputs thereof to port PDD of the CPU 41. CPU 41 counts the level change of port PDD and, when the counted number reaches a value corresponding to the set diaphragm value Av, the diaphragm magnet EE is turned ON through the magnet drive circuit 61 to stop the stop-down operation, thereby maintaining the diaphragm value Av.

Ports PL0∼PL6 of the CPU 43 are connected to the mount pins (A/M, CONT, RES/Fmin3, SI/Fmin2, Fmax1, Fmax2, −SCK−/Fmin1)m thereby completing an electrical connection to the taking lens 65 (i.e., memory or control means thereof). IPU 43 communicates with the taking lens 65 through ports PL0–PL6 to read the lens data, including the open F number Fmin, the maximum F number Fmax, the focal length f, etc.

Taking lens 65 has a lens auto/manual selection switch 67 which switches between a manual diaphragm mode (lens-manual mode) and an automatic diaphragm mode (lens-auto mode) in association with a diaphragm ring 12. The lens auto/manual selection switch 67 is connected to an input port PL0 of IPU 43 through the mount pin A/M. IPU 43 determines the existence of the manual diaphragm mode or the automatic diaphragm mode in accordance with the level of the port PL0. The "lens-auto mode" mentioned above is an automatic diaphragm mode in which the stop-down mechanism of the camera continues the stop-down operation until the diaphragm value becomes a predetermined value which has been set in the camera body. The "lens manual mode" mentioned above is a manual diaphragm mode in which the diaphragm value is manually set on the taking lens side. The lens-auto mode will also be referred to as a "body set" hereinafter.

Input ports PC0–PC2 and PB0–PB5 of the IPU 43 are connected to a main switch SWMAIN, a photometer switch a release switch SWR, an exposure mode switch SWMODE, a drive switch SWDRIVE, an exposure correcting switch SW±EF, an ISO sensitivity setting switch SWISO, a clear switch SWCL and a hold switch SWHOLD, respectively.

The main switch SWMAIN is associated with a main switch lever 31. The photometer switch SWS and the release switch SWR are associated with the shutter button 15. The switch SWS remains open until the shutter button 15 is depressed half-step, at which point it is turned ON. The switch SWR is fully turned ON when the shutter button 15 is depressed. The exposure mode switch SWMODE and the drive switch SWDRIVE are associated with the exposure mode/drive lever 29. The exposure correcting switch SW±EF and the ISO sensitivity setting switch SWISO are associated with the exposure/ISO lever 27. The clear switch SWCL and the hold switch SWHOLD remain open until their respective associated buttons, clear button 23 and hold button 25, are effected.

IPU 43 detects the ON/OFF state of the switches, mentioned above, in accordance with the input levels of the input ports PC and PB of the IPU 43 to perform the necessary operations.

A pair of input ports PA0 and PA1 and another pair of input ports PA2 and PA3 of IPU 43 are connected to the TV electronic dial 17 and the Av electronic dial 19, respectively. The TV electronic dial 17 and the Av electronic dial 19 each has a click-stop rotation mechanism which is per se known. For example, a pair of input ports PA0 and PA1 are in a floating state at a click-stop position, when the electronic dials 17 and 19 are rotated in a clockwise or counterclockwise direction, the level of one of the input ports first drops to "L" and then the level of the other drops to level "L", in accordance with the direction of the rotation of the dials. Thereafter, the one input port, the level of which has dropped to level "L" prior to the other, is returned to the floating state prior to the other. Since the order of change in the level of the input ports PA0 and PA1 or PA2 and PA3 depends on the rotation of the dials, the IPU 43 can discriminate the direction of rotation based on the order of change.

A group of ports PLCD of IPU 43 are connected to an LCD display panel 69 and an indicator 71. The indicator 71 is located in the finder. The LCD panel 69 is controlled by IPU 43 to indicate various photographic information, such as the exposure mode, the shutter speed Tv, the diaphragm value Av, the number of remaining frames in a roll of film, the drive mode and other data (i.e.. ISO sensitivity data, and exposure correcting data±EF, etc.). The indicator 71 (shown in FIG. 41A) within the finder has indicating elements 71a and 71b which indicate the shutter speed Tv, the diaphragm value Av, and an under-exposure, over-exposure or optimum exposure of the film. The indicator 71 also has an indicating element 71c which indicates whether or not the memory is locked.

The main circuit structure of the camera system according to the present invention, will now be discussed. Note that the values of the shutter speed Tv, the diaphragm value Av, and the object brightness Bv in the arithmetic operation discussed below are all those used in calculating the APEX values.

MAIN OPERATION OF CPU

The main operation of the CPU 41 will be discussed below with reference to the flow chart shown in FIG. 5. The main operation is carried out in accordance with a program stored in ROM 41a of the CPU 41.

Figure 5:
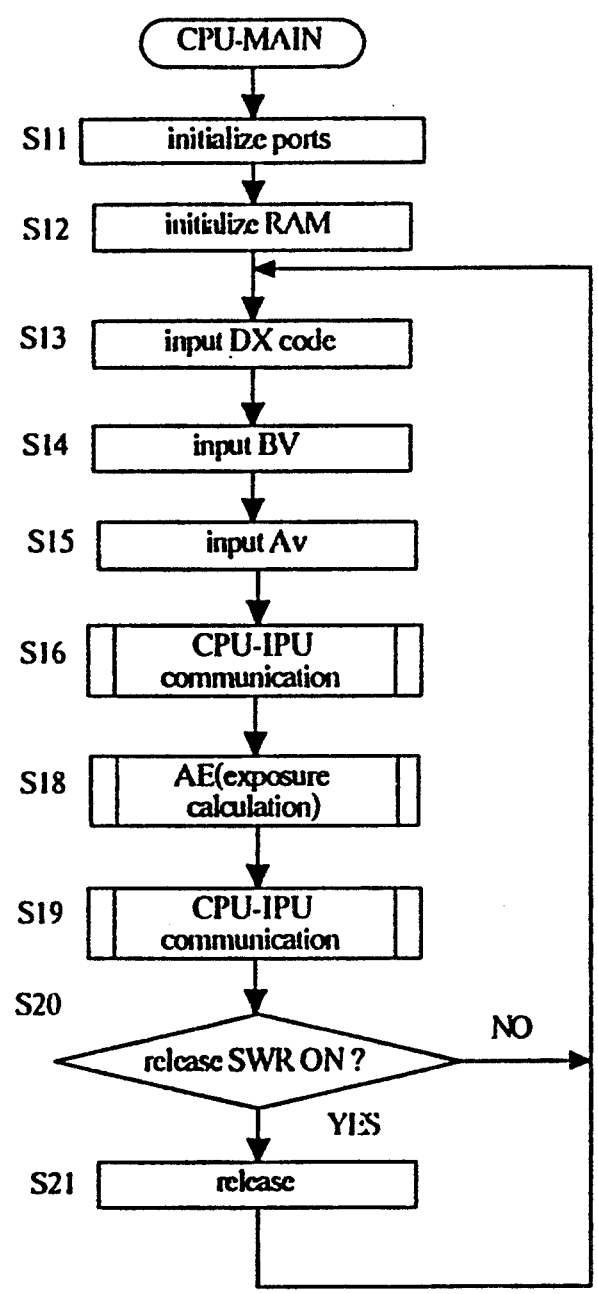
FIG. 5 is a flow chart of a main operation of a CPU, according to the present invention.

When the photometer switch SWS is turned ON after the main switch SWMAIN is turned ON, electrical power is supplied to the CPU 41 and the operation shown in the flow chart of FIG. 5 is performed.

The CPU 41 first initializes all the input ports P at step S11, and then initializes RAM 41b at step S12. Thereafter, the DX code (ISO sensitivity SV), object brightness Bv, and diaphragm value Av set by the diaphragm volume 53 when in the LM mode, are inputted to the CPU (steps S13, S14 and S15).

Thereafter, CPU 41 communicates with IPU 43 to receive the necessary data, such as the set photographic exposure mode and the exposure factors, etc., from the IPU 43 (step S16).

Control proceeds to step S18, in which the exposure calculation is effected to obtain optimum exposure factors in accordance with the selected photographic exposure mode, the calculation being based on the ISO sensitivity Sv and the object brightness Bv, etc. Thereafter, CPU 41 performs data communication with IPU 43 to send the calculated exposure factors shutter speed Tv and diaphragm value Av) to IPU 43 (step S19).

After the exposure factors are determined, control proceeds to step S20, where it is determined whether the release switch SWR is turned ON. If the release switch SWR is turned ON, a releasing operation is effected (step S21). If the release switch SWR is turned OFF, control is returned to step S13. While the power is held (i.e., while the power continues to be supplied), the operations of step S13 to step S20 are repeated.

DATA COMMUNICATION WITH IPU

Figure 6:
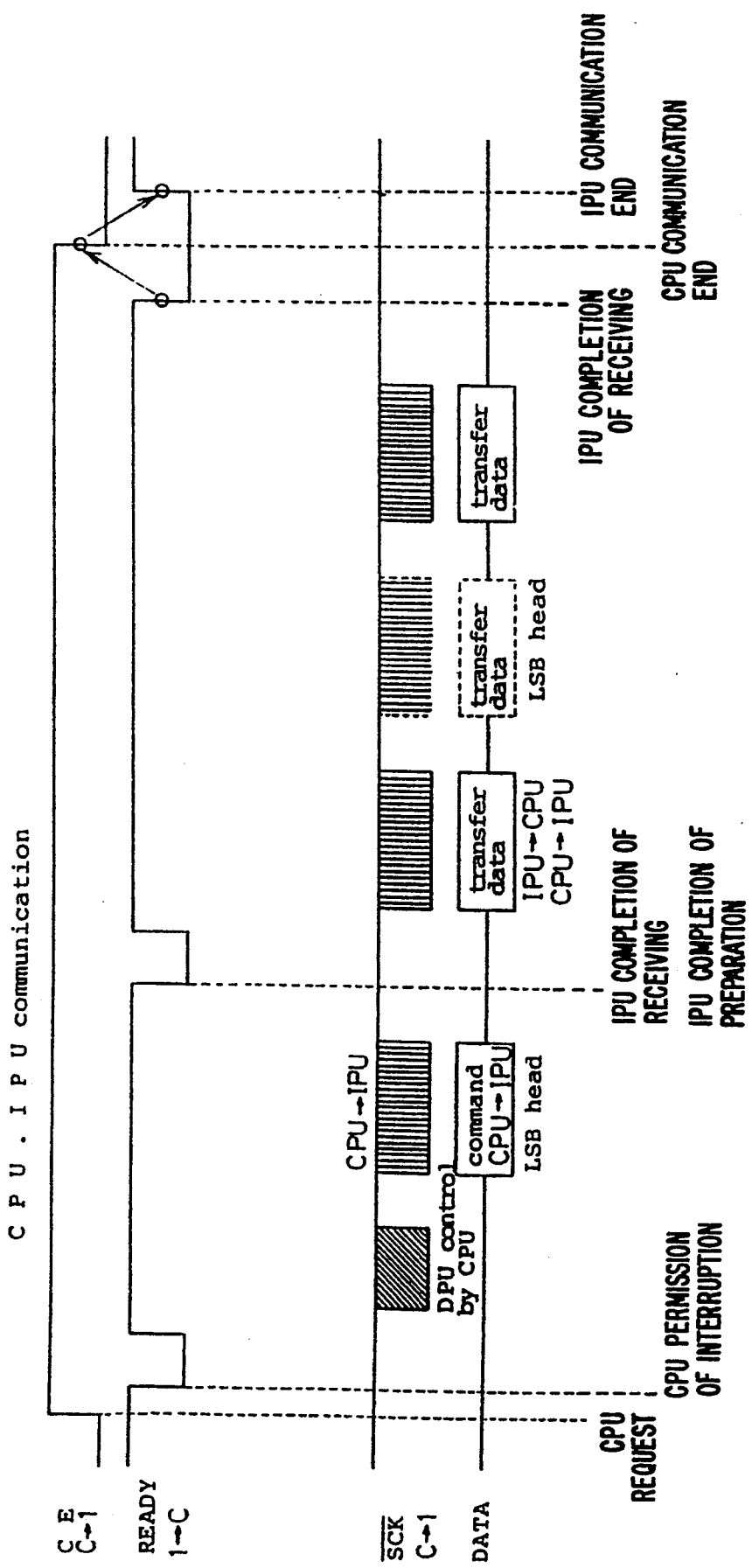
FIG. 6 is a timing chart of a communication operation between a CPU and an IPU, according to the present invention.

CPU 41 performs data communication with IPU 43. The data communication will be explained below with reference to FIG. 6 and Table 1 (attached after the last page of the specification). Each of the CPU 41 and IPU 43 has terminals corresponding to CE, READY, −SCK−, and DATA, which are connected to each other.

CPU 41 raises the level of terminal CE (not shown), so that IPU 43 is ready for communication. When IPU 43 monitors that the level of terminal CE has changed from "L" to "H", the level of terminal READY is dropped and then raised, so that an interruption by CPU 41 is permitted.

When CPU 41 monitors the permission to interrupt, a clock signal is outputted to terminal −SCK− (not shown), and a command is outputted to terminal DATA. Upon completion of receipt of the command, IPU 43 drops and then raises the level of the terminal READY, so that CPU 41 detects completion of the receipt. The IPU 43 outputs data corresponding to the received command in accordance with the clock signal sent from the terminal −SCK− of the CPU 41, or receives data from the CPU 41.

When the communication of the necessary data is completed, IPU 43 drops the level of terminal READY. Thereafter, CPU 41 drops the level of terminal CE, so that IPU 43 detects that the data communication with the CPU is completed. When IPU 43 monitors the level drop of terminal CE, IPU 43 raises the level of terminal READY to finish the data communication.

AE SUB-ROUTINE

Figure 7:
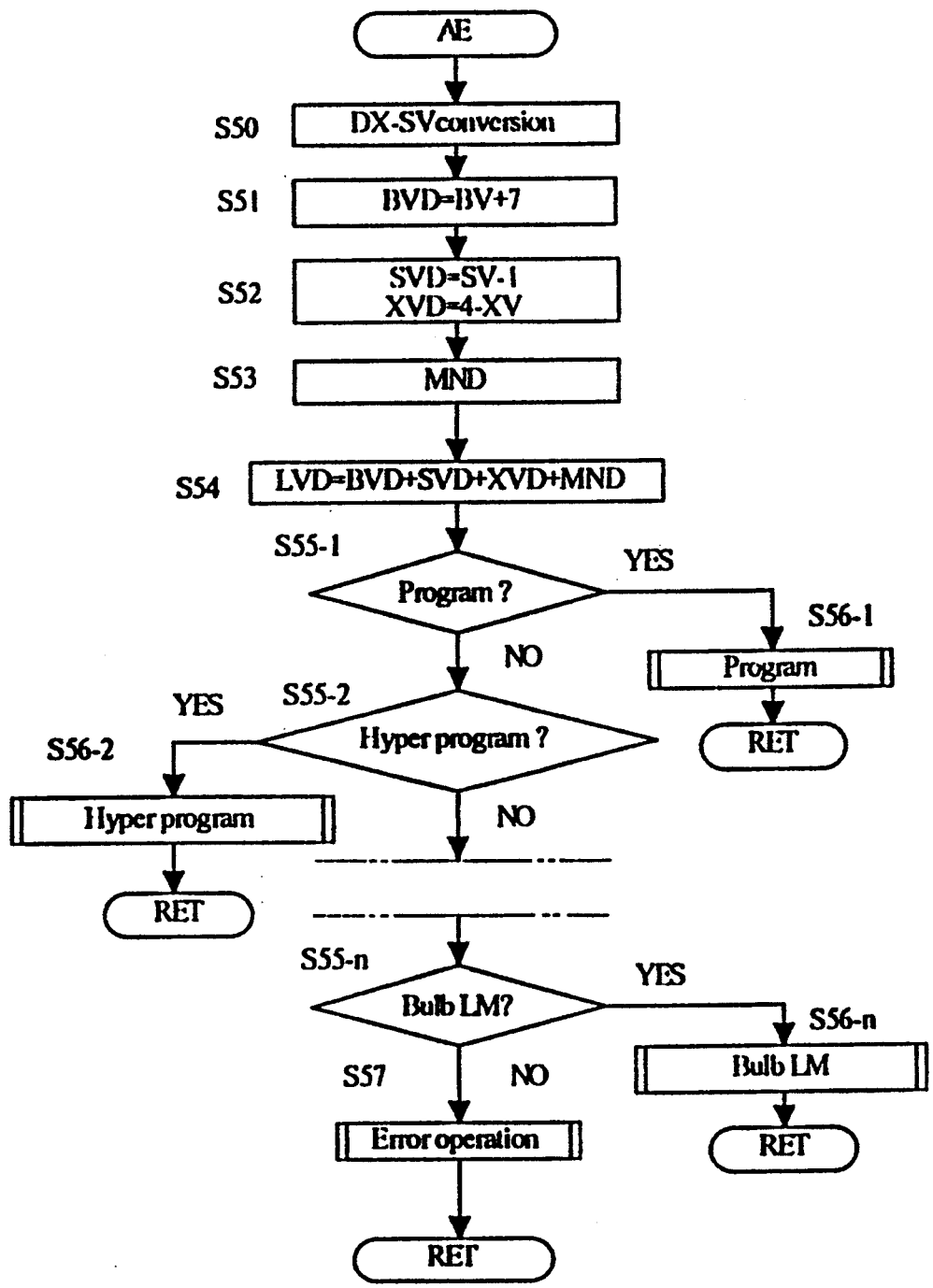
FIG. 7 is a flow chart of an automatic exposure mode operation, according to the present invention.

The sub-routine for calculating the exposure (automatic exposure mode) at step S18 will be discussed below with reference to the flow chart shown in FIG. 7.

In this AE process, DX codes representing the ISO sensitivity are converted to APEX values (film sensitivity Sv) at step S50. The DX codes of the ISO sensitivity consist of 5 bit signals and are read by the five DX pins (5 bits) DX4, DX3, DX2, DX5 and DX6 which come into contact with the codes in the illustrated embodiment. The upper three bits (DX4, DX3 and DX2) constitute an integer and the lower two bits (DX5 and DX6) a decimal. For example, if the decimal is "01" or "11", the APEX value is 0/3, if the decimal is "10", the APEX value is 166 , and if the decimal is "00", the APEX value is ⅔. The decimal thus converted to the APEX value is added to the integer. For example, the DX code of ISO 100 is represented by Sv=5, since the integer "101" is converted to an APEX value "5" and the decimal "01" is converted to an APEX value "0".

Thereafter, the object brightness Bv is converted a calculating object brightness BVD suitable for calculation by using the following equation: BVD=Bv+7. (step S51). Thereafter, the film sensitivity Sv and the exposure correcting value Xv are converted to a calculating sensitivity SVD and a calculating exposure correcting value XVD suitable for calculation by using the following equations, respectively (step S52):

$$SVD=Sv-1; XVD=4-Xv$$

The above-mentioned operations are effected not only to prevent the values of the calculating exposure factors BVD, SVD, XVD from being negative, but also to unify the accuracy or precision of the exposure factors to be a ⅓ Ev step. Consequently, the APEX calculation (i.e., addition and subtraction) can be easily effected without considering the calculation accuracy. Note that since the precision of Sv and Xv is within ⅓ Ev, it is in theory impossible to convert them to values of a ⅓ Ev step. To this end, Sv and Xv are rounded to approximately ⅓ Ev and ⅔ Ev to ⅔ Ev and ⅔ Ev, respectively.

Thereafter, a brightness correction value MND that depends on a change of the open F number, is calculated at step S53. The brightness correction value MND is adapted to correct the object brightness Bv so as to maintain the exposure on a film plane at a constant value, regardless of, for example, a change in the open F number change in brightness of the lens) during zooming, and is a value that is peculiar to the taking lens. The brightness correction value MND is inputted from the taking lens by communication of IPU 43 with the taking lens (IPU-lens communication), which will be discussed hereinafter, and is transferred from IPU 43 to CPU 41 through the CPU-IPU communication at step S16.

Thereafter, a calculating exposure value LVD is calculated, based on the calculating object brightness BVD, the calculating sensitivity SVD, the calculating exposure correcting value XVD, and the brightness correcting value MND, using the following formula;

$$LVD=BVD+SVD+XVD+MND$$

CPU 41 detects the selected exposure mode and calls the exposure factor calculating sub-routine corresponding to the selected exposure mode (steps S55-1∼S55-n, S56-1∼S56-n). The diaphragm value Av and the shutter speed Tv are then calculated in accordance with the algorithm of the selected exposure mode. Thereafter, control is returned. If an incorrect exposure mode is set, an error operation, as described below, is carried out (step S57).

ERROR OPERATION

Figure 8:
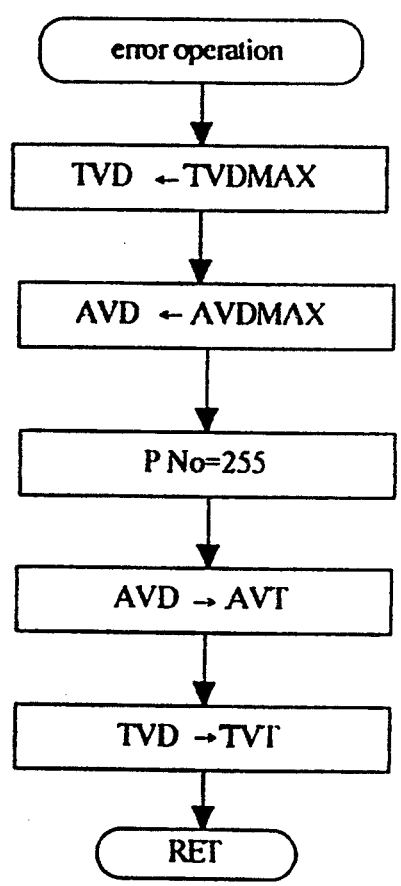
FIG. 8 is a flow chart of an error correcting operation, according to the present invention.

In the error operation at step S57, calculating shutter speed TVD and calculating diaphragm value AVD are replaced with a calculating maximum shutter speed TVDMAX and a calculating maximum diaphragm value AVDMAX, respectively, and a number PN (or Pno) of EE pulses is set at a maximum value, i.e., 225. Thereafter, the calculating shutter speed TVD (the calculating maximum shutter speed TVDMAX) and the calculating diaphragm value AVD (i.e., the calculating maximum diaphragm value AVDMAX) are converted to values suitable for transmission to IPU in a processes labeled TVDT (TVD→TVT) and AVDT (AVD→AVT), as explained in detail hereinafter (see FIG. 8). Thereafter, control is returned.

It is possible to replace one or both of the calculating shutter speed TVD and the calculating diaphragm value AVD with a calculating minimum shutter speed TVDMIN and a calculating minimum diaphragm value AVDMIN, in place of the calculating maximum shutter speed TVDMAX and the calculating maximum diaphragm value AVDMAX, respectively.

EXPOSURE CALCULATING SUB-ROUTINE

In the illustrated embodiment, the exposure modes include a program automatic exposure mode in which the shutter speed and the diaphragm value are automatically set in accordance with the object brightness, a shutter speed priority (EE LA) automatic exposure mode (lens-auto mode in which the diaphragm value is automatically set in accordance with the manually set shutter speed and object brightness, a diaphragm priority (ES LA) automatic exposure mode in which the shutter speed is automatically set in accordance with the manually set diaphragm value and object brightness, a manual exposure (Manual LA) and bulb exposure (Bulb LA) modes, and a diaphragm priority (ES LA) automatic exposure mode (lens-manual mode).

Furthermore, in the illustrated embodiment, there is a limited program (Program LIMT) automatic exposure mode, a hyper-program (Hyper Program) automatic exposure mode used as a specific program exposure mode, a hyper shutter priority (Hyper EE) automatic exposure mode (lens auto mode), and a hyper diaphragm priority (Hyper ES) automatic exposure mode.

The following discussion will be directed to an exposure factor calculation process in the above-mentioned exposure modes with reference to FIGS. 9 through 23.

HYPER PROGRAM

The hyper program exposure mode referred to herein a mode in which the program mode, the EE automatic exposure mode and the ES automatic exposure mode are changed by optionally selecting the hyper program exposure mode, the hyper EE automatic exposure mode, or the hyper ES automatic exposure mode. The operations of the Hyper-program modes are identical to those of the ordinary program mode, except that the exposure mode can be varied between the above three modes by actuating the electronic dials 17,19 or the clear button 23.

Figure 9:
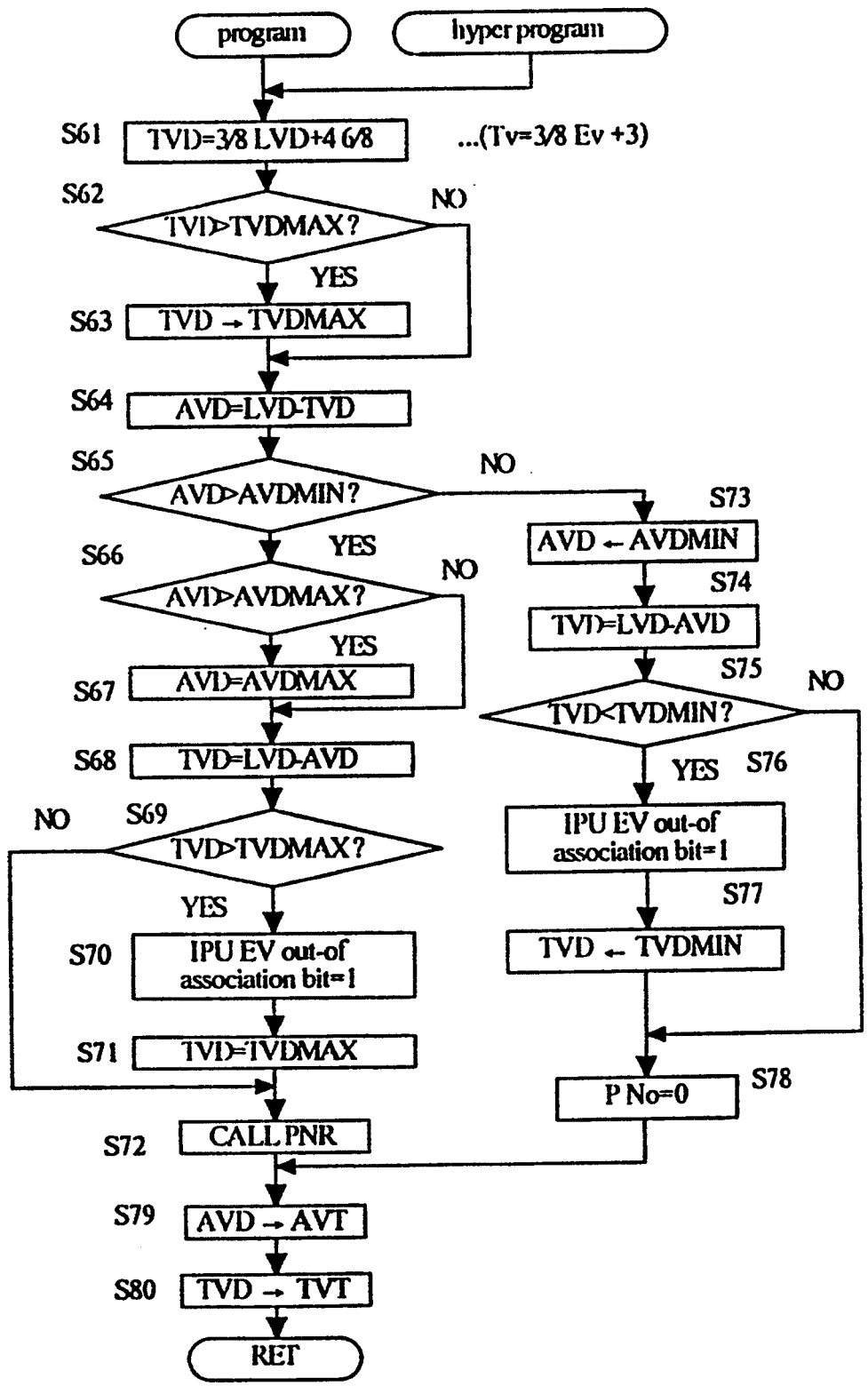
FIG. 9 is a flow chart of a hyper-program exposure mode operation according to the present invention.
Figure 10:
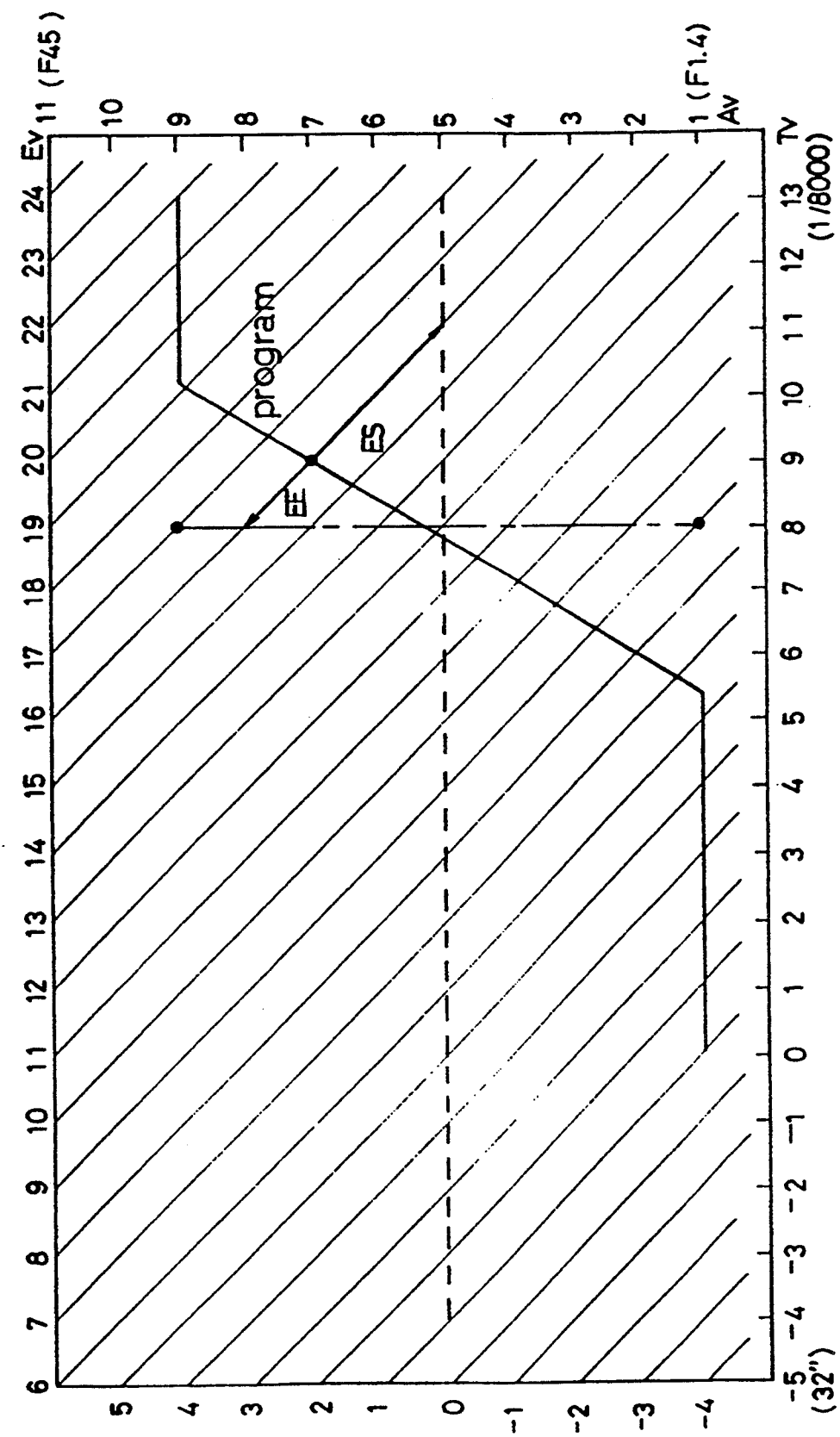
FIG. 10 is a diagram of a hyper-program exposure mode shown in FIG. 9.

FIG. 9 shows a flow chart involving the hyper program exposure mode and the ordinary program exposure mode, and FIG. 10 shows a program diagram thereof.

First, the relationship between the calculating TVD corresponding to the Tv value and the calculating AVD corresponding to the Av value is obtained by the following formula, in accordance with the formula at step S54:

$$\begin{aligned}
LVD &= BVD + SVD + XVD + MND \\
&= (Bv + 7) + (Sv - 1) + (4 - Xv) + MND \\
&= (Bv + Sv - Xv + MND) + 10 \\
&= Ev + 10 \\
&= Tv + Av + 10 \\
&= (Tv + 5\ 4/8) + (Av + 4\ 4/8) \\
&= TVD + AVD
\end{aligned}$$

Here, $$Ev = Bv + Sv - Xv + MND$$

$$TVD = Tv + 5\ 4/8 \qquad (1)$$

$$AVD = Av + 4\ 4/8 \qquad (2)$$

From the equations (1) and (2), the relationships between Tv and TVD and between Av and AVD are obtained. The respective constants added to Tv and Av in equations (1) and (2) are not limited to 5 4/8 and 4 4/8 and can be any two values whose sum is 10. The values of 5 4/8 and 4 4/8 are selected to be approximate to each other in the embodiment. Correspondences between Tv and TVD and between Av and AVD thus obtained are shown in Table 2 and Table 3 (attached after the last page of the specification), by way of example.

In the program exposure mode, the optimum calculating shutter speed TVD is obtained by the following equation:

$$TVD = \tfrac{3}{5} LVD + 4\ 6/8$$

The calculating exposure value LVD is obtained at step S54. Consequently, the optimum calculating diaphragm value AVD is obtained from the result of this calculation (steps S61~S78).

The equation mentioned above is obtained from the basic formula of the program line (Tv=⅗ Ev+3]), in which TVD=Tv+5 4/8 and AVD=Av+4 4/8. When the optimum calculating shutter speed TVD and the optimum calculating diaphragm value are within the shutter capability range of the camera body 11 (range between the calculating maximum shutter speed TVDMAX and the calculating minimum shutter speed TVDMIN), and the diaphragm capability range of the taking lens (range between the calculating maximum diaphragm value AVDMAX and the calculating minimum value AVDMIN), the optimum calculating shutter speed and the optimum calculating diaphragm value are diaphragm maintained, and the EE pulse number PN, used to maintain the diaphragm value Av of the diaphragm of the taking lens during the releasing operation, is calculated (steps S62, S64~S66, S68, S69, S72). The maximum shutter speed TVDMAX and the minimum diaphragm value AVDMIN referred to are the maximum shutter speed and the open F number, respectively.

The maximum and minimum shutter speeds TVDMAX and TVDMIN are peculiar to the camera body 11 and are TVDMAX=13 (1/8000 sec.) and TVDMIN=−5 (30 sec.) in the illustrated embodiment, respectively. Consequently, as TVD=TV+5 4/8, the calculating maximum and minimum shutter speed TVDMAX and TVDMIN. are represented respectively, by;

$$TVDMAX = TVMAX + 5\ 4/8 = 18\ 4/8$$

$$TVDMIN = TVMIN + 5\ 4/8 = 0\ 4/8$$

The calculating maximum and minimum shutter speed TVDMAX and TVDMIN are stored in advance in the internal ROM 41a of the CPU 41, and are memorized at predetermined addresses of the RAM 41b during the operations.

Using the inherent maximum and minimum diaphragm values AVMAX and AVMIN and the formula (AVD=AV+4 4/8), the calculating maximum and minimum diaphragm values AVDMAX and AVDMIN are represented respectively, by;

$$AVDMAX = AVMAX + 4\ 4/8$$

$$AVDMIN = AVMIN + 4\ 4/8$$

The maximum and minimum diaphragm values AVMAX and AVMIN are inputted by the communication with the taking lens at step S35 and the calculating maximum and minimum diaphragm values AVDMAX and AVDMIN are stored in the internal RAM 41b of the CPU 41 at predetermined addresses thereof.

If the object is too bright or dark to calculate the optimum exposure factors using the above-mentioned program line, the following operations are carried out:

When the object is too bright:

If the calculating shutter speed TVD is larger than the calculating maximum shutter speed TVDMAX, the optimum calculating diaphragm value AVD is calculated after the calculating shutter speed TVD is replaced with the calculating maximum shutter speed TVDMAX (steps S62~S64).

If the optimum calculating diaphragm value AVD thus obtained is within the diaphragm capability range, the EE pulse number PN is obtained in accordance therewith (steps S65, S66, S68 and S72).

If the optimum calculating diaphragm value AVD is larger than the calculating maximum diaphragm value AVDMAX, the optimum calculating shutter speed TVD is recalculated after the optimum calculating diaphragm value AVD is replaced with the calculating maximum diaphragm value AVDMAX (steps S65~S68). If the recalculated calculating shutter speed TVD is larger than the calculating maximum shutter speed TVDMAX, it is out of the range in which optimum exposure can be obtained by any combination of the calculating shutter speed TVD and the calculating diaphragm value AVD. Consequently, an Ev out-of association bit is set at "1" to indicate that the calculating shutter speed is out of association (i.e., the allowable range), and the calculating shutter speed TVD is then replaced with the calculating maximum shutter speed TVDMAX to calculate the EE pulse number PN (steps S69~S72). If the recalculated calculating shutter speed TVD is within the shutter capability range, since optimum exposure can be effected, control skips steps S70 and S71 and performs the calculation of the EE pulse number PN in accordance with the optimum calculating diaphragm value AVD (steps S69 and 72).

When the EV; out-of association bit is set at "1", the shutter speed (maximum shutter speed TVMAX) and the diaphragm (maximum diaphragm value AVMAX) is indicated in the LCD display panel 69 in a blinking manner.

When the object is too dark:

If the optimum calculating diaphragm value AVD is smaller than the calculating minimum diaphragm value AVDMIN, the optimum calculating shutter speed TVD is recalculated after the calculating diaphragm value AVD is replaced with the calculating minimum diaphragm value AVDMIN. If the recalculated calculating shutter speed TVD is within the shutter capability range, the value is held and the EE pulse number PN is set at 0, as the diaphragm is an open F number (steps S73~S75, S78).

If the optimum calculating shutter speed TVD is smaller than the calculating minimum shutter speed TVDMIN, under-exposure conditions exist. Accordingly, the Ev out-of association bit is set at "1" and the calculating shutter speed TVD is replaced with the calculating minimum shutter speed TVDMIN. Thereafter, the EE pulse number PN is set at 0 (steps S75~S78). TVD and AVD are stored at predetermined addresses of the RAM 41b and are utilized to control the shutter speed and diaphragm value when releasing.

When the above-mentioned operations are completed, the calculating diaphragm value AVD and the calculating shutter speed TVD are replaced with a transferring diaphragm value AVT and a transferring shutter speed TVT, respectively (steps S79 and S80). The relationships between the calculating diaphragm value AVD and the transferring diaphragm value AVT and between the calculating shutter speed TVD and the transferring shutter speed TVT are as follows:

$$TVT = TVD + 10\ 4/8$$

$$AVT = AVD$$

Although TVT and AVT are not rounded in the above equations, TVT and AVT are rounded in the actual operation.

The transferring shutter speed TVT and the transferring diaphragm value AVT are data of a ½ Ev step. Namely, when this data is transferred from CPU 41 to IPU 43, the calculated values of a ⅛ Ev step are rounded to ½ Ev. This is because the data is used only to indicate the necessary information in IPU 43, so that accuracy greater than a ½ Ev step is unnecessary. Tables 2 and 3 mentioned above show indicating sections corresponding to the values of TVD and AVD by way of example.

Thus, the operation of the program exposure mode finished and the program line (diagram) shown as a solid line in FIG. 10 is obtained.

LIMITED PROGRAM EXPOSURE MODE

Figure 11:
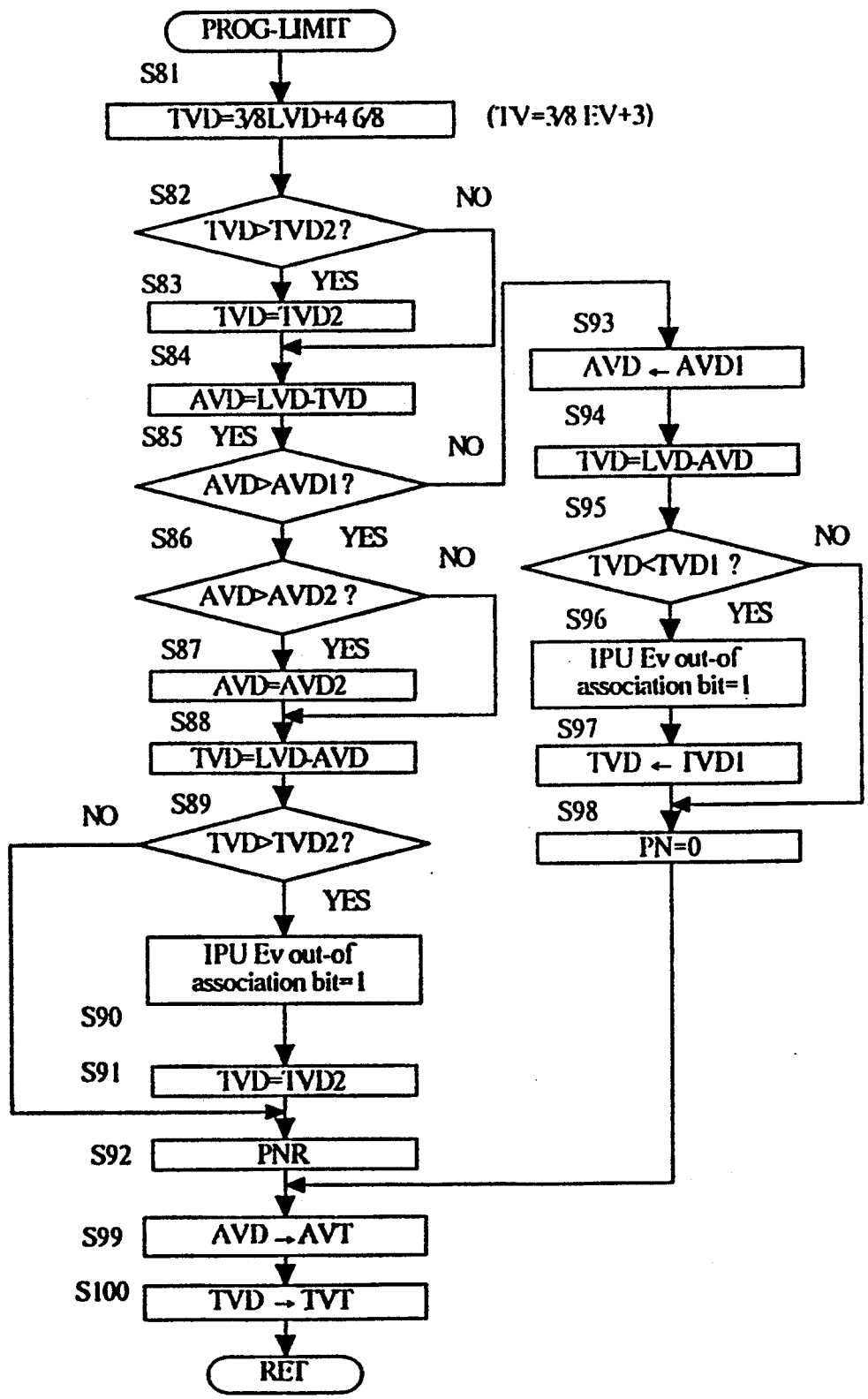
FIG. 11 is a flow chart of a limited program exposure mode operation, according to the present invention.
Figure 12:
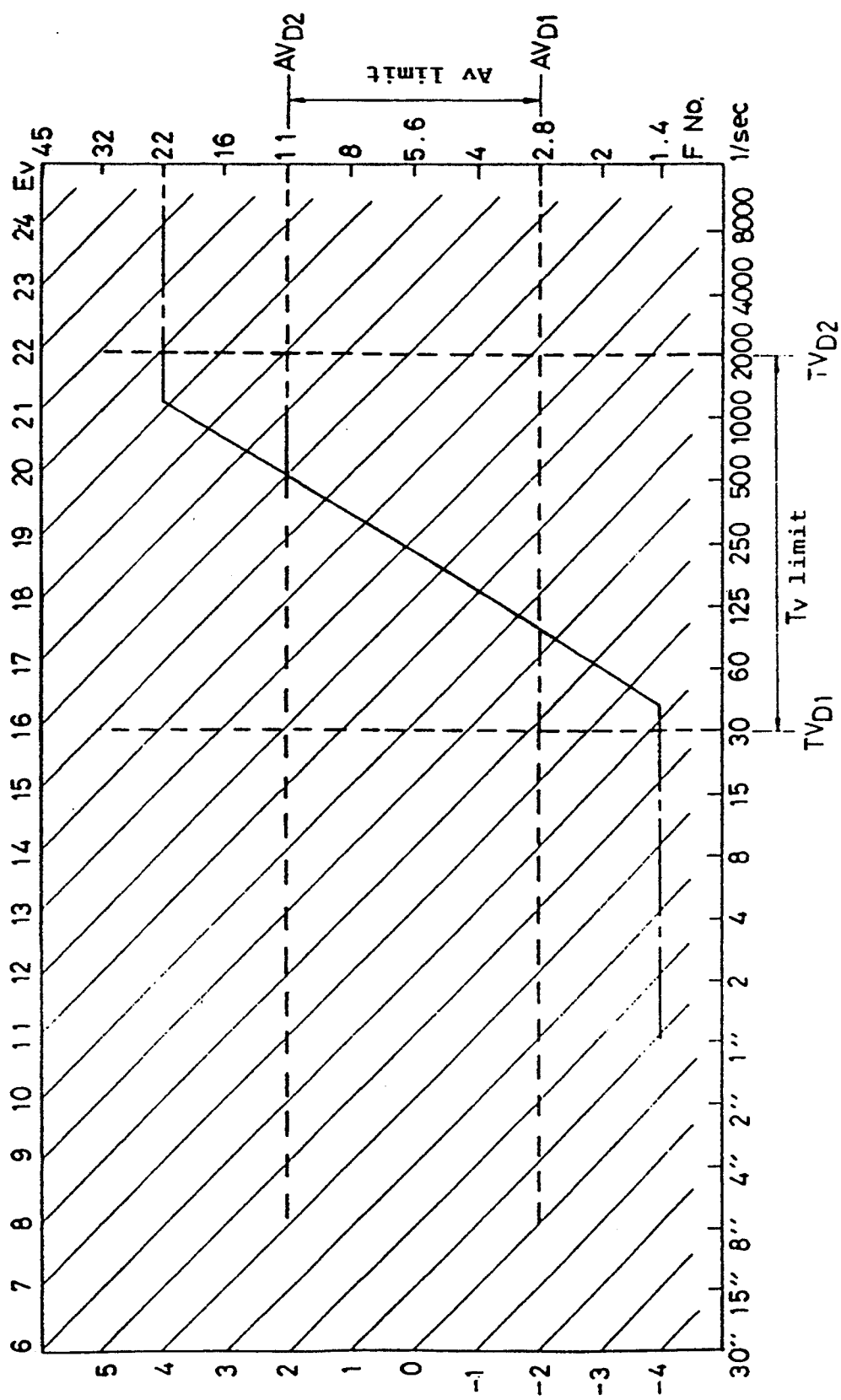
FIG. 12 is a diagram of the limited program exposure mode shown in FIG. 11.

FIG. 11 shows a sub-routine of the limited program exposure (automatic exposure) mode in which a photographer: can set the calculating minimum and maximum shutter speeds TVD1 and TVD2 and the calculating minimum and maximum diaphragm values AVD1 and AVD2, respectively. The operational flow in this sub-routine is similar to that of the sub-routine of the program exposure mode except for the following points. Namely, in the sub-routine shown in FIG. 11, the calculating minimum and maximum diaphragm values AVDMIN and AVDMAX are replaced with the set minimum and maximum diaphragm values AVD1 and AVD2, respectively (steps S85, S93, S86, S87), and the calculating minimum and maximum shutter speeds TVDMIN and TVDMAX are replaced with the set minimum and maximum shutter speeds TVD1 and TVD2, respectively (steps S95, S97, S82,S83, S89, S91). The program diagram of the limited program exposure mode is shown in FIG. 12.

Figure 39A:
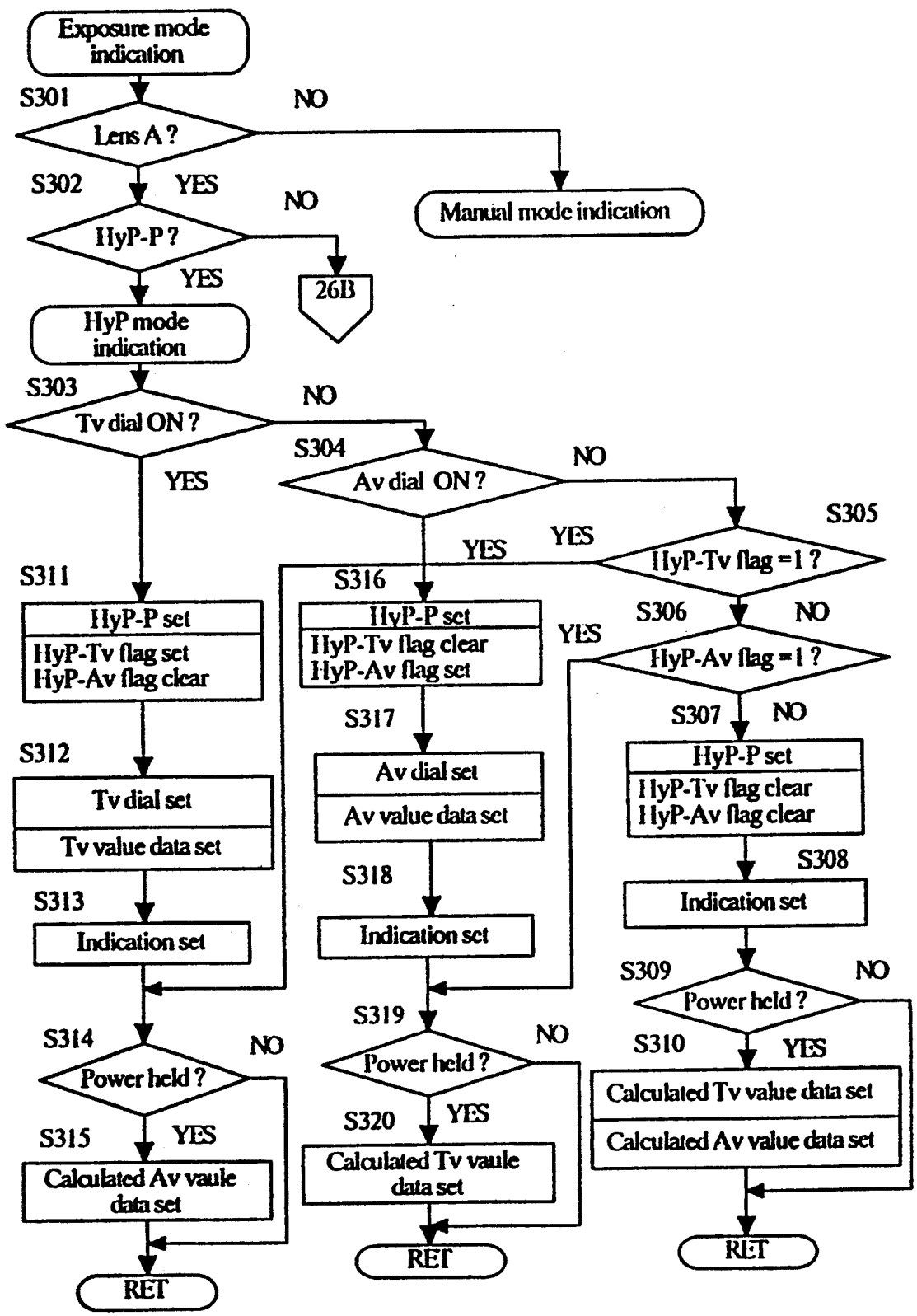
FIGS. 39A, 39B, 39C, 39D, 39E, 39F, 39G and 39H are flow charts of an indication operation, according to the present invention.
Figure 39B:
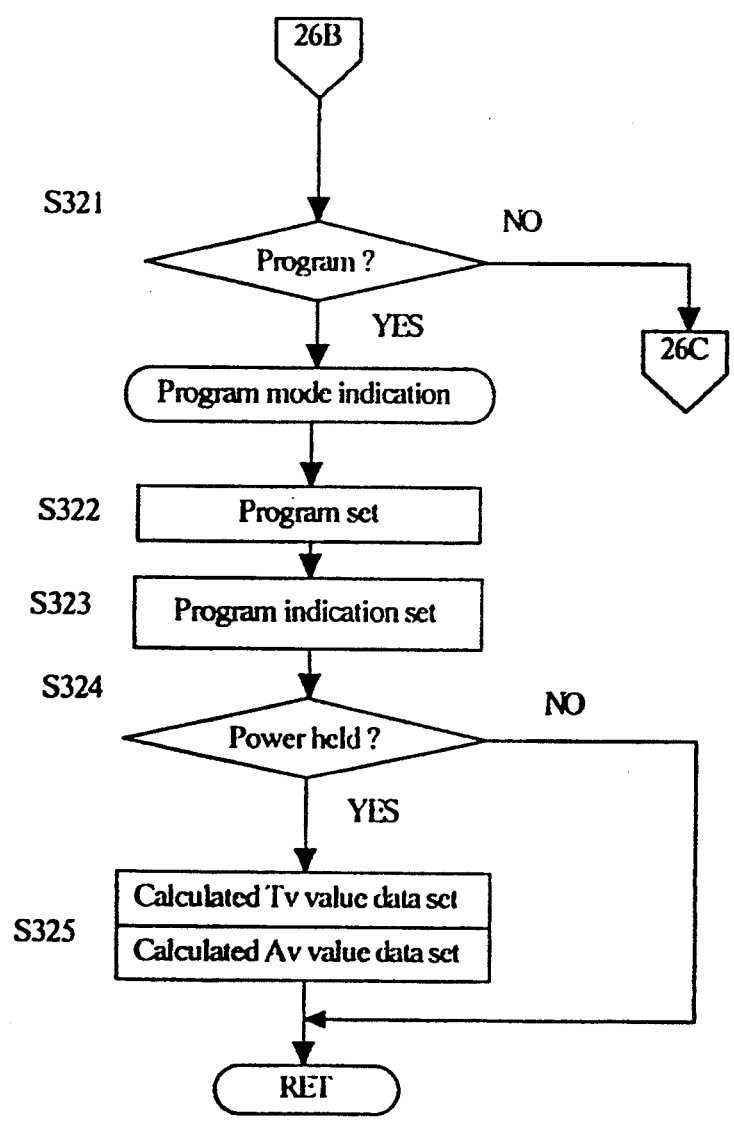
Figure 39C:
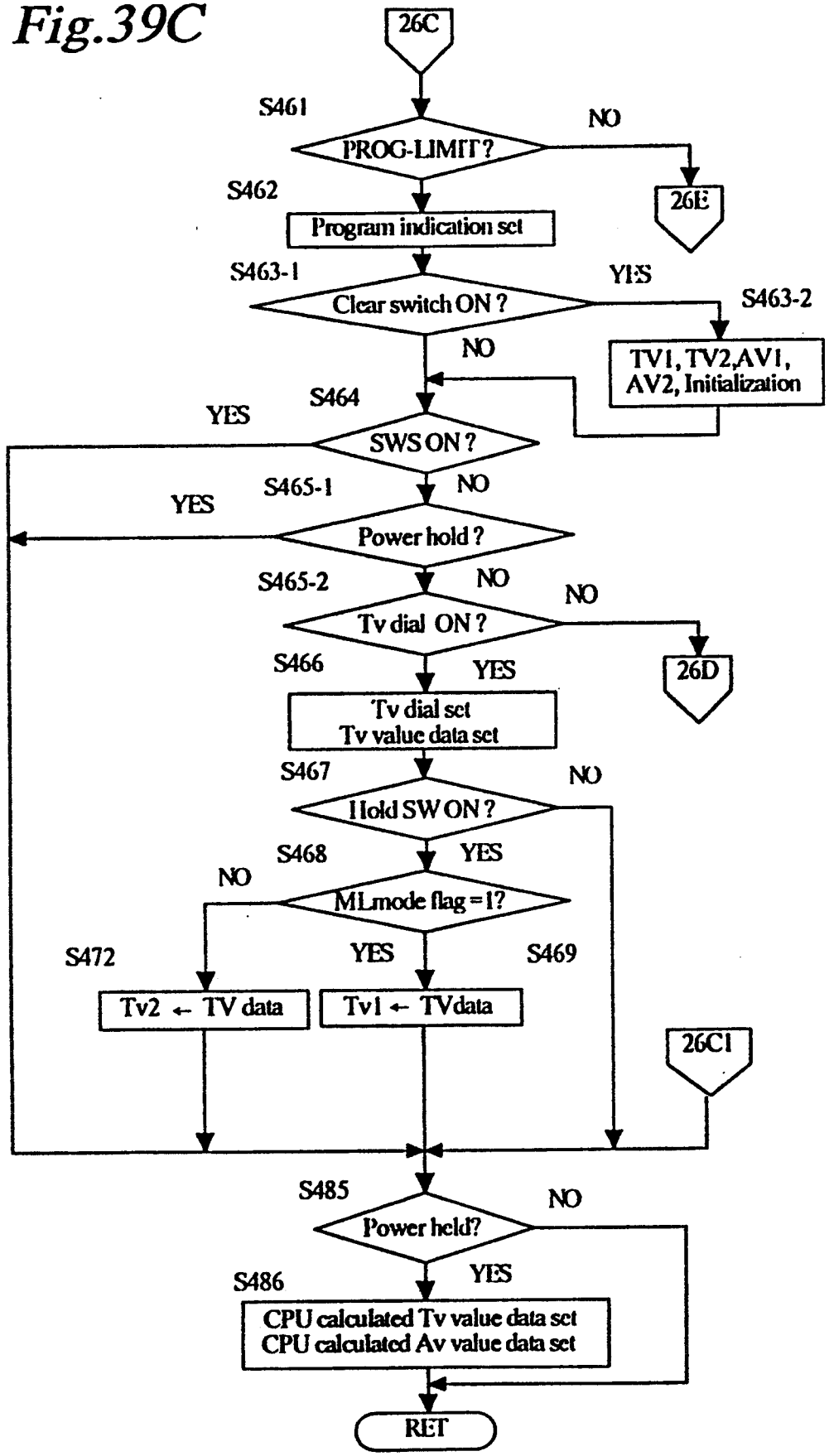
Figure 39D:
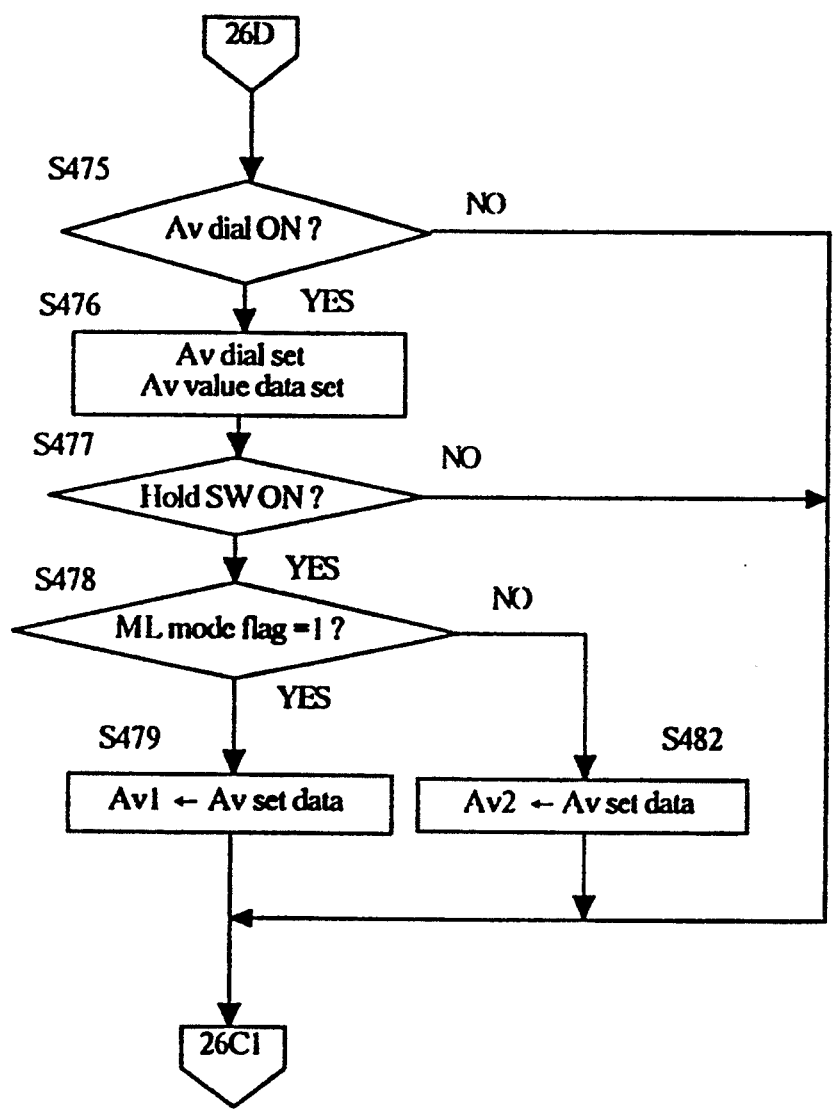
Figure 39E:
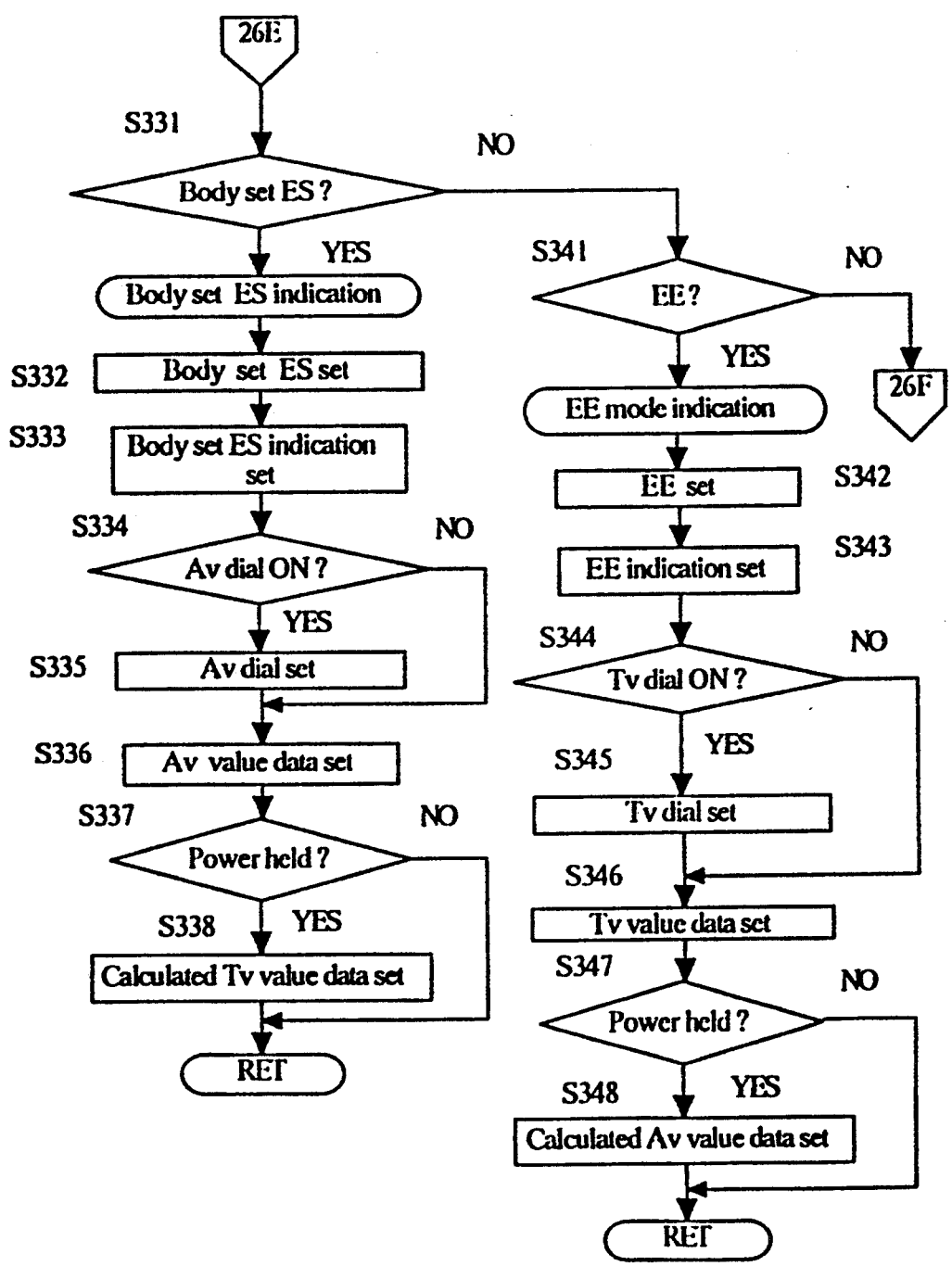
Figure 39F:
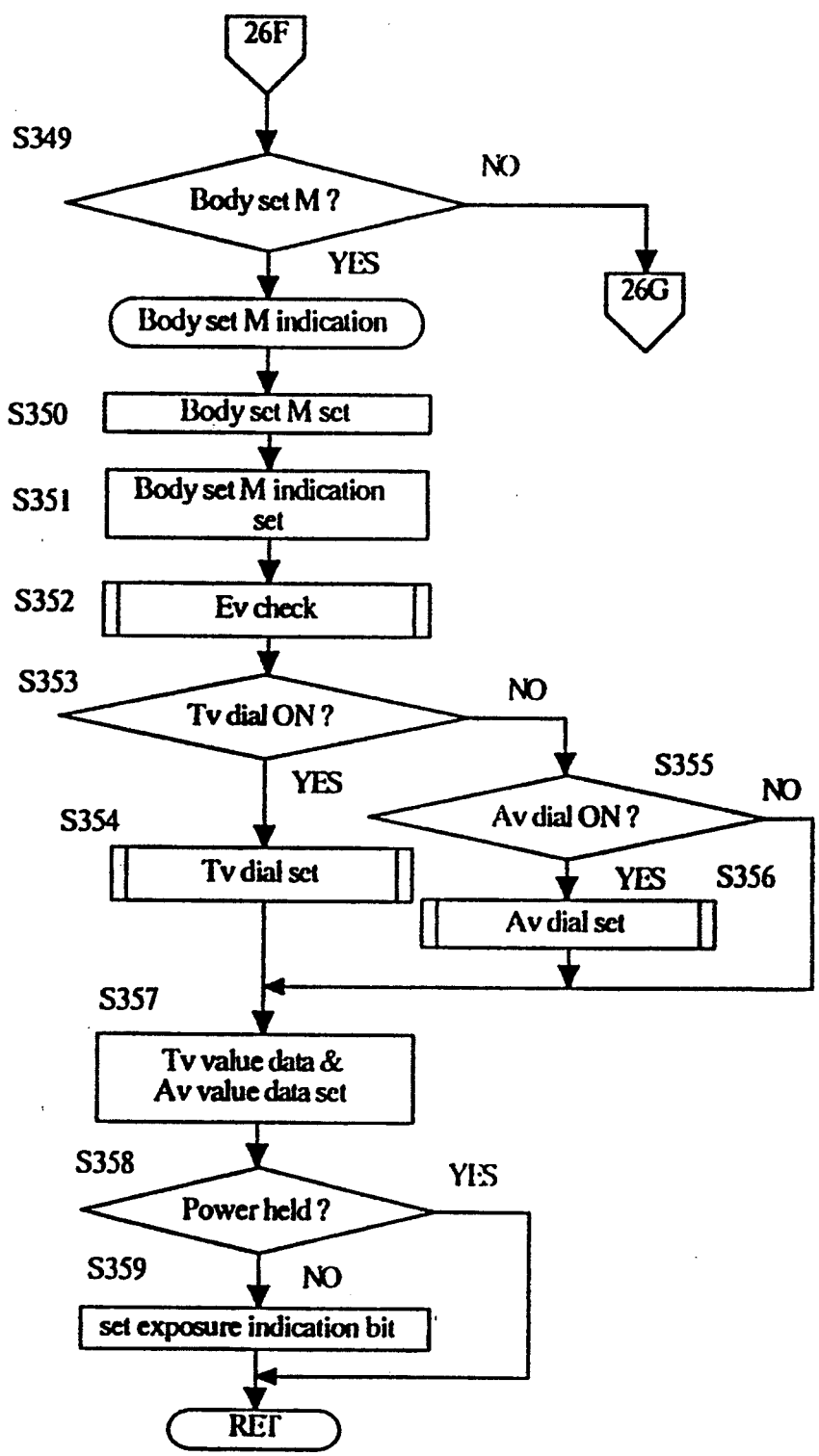
Figure 39G:
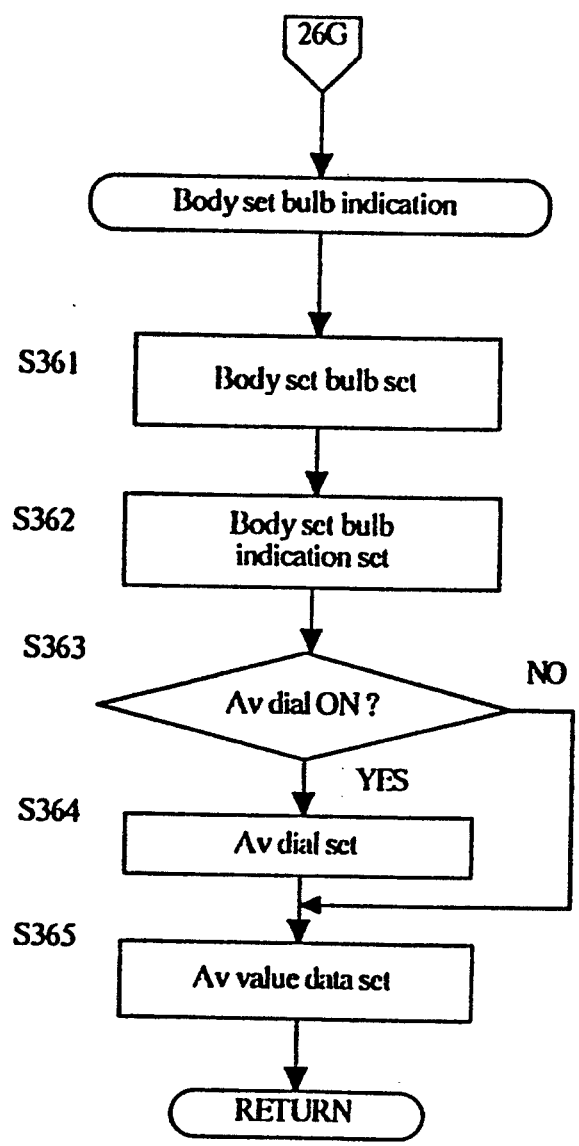

The calculating minimum and maximum diaphragm values AVDMIN and AVDMAX, and the calculating minimum and maximum shutter speeds TVDMIN and TVDMAX are set by actuating the hold button 25 and rotating the Tv electronic dial 17 and the Av electronic dial 19 when the limited program exposure mode has been selected. The setting operation shown in the flow chart of FIGS. 39C and 39D will be discussed in detail hereinafter.

HYPER-EE AUTOMATIC EXPOSURE MODE

Figure 13:
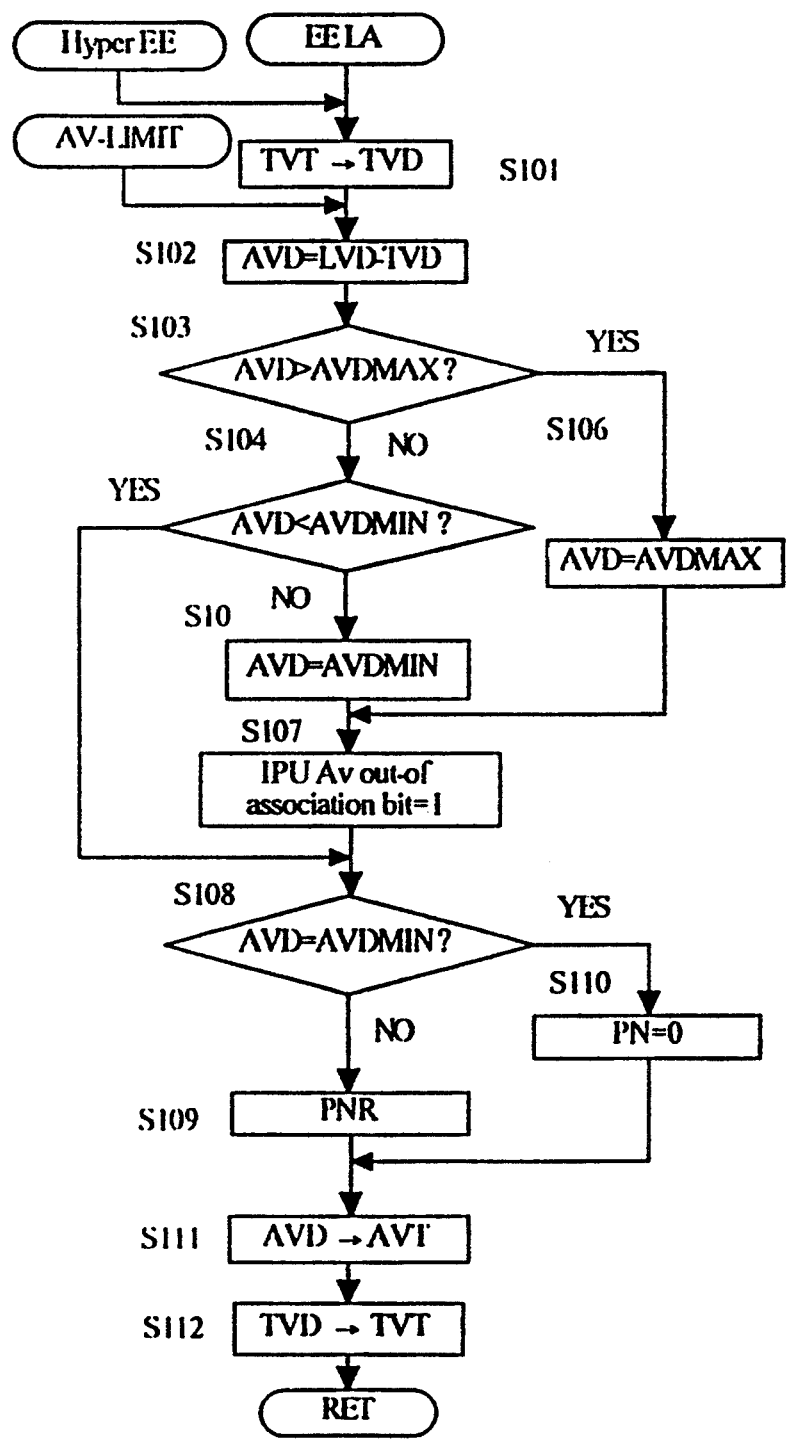
FIG. 13 is a flow chart of a hyper-shutter speed priority automatic exposure mode operation, according to the present invention.

FIG. 13 shows a flow chart of the hyper-shutter priority (Hyper-EE) automatic exposure mode. The program diagram thereof is shown as a dotted-dashed line in FIG. 10.

The operation for calculating the exposure factors at the hyper-shutter priority automatic exposure mode is basically the same as the operation of the ordinary shutter priority automatic exposure mode (lens-auto mode), except that the exposure mode can be changed by actuating the electronic dials 17, 19 or the clear button 23.

The hyper-EE automatic exposure mode is an EE automatic exposure mode which is compulsively selected when the hyper program exposure mode is selected and when the Tv electronic dial 17 has been actuated. Return from the hyper-EE automatic exposure mode to the hyper-program exposure mode is effected by the operation of the clear button 23 or the power switch, etc. The switch from the hyper-EE automatic exposure mode to the hyper-ES exposure mode is compulsively effected by the rotation of the Av electronic dial 19.

In the hyper-EE automatic exposure mode, the set shutter speed TVT transferred from IPU 43 by the data communication is read and converted to the calculating shutter speed TVD (step S101). The relationship between the transferring shutter speed TVT and the calculating shutter speed TVD is as follows:

$$TVD = TVT - 10\ 4/8$$

The transferring shutter speed TVT, which is ½ Tv in step, is converted to the calculating shutter speed TVD, which is ⅛ Tv in step, by the above operation.

The transferring shutter speed TVT is represented by data of a ½ Ev step and is processed upon calculating, so that the decimal place thereof is identical to that of the calculating shutter speed TVD (i.e., data which is ⅛ Ev in step). Accordingly, the Tv value, which is set by the user (i.e., TVT) set as the calculating shutter speed TVD in predetermined addresses of RAM 41b.

Thereafter, the optimum calculating diaphragm value AVD is calculated using the calculating shutter speed TVD and the calculating exposure value LVD (step S102).

If the optimum calculating shutter speed AVD is within the diaphragm capability range, the values are held and the EE pulse number is calculated (steps S103, S104, S108~S110).

If the optimum calculating diaphragm value AVD is out of the diaphragm capability range, namely, if the object is too bright or dark, the following operations are performed:

When the object is too bright:

If the optimum calculating diaphragm value AVD greater than the calculating maximum diaphragm value AVDMAX, the calculating diaphragm value AVD is replaced with the calculating maximum diaphragm value AVDMAX. This replacement causes an over-exposure condition. Accordingly, the EE pulse number PN is set after the Av out-of-association bit signal is set at "1" to indicate that the optimum calculating diaphragm value AVD is out of association (steps S103, S106~S110). When the Av out-of-association bit signal is set, the number "22", indicating the diaphragm value Av in the LCD display panel 69, blinks to indicate over-exposure.

When object is too dark:

If the optimum calculating diaphragm value AVD is smaller than the calculating minimum diaphragm value AVDMIN, the calculating diaphragm value AVD is replaced with the calculating minimum diaphragm value AVDMIN. This replacement causes an under-exposure condition. Accordingly, the EE pulse number PN is set at "0" after the Av out-of-association bit signal is set at "1" (steps S103~S105, S107, S108, and S110). Thus, the diagram as shown as a dotted and dashed line in FIG. 10 is obtained.

When the setting of the EE pulse number PN finished, the calculating diaphragm value AVD and the calculating shutter speed TVD are converted to the transferring diaphragm value AVT and the transferring shutter speed TVT to complete the operation, respectively (steps S111 and S112).

HYPER-ES AUTOMATIC EXPOSURE MODE

Figure 16:
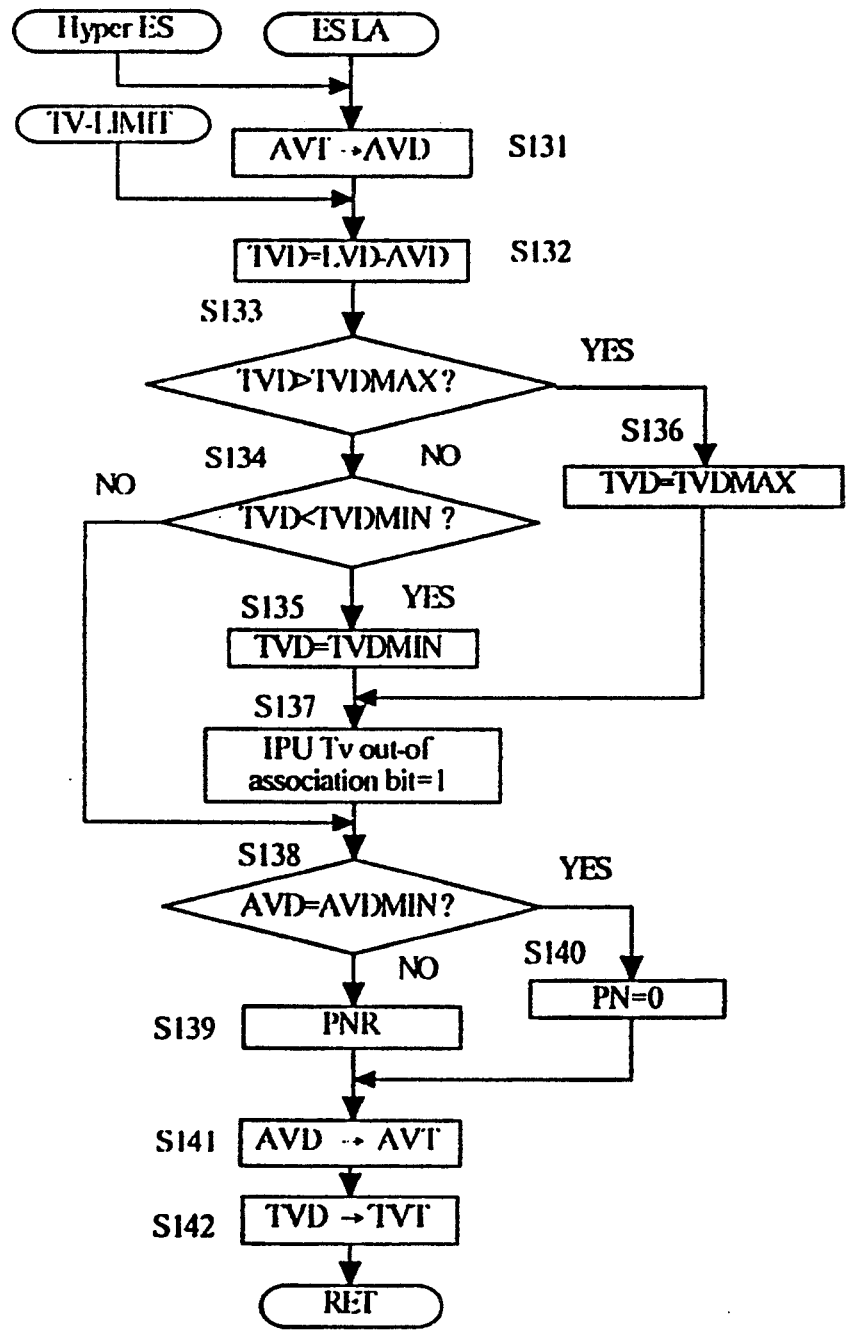
FIG. 16 is a flow chart of a hyper-diaphragm priority automatic exposure mode operation, according to the present invention.

An embodiment of the hyper diaphragm priority (ES) automatic exposure mode (lens-auto mode) will be explained below with reference to FIGS. 10 and 16.

The basic operations in the hyper-ES automatic exposure mode is basically the same as the operation of the conventional ES automatic exposure mode (lens-auto or body-set mode).

The hyper-ES automatic exposure mode is an ES automatic exposure mode which is compulsively selected when the hyper program exposure mode is selected and when the Av electronic dial 19 has been actuated. The return from the hyper-ES automatic exposure mode to the hyper-program exposure mode is effected by the operation of the clear button 23 or the power switch, etc. The switch from the hyper-ES automatic exposure mode to the hyper-EE exposure mode is compulsively effected by the rotation of the Tv electronic dial 19.

In the hyper-ES automatic exposure mode, the set diaphragm value AVT transferred from IPU 43 by the data communication is read to convert the same to the calculating diaphragm value AVD (step S131). The transferring diaphragm value AVT is identical to the calculating diaphragm value AVD (i.e., AVD=AVT). Accordingly, the diaphragm value Av manually set by the user (i.e., AVT) is set as the calculating diaphragm value AVD at predetermined addresses of the RAM 41b.

The transferring diaphragm value AVT is represented by data which is ⅛ Ev in step, and it is processed upon calculating so that the place thereof is identical to that of the calculating diaphragm value AVD (i.e., data which is ⅛ Ev in step).

Thereafter, the optimum calculating shutter speed TVD is calculated using the calculating exposure value AVD and the calculating exposure value LVD (step S132).

If the optimum calculating shutter speed TVD is within the shutter capability range, the values are held and the EE pulse number is calculated in accordance with the calculating diaphragm value AVD (steps S133, S134, S138~S140).

If the optimum calculating shutter speed TVD is out of the shutter capability range, namely, if the object is too bright or dark, the following operations are performed:

When the object is too bright:

If the optimum calculating shutter speed TVD is greater than the calculating maximum shutter speed TVDMAX, the calculating shutter speed TVD is replaced with the calculating maximum shutter speed TVDMAX. This replacement causes an over-exposure condition. Accordingly, the EE pulse number PN is set after the Tv out-of-association bit signal is set at "1" to discriminate that the optimum calculating shutter speed TV is out of association (steps S133, S136~S140).

When the object is too dark:

If the optimum calculating shutter speed TVD is less than the calculating minimum shutter speed TVDMIN, the calculating shutter speed TVD is replaced with the calculating minimum shutter speed TVDMIN. This replacement causes an under-exposure condition. Accordingly, the EE pulse number PN is set at "0" after the Tv out-of-association bit signal is set at "1" (steps S133~S135, S137, S138~S140).

When the EE pulse number PN is set, the calculating diaphragm value AVD and the calculating shutter speed TVD are converted to the transferring diaphragm value AVT and the transferring shutter speed TVT to complete the calculation of the exposure factors (steps S141 and respectively. Thus, the diagram as shown as a dotted line in FIG. 10 is obtained.

SECOND HYPER-EE OR ES AUTOMATIC EXPOSURE MODE

The second hyper-EE or ES automatic exposure mode an automatic exposure mode in which the priority exposure factor is modified only when the non-priority exposure factor cannot be adjusted to avoid the occurrence of under-exposure or over-exposure. Namely, unlike the above mentioned hyper-EE or hyper-ES automatic exposure modes in which a change of the priority exposure factor (i.e., diaphragm value or shutter speed having a priority) does not take place even if the object is too bright or dark, the exposure factor having a priority is modified when the modification of the exposure factor having no priority cannot be adjusted to avoid over-exposure or under-exposure.

Figure 15:
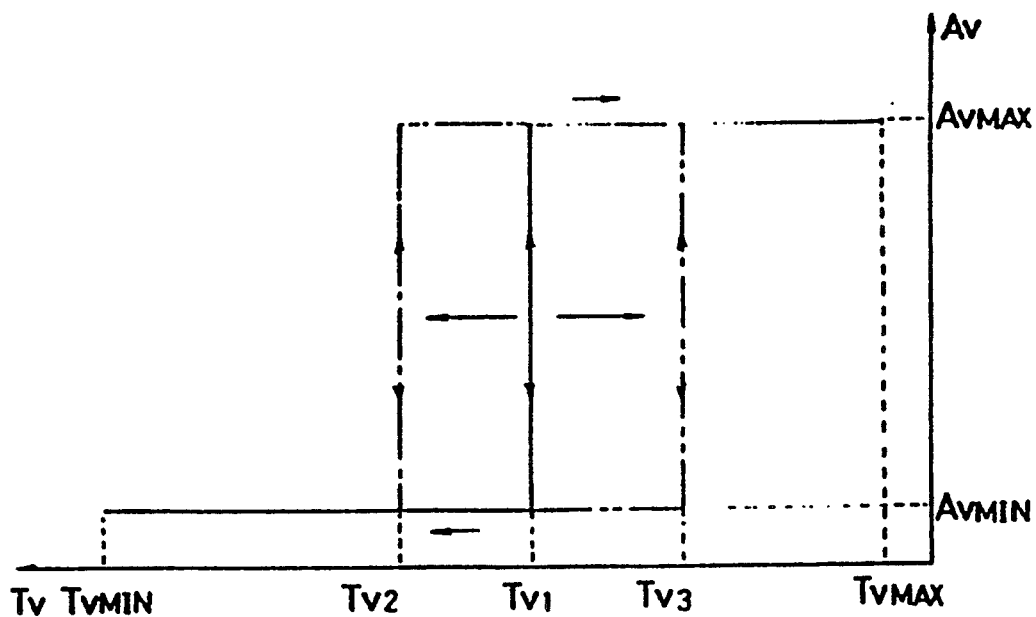
FIG. 15 is a diagram of the hyper-shutter speed priority automatic exposure mode shown in FIGS. 13 and 14.
Figure 18:
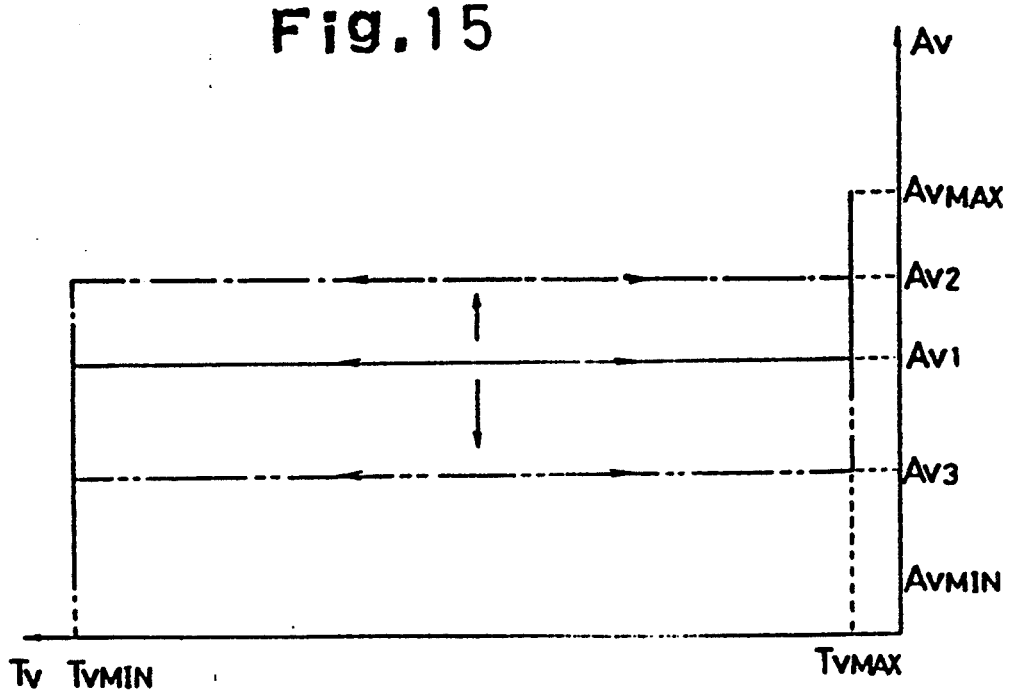
FIG. 18 is a diagram of the hyper-diaphragm priority automatic exposure mode shown in FIGS. 16 and 17.

In the second hyper-EE or ES automatic exposure mode, if the shutter speed or the diaphragm value having priority causes an under-exposure or an over-exposure, the shutter speed or the diaphragm value is modified to provide an optimum exposure (FIGS. 15 and 18).

Figure 14:
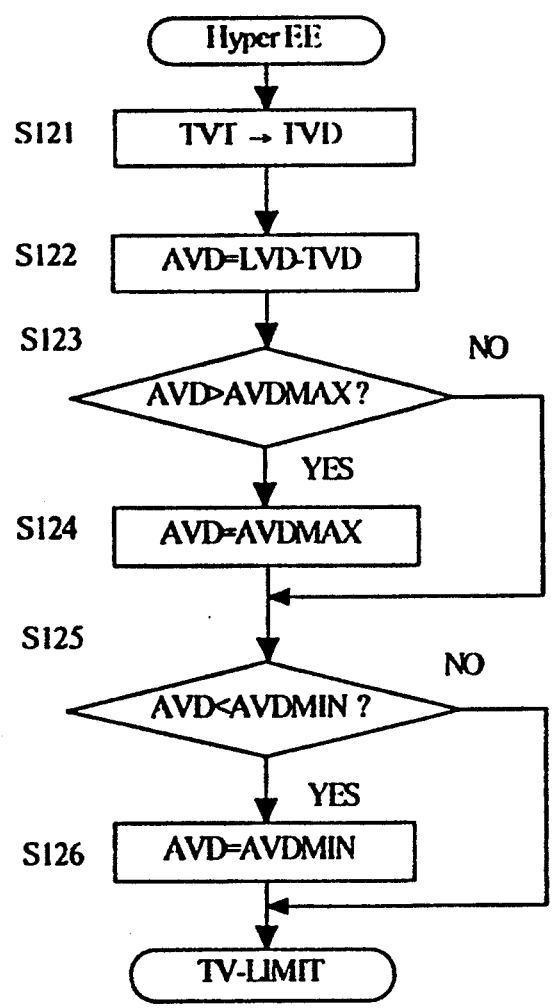
FIG. 14 is a flow chart of the hyper-shutter speed priority automatic exposure mode operation, according to another embodiment of the present invention.

The operations in the second hyper-EE automatic exposure mode and the second hyper-ES automatic exposure mode will be discussed below with reference to FIGS. 14 and 17, respectively.

In the second hyper-EE automatic exposure mode, the set shutter speed TVT stored in IPU 43 is read by the operation of the Tv electronic dial 17 to convert the same to the calculating shutter speed TVD, so that the optimum calculating diaphragm value AVD is calculated in accordance with the calculating shutter speed TVD and the calculating exposure value LVD (steps S121 and S122). If the optimum calculating diaphragm value AVD is within the diaphragm capability range, control enters step S132 of the hyper-ES automatic exposure mode, as can be seen in FIG. 16 (steps S123, S125 and S127).

If the optimum calculating diaphragm value AVD is greater than the calculating maximum diaphragm value AVDMAX (i.e., if the object is too bright), the calculating diaphragm value AVD is replaced with the calculating maximum diaphragm value AVDMAX. Then, control enters step S132. Conversely, if the optimum calculating diaphragm value AVD is less than the calculating minimum diaphragm value AVDMIN (i.e., if the object is too dark), control enters step S132 after the calculating diaphragm value AVD is replaced with the calculating minimum diaphragm value AVDMIN (steps S123, S125~S127).

In step S132 of the hyper-ES automatic exposure mode (diaphragm priority automatic exposure mode), the calculating shutter speed TVD is recalculated to modify the shutter speed.

Consequently, the diagrams as shown by a solid line, a dotted line and a two-dotted and dashed line in FIG. 15 are obtained. As can be seen in FIG. 15, the optimum exposure range is widened. This can be considered a kind of program automatic exposure mode, in which the shutter priority automatic exposure mode functions in a certain exposure range.

In the second hyper-ES automatic exposure mode, the set diaphragm value AVT stored in IPU 43 is read by the operation of the Av electronic dial 17 to convert the same to the calculating diaphragm value AVD, so that the optimum calculating shutter speed TVD is calculated in accordance with the calculating diaphragm value AVD and the calculating exposure value LVD (steps S151 and S152). If the optimum calculating shutter speed TVD is within the shutter capability range, the values are held and control enters step S102 of the hyper-EE automatic exposure mode in FIG. 13 (steps S153, S155 and S157).

If the optimum calculating shutter speed TVD is greater than the calculating maximum shutter speed TVDMAX (i.e., if the object is too bright), the calculating shutter speed TVD is replaced with the calculating maximum shutter speed TVDMAX. Then, control enters step S102 of the shutter priority automatic exposure mode.

Conversely, if the optimum calculating shutter speed TVD is less than the calculating minimum shutter speed TVDMIN (i.e., if the object is too dark), control enters step S102 after the calculating shutter speed TVD is replaced with the calculating minimum shutter speed TVDMIN. In step S102, the calculating diaphragm value AVD is recalculated to modify the diaphragm value (steps S103~S112).

Consequently, the diagrams as shown by a solid line, a dotted line and a two-dotted and dashed line in FIG. 18 are obtained. As can be seen in FIG. 18, the optimum exposure range is extended. This can be considered a kind of program automatic exposure mode in which the diaphragm priority automatic exposure mode functions in a certain exposure range.

Although the first and second hyper EE automatic exposure modes and the first and second hyper ES automatic exposure modes are separately explained, the operations these modes can be performed in the same camera. Namely, 2 bit signals of the exposure mode data of the E²PROM 43c included in IPU 43 correspond to those of the above-mentioned first and second methods in the hyper-EE and hyper-ES automatic exposure modes, respectively. The signal data is transferred to the CPU 41 by the CPU-IPU communication, so that the 2 bit signals can be determined, after the hyper-EE mode or the hyper-ES mode is detected, to switch the first or second hyper-EE and hyper-ES modes.

LA HYPER-MANUAL EXPOSURE MODE

Figure 19:
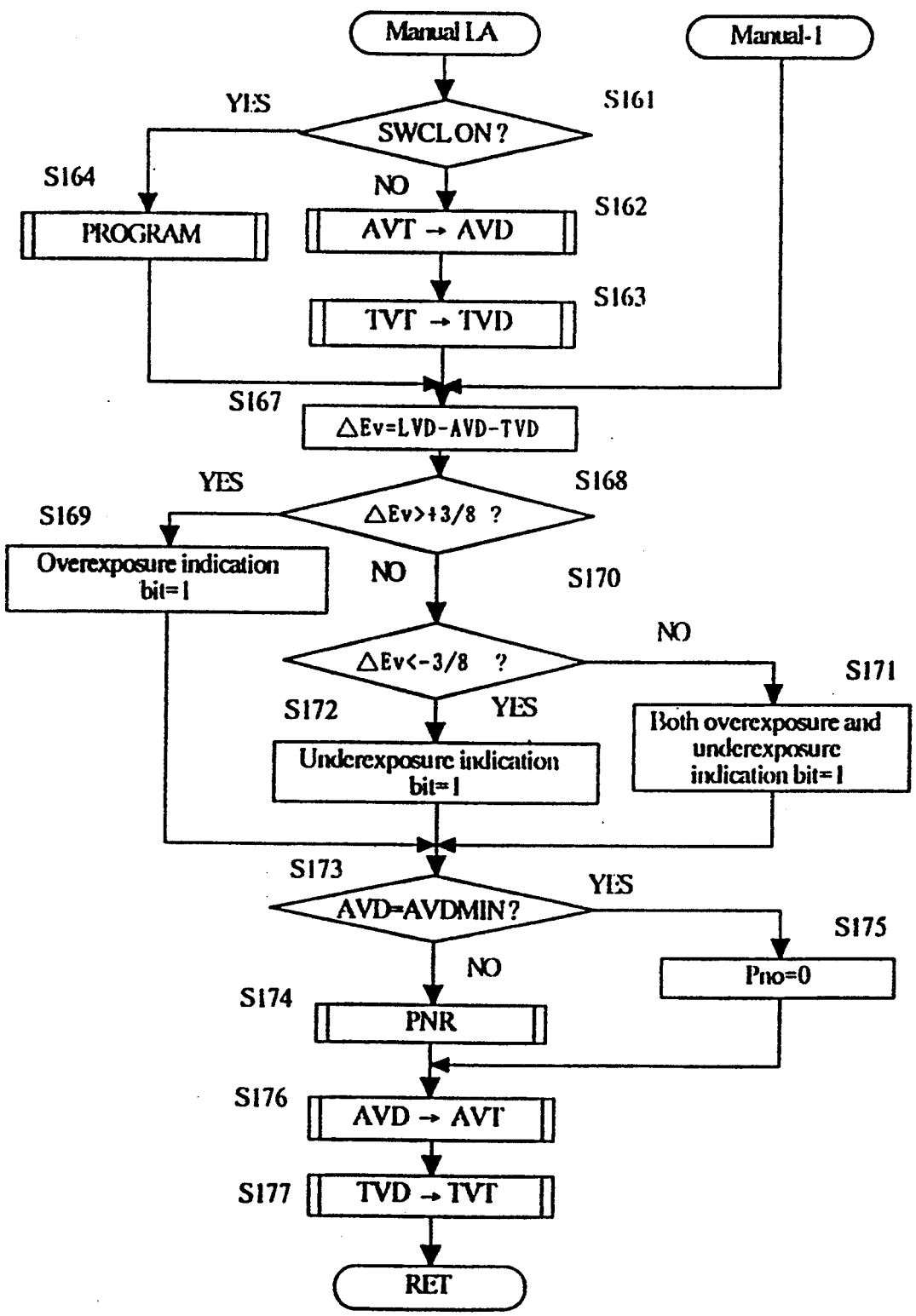
FIG. 19 is a flow chart of a LA manual exposure mode operation, according to still another embodiment of the present invention.
Figure 20:
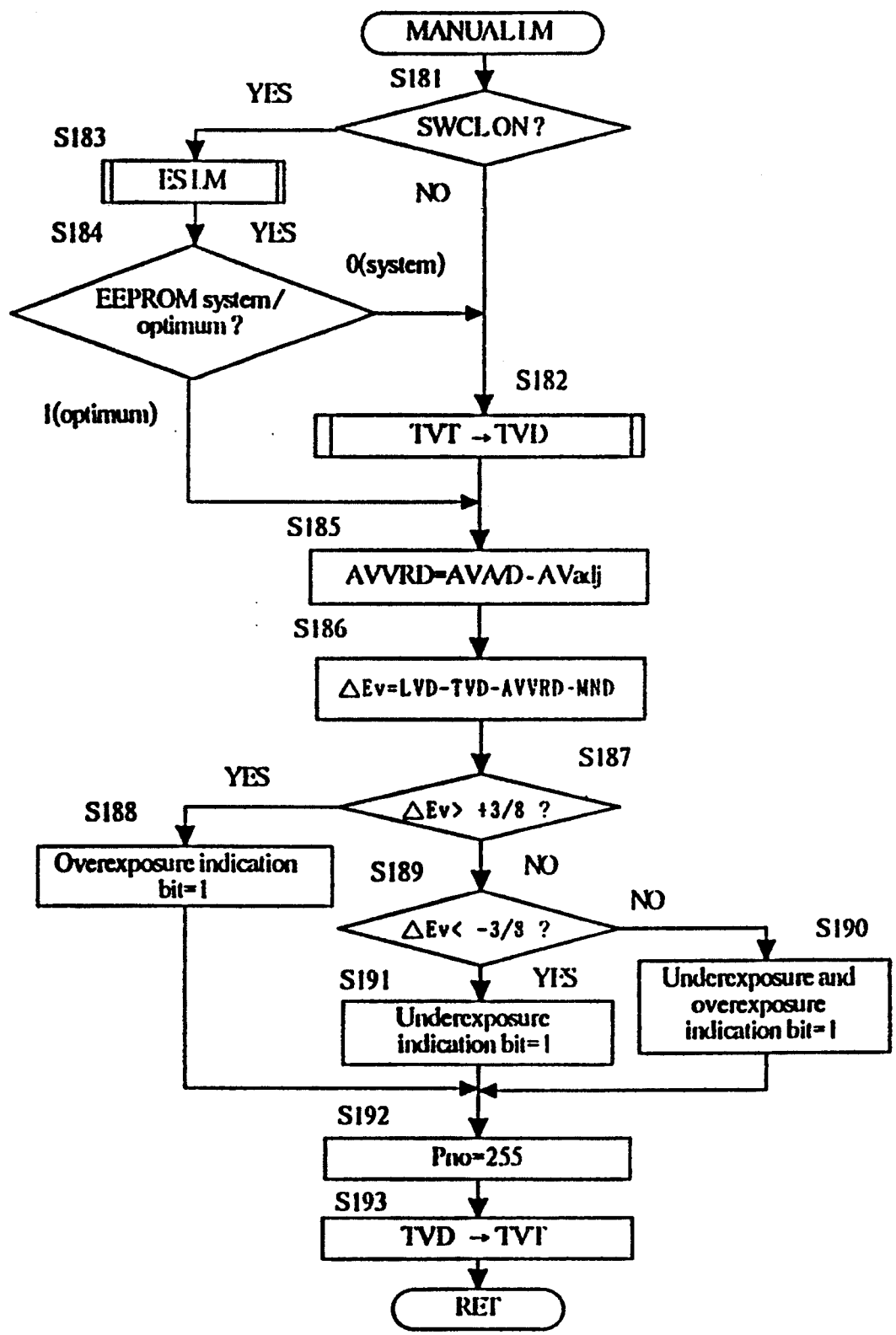
FIG. 20 is a flow chart of an LM manual exposure mode operation, according to the present invention.

The hyper-manual exposure mode, (body set mode) in which both the shutter speed and the diaphragm value can be manually set by the operation from the camera body side, will be discussed below with reference to FIG. 19.

In the hyper-manual exposure mode (lens-auto or body set mode), a photographer can set the exposure factors by actuating the electronic dials 17 and 19. However, when the clear button 23 is turned ON, the optimum exposure factors are automatically calculated in accordance with the object brightness Bv, based on the algorithm identical to that of the program exposure mode. When the clear button 23 is turned OFF, the calculated exposure factors are replaced with those which are manually set.

In the LA hyper-manual exposure mode, both the shutter speed Tv and the diaphragm value Av can be set when the Tv and Av electronic dials 17 and 19 are actuated, respectively. Furthermore, when the clear button 23 is turned ON, the function equivalent to the program automatic exposure mode can be performed. The set shutter speed Tv and diaphragm value Av are stored in the RAM 43b, of IPU 43 at predetermined addresses thereof and are indicated in the LCD panel 69 and the indicator unit 71 within the finder.

While the clear button 23 is turned ON, the calculating shutter speed TVD and the calculating diaphragm value AVD are calculated in accordance with the program exposure mode and the control then proceeds to step S167 (step S164).

If the clear button 23 is not turned ON, the set diaphragm value AVT and the set shutter speed TVT, transferred from IPU 43, are converted to the calculating diaphragm value AVD and the calculating shutter speed TVD, and control then proceeds to step S167 (steps S161~S163).

At step S167, an exposure error $\Delta Ev$ is calculated by the following equation, which is based on the optimum calculating exposure value LVD, obtained from the result of the actual photometering, and the exposure value (AVD+TVD), which is obtained by the calculating diaphragm value AVD, identical to the set calculating diaphragm value, and the calculating shutter speed TVD, identical to the set calculating shutter speed:

$$\Delta Ev = LVD - (AVD + TVD)$$

If the exposure error $\Delta Ev$ is within an allowable limit ($-\tfrac{3}{8} < \Delta Ev < +\tfrac{3}{8}$), overexposure and underexposure indication bits are set to illuminate a pair of LED exposure indicating elements 71a and 71b (FIG. 42E) in the indicator unit 71 within the finder (steps S168, S170, S171).

If the exposure error ΔEv is greater than the allowable upper limit, only the overexposure indication bit is set to illuminate the indicating element 71a, to thereby indicate an over-exposure (steps S168 and S169). Conversely, if the exposure error ΔEv is less than the allowable lower limit, only the underexposure indication bit is set to illuminate the indicating element 71b to thereby indicate an under-exposure (steps S168, S170 and S172). Although the allowable limit of exposure error ΔEv is ±⅔ Ev in the illustrated embodiment, another limit may be selected. Furthermore, the upper limit value and the lower limit value can be different from each other. It is also possible to read the latitude of the loaded film from the DX code so that the allowable limit is determined to be identical to that of the film latitude.

Thereafter, the number PN of EE pulses is obtained from the calculating diaphragm value AVD (steps S173, S174 and S175), and the calculating diaphragm value AVD and the calculating shutter speed TVD are converted to the transferring diaphragm value AVT and the transferring shutter speed TVT, respectively.

When the clear button is turned OFF after being ON, the optimum exposure value in the program exposure mode is converted to the series value at steps S162 and S163, which will be discussed hereinafter, and is stored at predetermined addresses of the RAM 41b with the accuracy equivalent to that of the manual mode.

As can be understood from the foregoing, since, when the clear button 23 is turned ON in the hyper-manual exposure mode, both the shutter speed Tv and the diaphragm value Av are modified to optimum values depending on the photometering data (object brightness By) in accordance with the program exposure mode, the optimum exposure value can be manually and quickly set by a simple operation. Although the calculation of the optimum exposure factors continues while the clear button 23 is turned ON in the above mentioned embodiment, it is possible to calculate the exposure factors and store the same in the RAM 41b only when the clear button 23 is switched from OFF to ON. In this alternative, at step S161 it is determined, whether the clear button 23 is switched from OFF to ON.

SECOND LA HYPER-MANUAL EXPOSURE MODE

In the above mentioned embodiment, the diaphragm value Av and the shutter speed Tv are modified to those detected by the photometering operation, in accordance with the program automatic exposure mode, when the clear button 23 is turned ON. It is possible to modify only one of the exposure factors Av and Tv to an optimum value. Furthermore, it is also possible to set the exposure factor or factors at the rounded or system Av and Tv values instead of the optimum exposure value Ev. The rounded for system) values referred to herein mean values having steps (accuracies) which can be manually set and obtained by rounding calculated APEX values, taking into account the step of the APEX values calculated by CPU 41 being smaller than that of the manually set APEX values.

Figure 25:
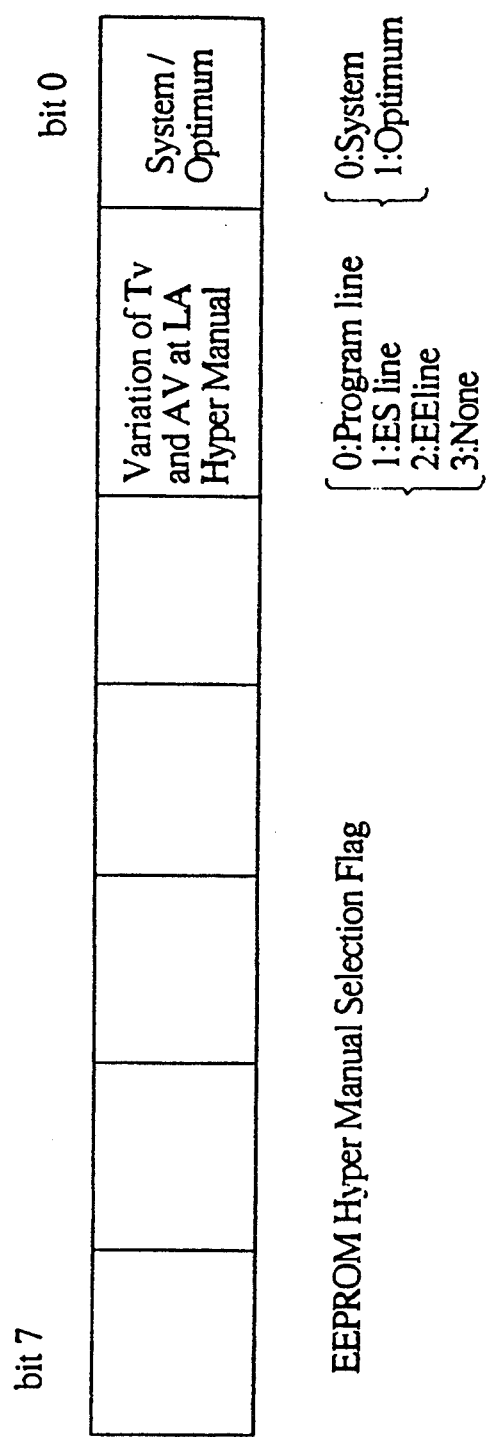
FIG. 25 is a view showing an example of a hyper-manual select flag.

Selection of the optimum value and the rounded value is determined in accordance with one bit of the hyper manual select flag of the E²PROM 43c. In the illustrated embodiment, as can be seen in FIG. 25, when the O-order bits are "0" and "1", the optimum value and the rounded value are selected, respectively. Furthermore, the kind of automatic exposure mode is determined in accordance with the first and second bits of the flag. The bit data can be preset when the camera is shipped or can optionally be set and modified by a photographer.

Figure 24:
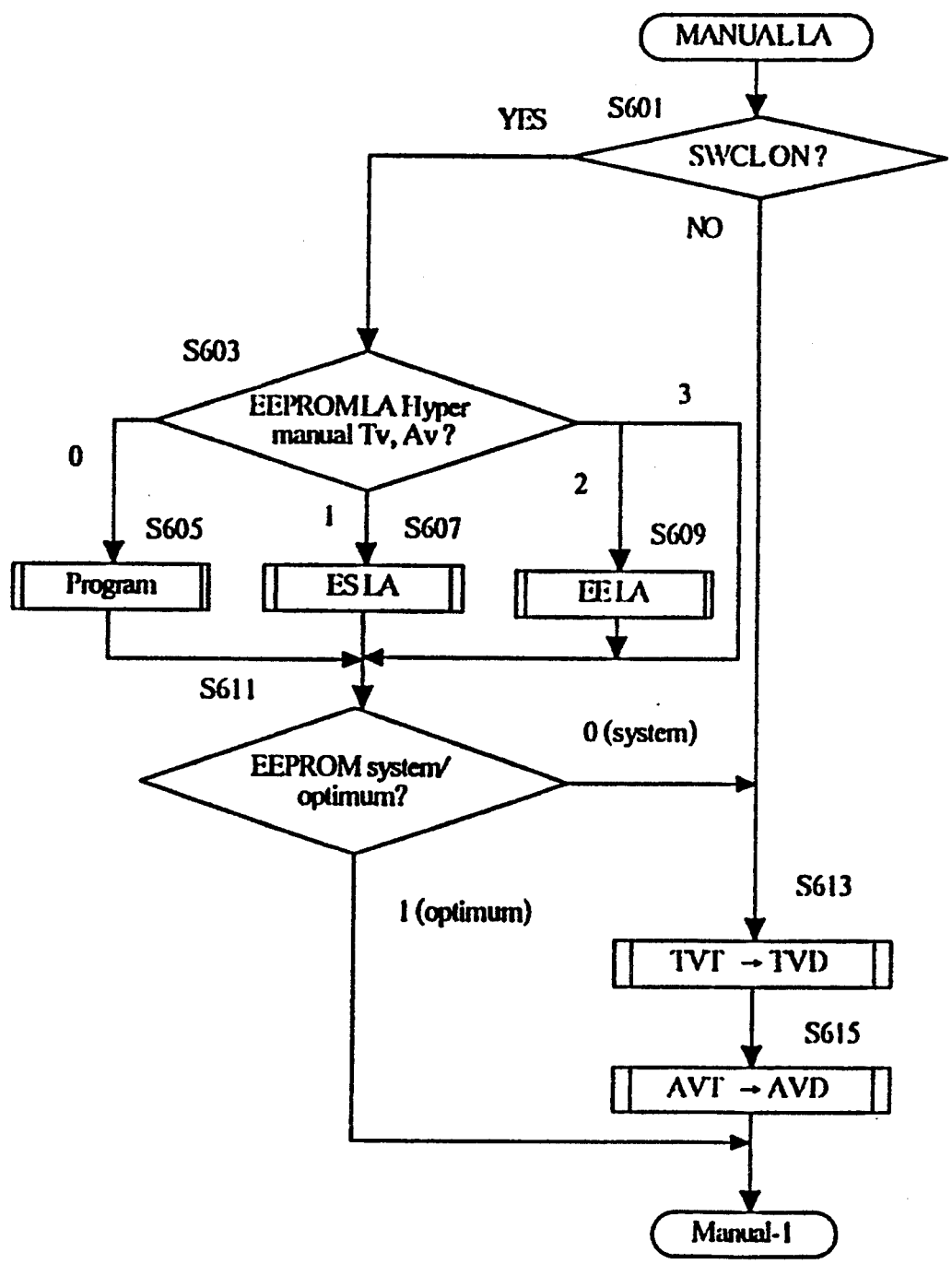
FIG. 24 is a flow chart of an LA hyper-manual exposure mode operation, according to the present invention.

FIG. 24 shows a flow chart of an example in which at: least one of the exposure factors is modified to an optimum value and an example in which the optimum/system value selection is effected in combination, using the data of the hyper manual select flag of E²PROM 43c within IPU 43. The data of the E²PROM 43c is stored in RAM 43b of IPU 43 upon operation, and the same data is transferred to CPU 41 also to be stored in RAM 41b thereof by the CPU-CIP communication.

The state of the clear button 23 is checked at Step S601. If the clear button 23 is turned ON, control proceeds to step S603, at which point the modifying mode Tv and Av in the LA hyper-manual mode, in accordance with the hyper-manual select flag data, is checked. In the illustrated embodiment, the first and second bits of the hyper-manual select flag data are used. If the value represented by the 2 bits is "0", "1" and "2", control proceeds to step S605 (program automatic exposure mode operation), step S607 (LA diaphragm priority automatic exposure mode operation), and step S609 (LA shutter priority automatic exposure mode operation), respectively. If the value represented by the 2 bits is "3", control proceeds to step S611 without performing the exposure mode operation. Consequently, the calculating shutter speed TVD, the calculating diaphragm value AVD, the indicating shutter speed TVT, and the indicating diaphragm value AVT are memorized in the RAM 41b of the CPU 41.

Thereafter, the system/optimum bits of the select flag data are checked at step S611. If the value represented by the bits is "0", the control proceeds to step S163 (system value setting operation) and if the value is "1", the control proceeds directly to the sub-routine of the Manual-1 (optimum value setting operation).

The optimum value setting operation is the same as that of the first embodiment. The system value setting operation will be explained below. The calculation of AVTD and TVTD subsequent to the operations at steps S605, 5607 and S609 means that the calculating shutter speed TVD (S613) and the calculating diaphragm value AVD (S615) are calculated again after the calculating optimum values AVD and TVD are obtained, based on the indicating optimum values TVT and AVT which are obtained in accordance with the obtained calculating optimum values AVD (=AVT) and TVD (TVT) (by the last calculation of AVDT and TVDT in the sub-routine of steps S605, S607 and S609). As a result, the calculating optimum diaphragm values AVD and the calculating optimum shutter speed TVD once obtained are replaced with the calculating system diaphragm value and the calculating system shutter speed, respectively. The operations subsequent to step 167 are identical to those in the first embodiment.

In the second embodiment mentioned above, six kinds of LA hyper-manual exposure modes (control modes) below can be selected:

1 Exposure control by the optimum shutter speed Tv and the optimum diaphragm value Av, which are obtained when the clear button 23 is actuated in the program automatic exposure mode (first embodiment);

2 Exposure control by the system (rounded) shutter speed Tv and the system (rounded) diaphragm value Av, which are obtained when the clear button 23 is actuated in the program automatic exposure mode;

3 Exposure control by the optimum diaphragm value Av, which is obtained when the clear button 23 is actuated in the shutter speed priority automatic exposure mode;

4 Exposure control by the system (rounded) diaphragm value Av, which is obtained when the clear button 23 is actuated in the shutter speed priority automatic exposure mode;

5 Exposure control by the optimum shutter speed Tv, which is obtained when the clear button 23 is actuated in the diaphragm priority automatic exposure mode; and 6 Exposure control by the system (rounded) shutter speed Tv, which is obtained when the clear button 23 is actuated in the diaphragm priority automatic exposure mode.

LM HYPER-MANUAL EXPOSURE MODE

Figure 17:
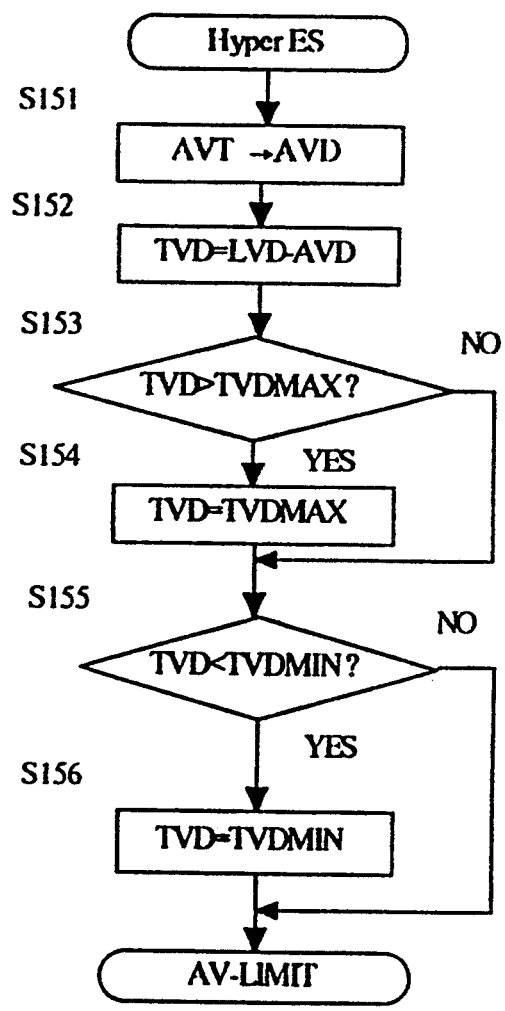
FIG. 17 is a flow chart of the hyper-diaphragm priority automatic exposure mode operation, according to another embodiment of the present invention.

The following discussion will be directed to the hyper-manual exposure mode (lens-manual mode), in which the shutter speed is set on the camera body side and the diaphragm value is set by the taking lens 65, with reference to FIG. 17.

In the LM hyper-manual exposure mode, the shutter speed Tv is manually set by adjusting the Tv electronic dial 17. However, when the clear button 23 (clear switch SWCL) is turned ON, the shutter speed is automatically modified to an optimum value in accordance with the object brightness Bv.

If the clear button 23 is not turned ON, the transferring shutter speed TVT (value of ½ EV step) sent from IPU 43 is directly converted to the calculating shutter speed TVT (steps S181 and S182). Thereafter, control proceeds to step S185.

Conversely, if the clear button 23 is turned ON, the shutter speed Tv is calculated in accordance with the lens-manual diaphragm priority (ES) automatic exposure mode, which will be discussed hereinafter, based on the diaphragm value which is set by the diaphragm ring of the taking lens 65 and which is inputted through the diaphragm volume 53 and the A/D converter 51 by step S15 in FIG. 5 (steps S181 and S183). Thereafter, the selection of the system/optimum values is effected similar to the LA hyper-manual exposure mode at step S184. If the system value is selected, the calculation of TVDT is effected for the same reason as that in the LA hyper-manual exposure mode.

At step S185, the calculating diaphragm value AVVRD is calculated, based on the diaphragm value Av converted to the digital value AvA/D and set by the diaphragm ring of the taking lens 65 and based on the adjusting value Avadj peculiar to the camera body 11. Consequently, the exposure error ΔEv is obtained by the following equation (step S186):

$$\Delta Ev = LVD - TVD - AVVRD - MND$$

If the exposure error ΔEv is within the allowable limit, the overexposure and underexposure indication bits are set. If the exposure error ΔEv is greater than the upper limit value, the overexposure indication bit data is set, and if the exposure error ΔEv is less than the lower limit value, the underexposure indication bit data is set (steps S187~S191). Thereafter, the EE pulse number PN is set to the greatest value (255 in the illustrated embodiment), and the calculating shutter speed TVD is converted to the transferring shutter speed TVT. This completes the exposure factor setting operation (steps S192 and S193). The reason that the EE pulse number PN is set to the greatest value is to ensure that the stop-down mechanism of the camera body 11 is driven to an extreme stop-down position corresponding to the diaphragm value set by the diaphragm ring of the taking lens 65.

As can be seen from the foregoing, according to the present invention, since the shutter speed Tv is set to the optimum value or the rounded system value obtained in the diaphragm priority automatic exposure mode when the clear button 23 is turned ON in the LM hyper-manual exposure mode, the optimum exposure value can be manually and quickly obtained by a simple operation.

LM DIAPHRAGM PRIORITY AUTOMATIC EXPOSURE MODE

Figure 21:
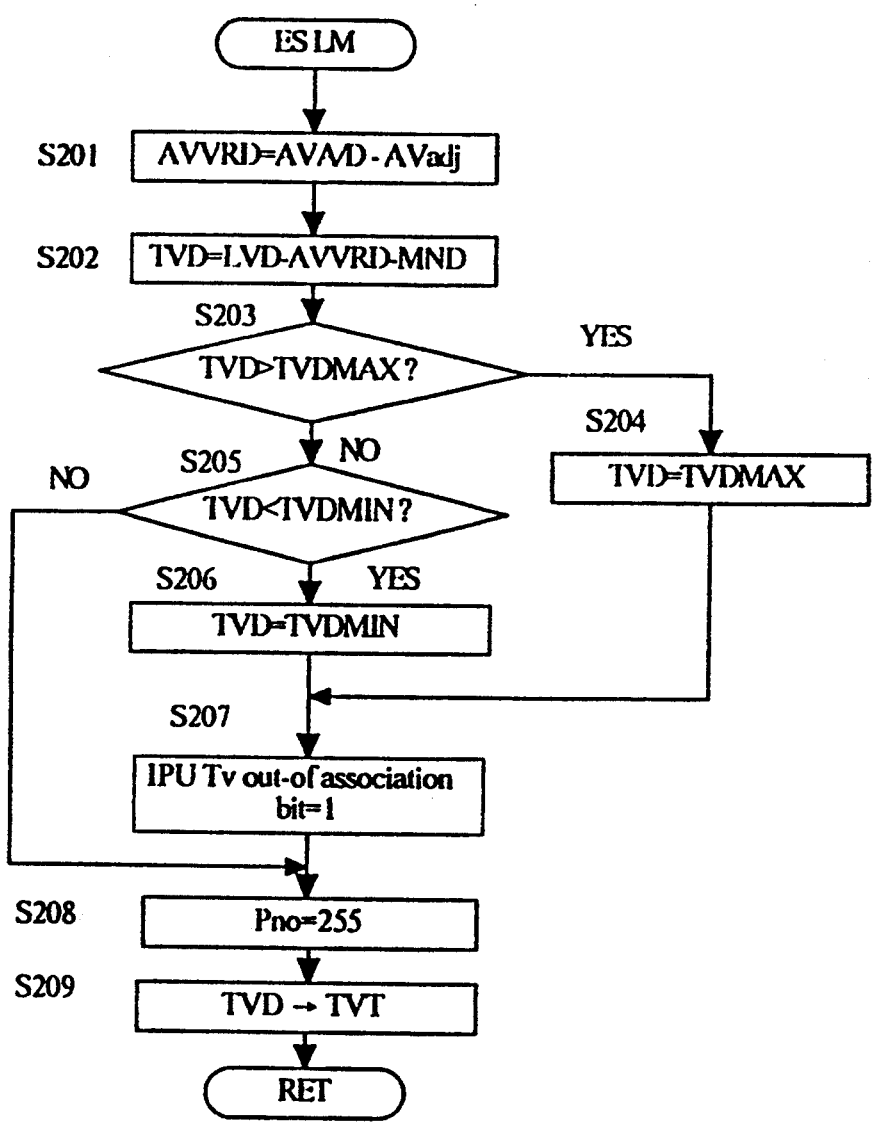
FIG. 21 is a flow chart of an LM aperture priority automatic exposure mode operation, according to the present invention.

The following discussion will be addressed to the lens-manual diaphragm priority (ES) exposure mode, in which the diaphragm is set by the diaphragm ring of the taking lens 65, with reference to FIG. 21.

The calculating diaphragm value AVVRD is calculated in accordance with the converted diaphragm value AvA/D which is obtained by converting the diaphragm value Av set by the diaphragm ring of the taking lens 35, and the inherent adjusting value AVADJ of the camera body 11 (step S201). Based on the AVVRD value thus obtained, the calculating shutter speed TVD is calculated by the following equation (step S202):

$$TVD = LVD - AVVRD - MND$$

Thereafter, if the calculating shutter speed TVD is within the shutter capability range, the EE pulse number PN is set to be the largest value (steps S203, S205, S208). If the calculating shutter speed TVD is greater than the calculating maximum shutter speed TVMAX, or less than the calculating minimum shutter speed TVMIN, the calculating shutter speed TVD is replaced with the calculating maximum shutter speed TVMAX (steps S203 and S204), or with the calculating minimum shutter speed TVMIN (steps S203, S205 and S206). Thereafter, the EE pulse number PN is set at the largest value after the Ev out-of-association bit is set (steps S207, S208).

Finally, the calculating shutter speed TVD is converted to the transferring shutter speed to be transferred to IPU 43 to thereby complete the operation (step S209).

LA, LM BULB EXPOSURE MODE

Figure 22:
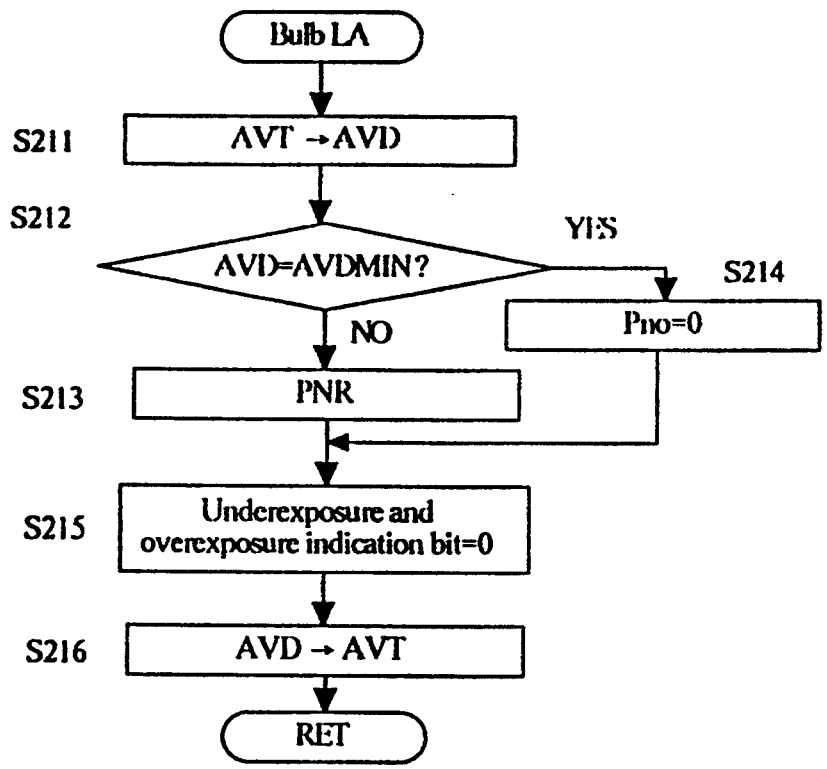
FIGS. 22 and 23 are flow charts of an LA bulb and LM bulb exposure mode operation, respectively, according to the present invention.
Figure 23:
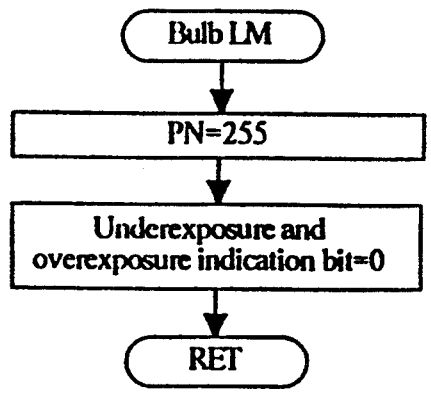

The bulb exposure mode will be discussed below with reference to FIGS. 22 and 23.

In the lens-auto bulb exposure mode, the transferring diaphragm value AVT set by the Av electronic dial 19 is read through the CPU-IPU communication and converted to the calculating diaphragm value AVD (step S211). Thereafter, the EE pulse number PN corresponding to the calculating diaphragm value AVD is calculated (steps S212 and S213), the underexposure and overexposure indication bits are reset. Then, the calculating diaphragm value AVD is again converted to the transferring diaphragm value AVT (steps S215 and S216). The operation is thus completed. If the calculating diaphragm value AVD is identical to the calculating minimum diaphragm value AVDMIN, the EE pulse number PN is set at "0" (steps S212, S214).

In the lens-manual bulb exposure mode, the EE pulse number PN is set at the greatest value, so that the stop-down mechanism can be driven to the diaphragm value set by the diaphragm ring of the taking lens. Thereafter, the underexposure and overexposure indication bits are reset to finish the operation.

IPU MAIN ROUTINE

Figure 26:
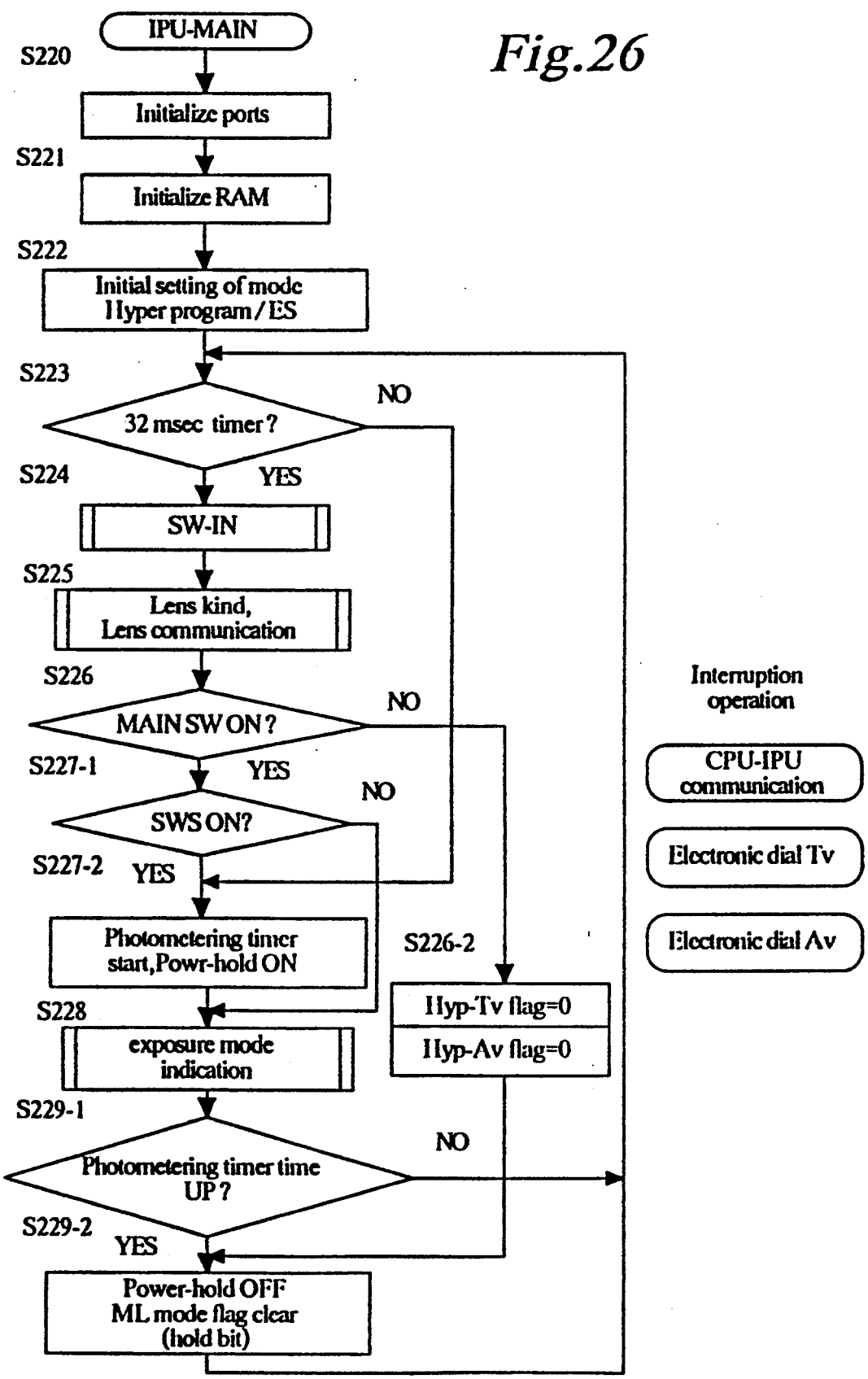
FIG. 26 is a flow chart of a main operation of an IPU, according to the present invention.

The above explanation has been directed to the operations of CPU 41. The main routine of IPU 43 will be explained below (FIG. 26). The photographic data, such as the manually set diaphragm value Av and shutter speed Tv, the indicating diaphragm value Av and shutter speed Tv, the selected exposure modes, the transferring diaphragm value AVT and shutter speed TVT transferred through the communication between CPU 41 and the taking lens, the maximum F number FNo, and the minimum F number FNo are stored in internal RAM 43b of IPU 43 at different addresses thereof.

IPU 43 always operates when the battery is in the camera performing IPU-MAIN, shown in FIG. 26. IPU 43 first initializes the ports thereof and initializes RAM 43b to carry out the initial setting of the modes (steps S220~S222). Thereafter, the exposure mode is set to its initial mode. The initial mode is determined in accordance with the state of port PLO of IPU 43, and is either the hyper program exposure mode or the diaphragm priority automatic exposure mode corresponding to the case of the lens-auto mode and the lens-manual mode, respectively.

Thereafter, intermittent operations are repeated by the 32 ms timer (steps S223~S229-2). IPU 43 performs the following intermittent operations: When the set time of the 32 ms timer is up, the switch inputs, i.e., the levels of switch input ports PC0~PB5 are successively inputted to IPU 43. If the level of the ports is "L" (ON), the input operation corresponding to the switches and the determination of the type of taking lens are performed, so that the data, such as the modes set by the switches or the lens type data, etc., is written into RAM 43b, and the lens data is inputted to IPU 43 through the communication with the lens (steps S223~S225). If the time of the 32 ms timer is not up, control jumps to step S228 (steps S223 and S228).

Thereafter, whether the main switch SWMAIN is turned ON is checked. If the main switch is turned OFF, the Hyp-Tv flag and the Hyp-Av flag are reset to turn the power-hold OFF (i.e., turn the main power source of CPU 41 OFF). Thereafter, the ML mode flag is reset (i.e., the hold bit is cleared), and control is then returned to step S223 (steps S226, S226-2, S229-2). If the main switch SWMAIN is turned ON, it is checked whether the photometering switch SWS is turned ON. If the photometering switch SWS is turned ON, which usually means the picture taking operation has already begun, the photometering timer starts and the power-hold is activated to actuate CPU 41 (steps S226, S227-1, S227-2 and S228). Thereafter, control proceeds to step S228. Conversely, if the photometering switch SWS is not turned ON, control skips the start of the photometering timer and the power-hold operation to step S228 (steps S226, S227-1 and S228).

In step S228, the diaphragm value (F) and the shutter speed (S-1) etc., used in the photographing operation at the selected photographic mode are indicated in the LCD panel 69 and the indicator unit 71 within the finder. Thereafter, it is checked whether the set time of the photometering timer is up. If the set time is up, the power-hold is inactivated and control is then returned to step S223. Conversely, if the time is not up, control is directly returned to step S223 (steps S229-1, S229-2, S223).

If the intermittent operation by the timer is interrupted by the communication with CPU41, the communication is performed. Similarly, if the electronic dials 17 and 19 are rotated, the electronic dial setting is carried out. Note that when the main switch SWMAIN is turned OFF, interruption does not occur.

COMMUNICATION WITH LENS

Figure 27:
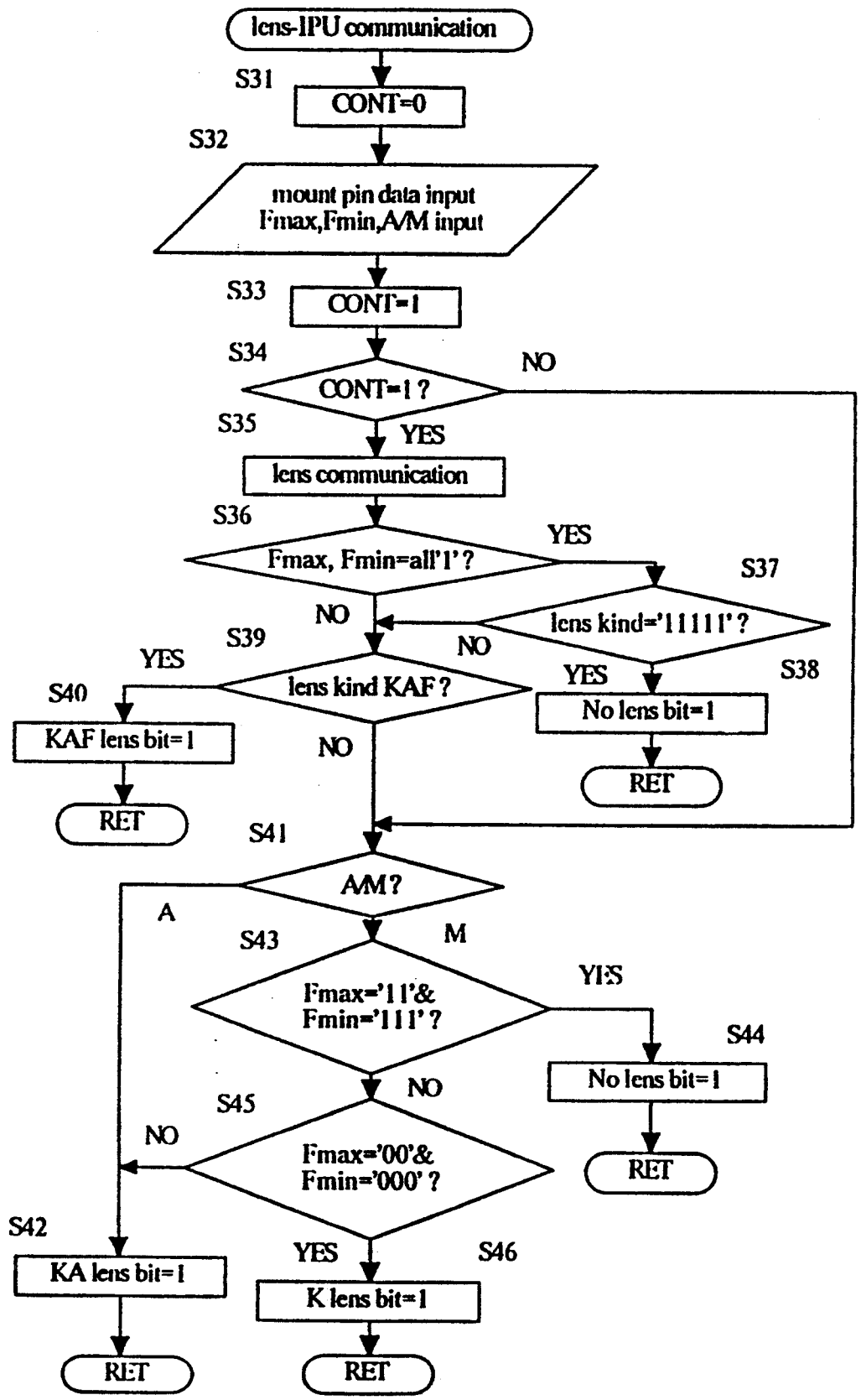
FIG. 27 is a flow chart of a communication operation between an IPU and a taking lens, according to the present invention.

The sub-routine of the communication with the lens CPU at step S225 will be described below with reference FIG. 27. CPU 43 drops the level of pin CONT to "L" (Logic "0"), and receives the mount pin data (open F number Fmin, the maximum F number Fmax, and Auto/Manual (A/M) data input thereto (steps 531 and S32). As disclosed in Japanese Patent Kokai (Unexamined Publication) No. SHO 63-184719, filed in the name of the assignee of the present application, and corresponding to U.S. Pat. Nos. 4,841,322 and 4,945,376, the entire disclosures of which are expressly incorporated herein by reference, the pins of the taking lens coming into contact with the pins RES/Fmin3, SI/Fmin2, Fmax1, Fmax2 and −SCK− /Fmin1 are connected to the transistors, so that the maximum F number Fmax of 2 bits and the open F number Fmin of 3 bits are constituted by the levels thereof in combination depending on the ON/OFF states of the transistors. Pin A/M is connected to the A/M selection switch SWA/M, so that the diaphragm Auto/Manual data of 2 bits is constituted by the ON/OFF states of the A/M selection switch.

CPU 41 inverts the level of the pin CONT into logic "1" (i.e., level "H") to determine the presence of the automatic focusing (AF) lens KAF attached to the camera body and the kind of the attached lens (steps S33 and S34). The taking lens, which can be discriminated in the present invention, is a manual lens K having no mount pin, an auto lens KA having the mount pins but no lens ROM, or an auto AF lens KAF having the mount pins and the lens ROM.

If the level of the pin CONT is "1", the communication with the taking lens 65 is carried out and the lens data is input (steps S34 and S35). If the levels of the mount pins Fmax1, Fmax2, Fmin1, Fmin2 and Fmin3 are all "1", and if the 5 bits representing the kind of lens are "11111", it is determined that there is a problem with the lens. Accordingly, no lens bit NoLens is set and control is returned (steps S36, S37 and S38). If the level of at least one of the mount pins Fmax1~Fmax2 and Fmin1~Fmin3 is "0" and if the kind of lens discriminated is the AF lens KAF, AF lens KAFLens bit is set 1 control is returned (steps S36, S39 and S40).

Otherwise, it is determined whether or not the mode is the lens auto mode or the lens-manual mode. If the mode is the lens-auto, the auto lens KALens bit is set 1 control is returned (steps S34~S36, S39, S41, S42).

If the mode is the lens-manual and if the levels of pins Fmax1 and Fmax2 are "11" and the levels of the pins Fmin1~Fmin3 are "111", the no lens flag (NoLens bit is set to 1 and control is returned, since the taking lens not attached to the camera body (steps S43 and S44).

If the mode is the lens-manual mode and if the levels of the pins Fmax 1 and Fmax2 are "00" and the levels of the pins Fmin1~Fmin3 are "000", the lens is the manual lens K. Accordingly, the manual lens flag (KLens bit) is set to 1 and control is returned (steps S45 and S46).

Unless the levels of the pins Fmax1 Fmax2, Fmin1∼Fmin3 are all "1" or "0", the lens is the auto lens KALens in the lens-manual mode. Accordingly, the auto lens KAlens bit is set and the control is returned (steps S41. S43, S45 and S42).

Thus, the type of lens, the lens data, and the lens Auto/Manual data are set in the memory of IPU 43 and are transferred to the CPU 41.

Figure 28:
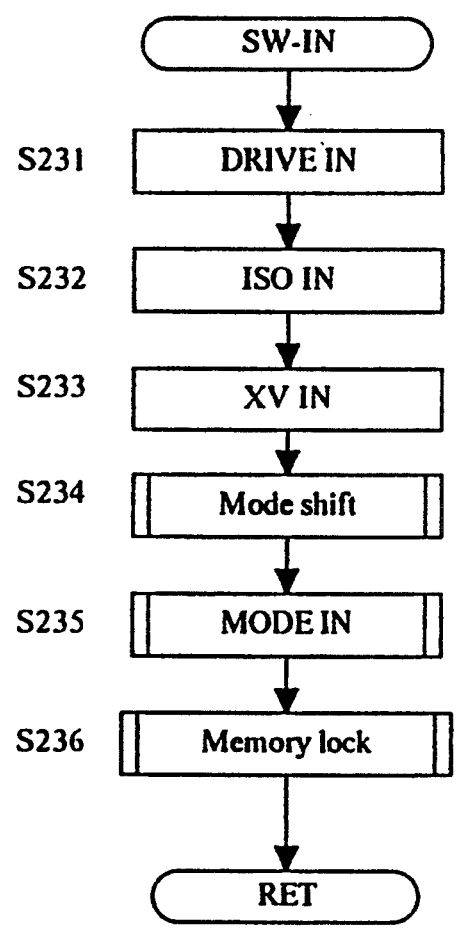
FIG. 28 is a flow chart of a switch input operation.

FIG. 28 shows a sub-routine of the switch input operation at step S224. If any one of the drive switch SWDRIVE, the ISO sensitivity setting switch SWISO, the exposure correcting switch SW±EF, and the exposure mode switch SEMODE is turned ON, the operation in the corresponding sub-routine (Note: only the mode shift and MODE IN sub-routines are shown in FIG. 28) is performed (steps S231∼S233). Upon completion of the input operation, the mode shift operation, the MODE IN operation, and the memory lock operation are effected and control is returned (steps S234∼S236). The mode shift sub-routine, the MODE IN sub-routine and the memory lock sub-routine will be discussed hereinafter.

OPERATION OF ELECTRONIC DIALS

Figure 29:
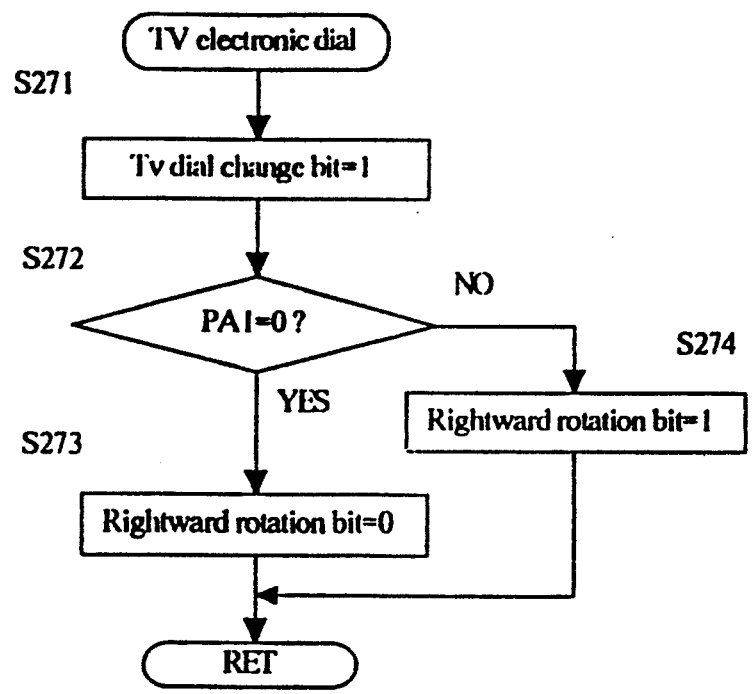
FIG. 29 is a flow chart of a Tv electronic dial operation.
Figure 30:
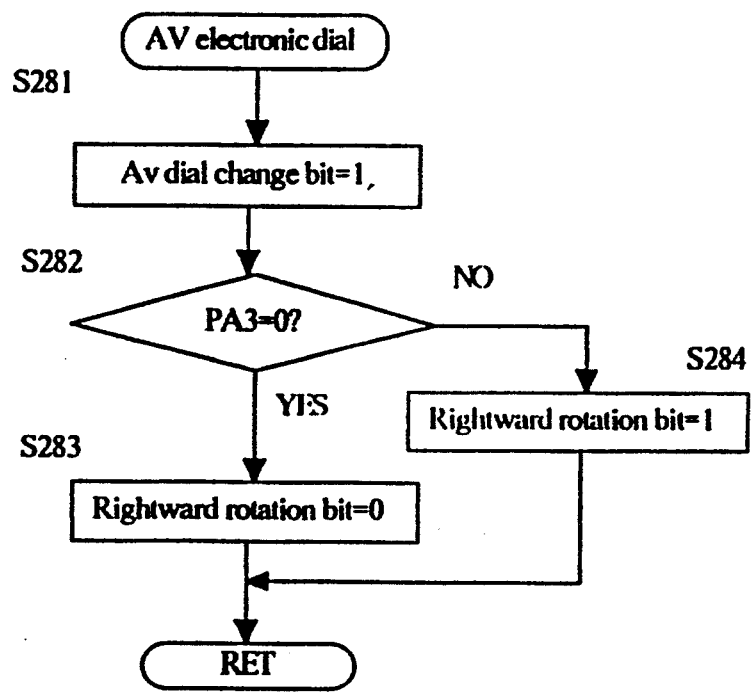
FIG. 30 is a flow chart of a diaphragm value AV changing operation as effected by an Av electronic dial.

FIGS. 29 and 30 show the sub-routines of the operations of the Tv and Av electronic dials 17 and 19. The main routine is interrupted by these sub-routines when the Tv or Av electronic dial 17 or 19 is rotated, so that any one of the ports PA0, PA1, PA2, PA3 is turned ON to set the associated Tv or Av dial change bit (steps S271, S281).

When the Tv electronic dial 17 is rotated, the direction of the rotation of the Tv electronic dial 17 is checked at step S272. If the Tv electronic dial 17 is rotated to the right (clockwise) direction, port PA0 is set at "0" (port PA1 remains at "1"), and the clockwise rotation bit is set. If the Tv electronic dial 17 is rotated to the left (counterclockwise) direction, port PA1 is set at "0" (port PA0 remains at "1"), and the right direction bit is reset. Then the control is returned (steps S273 and S274).

Similarly, when the Av electronic dial 19 is rotated, the Av dial change bit is set, and the right direction bit is set or reset (steps S282∼S284). The electronic dial change bits and the right direction bits are used in the setting operations of the Av and Tv electronic dials 17 and 19 and the exposure mode selecting operation, etc., which will be explained below.

Setting of Tv, Av Electronic Dials

Figure 31:
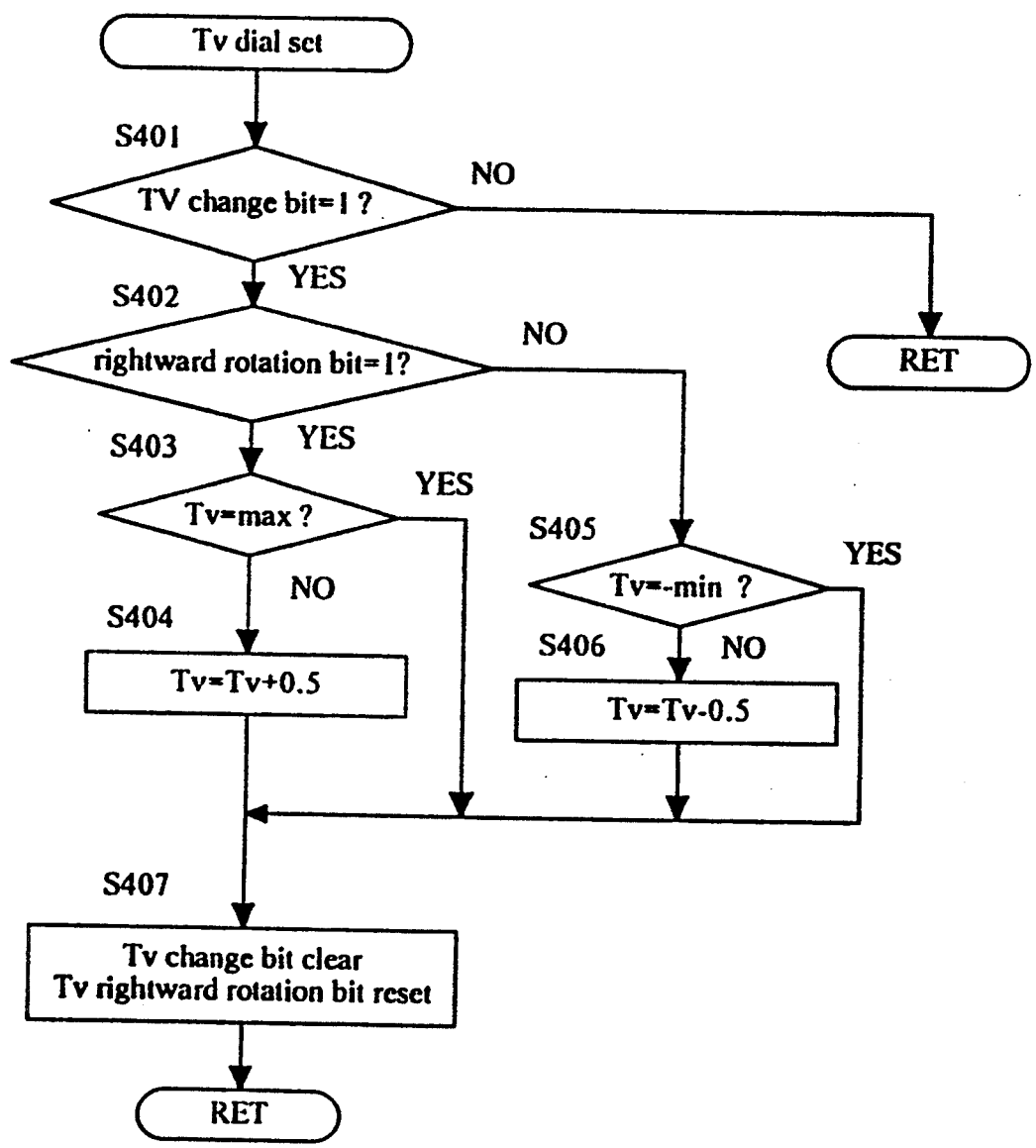
FIG. 31 is a flow chart of an Av electronic dial operation.
Figure 32:
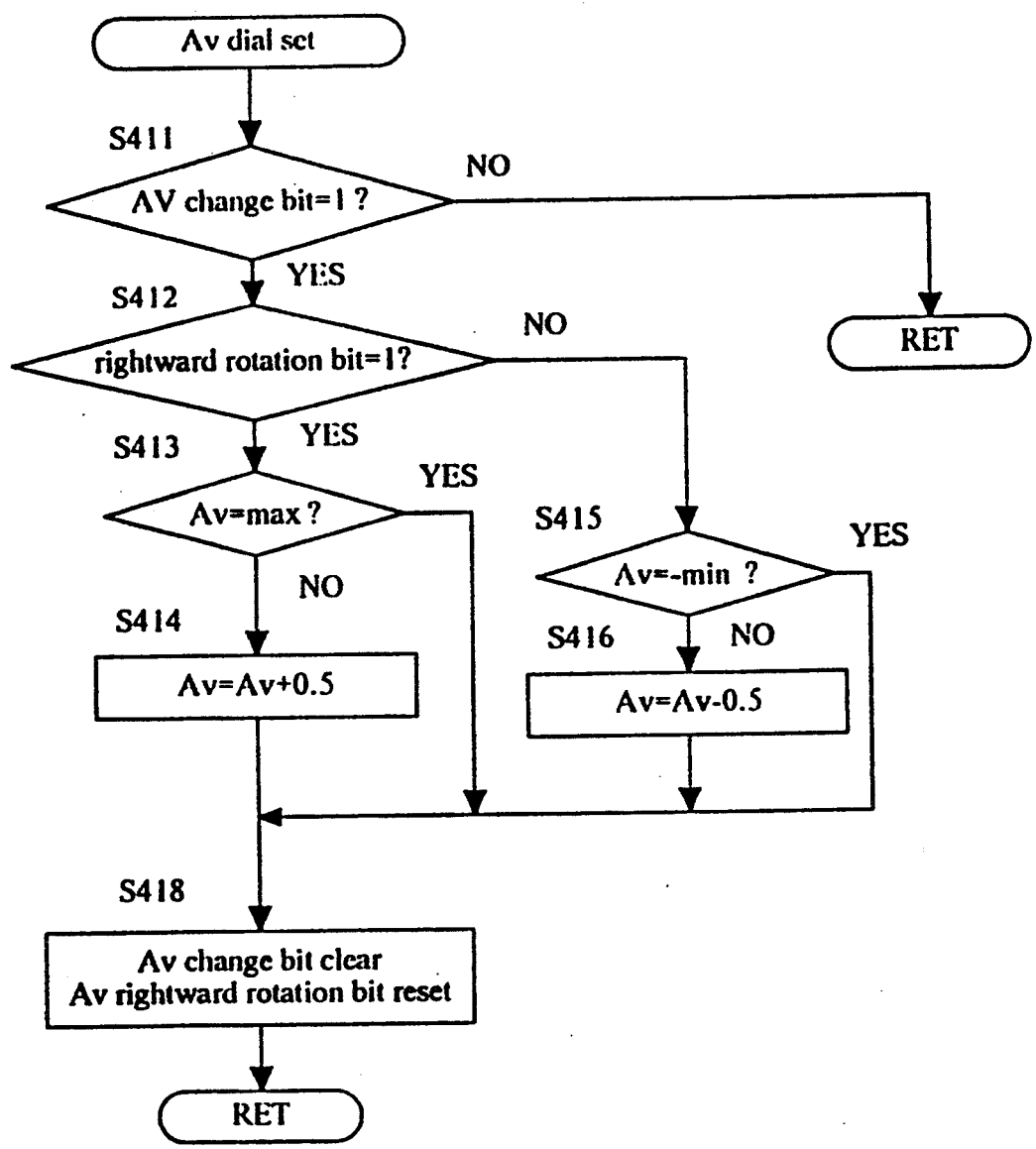
FIG. 32 is a flow chart of a shutter speed changing operation as effected by a Tv electronic dial.

The following discussion will be addressed to the operation of IPU 43 in accordance with the sub-routine shown in FIGS. 31 and 32 when the electronic dial 17 or 19 is actuated in a specific exposure mode.

The specific exposure mode in the illustrated embodiment is either the program mode, the limited program mode, the hyper-program mode, the EE automatic mode, the lens-auto ES automatic mode, or the manual mode. Furthermore, in the illustrated embodiment, the shutter capacity of the camera is 30 sec.∼1/8000 sec. (Tv=−5Tv∼+13Tv) and the diaphragm capacity is the open F number Fmin (=Avmin) read from the taking lens through the maximum F number Fmax (=Avmax). For clarification, it is assumed that Tv and Av are both ½ Ev.

Concerning the Tv dial check, the Tv dial change bit is first checked. If the bit is "0", control is directly returned. If the bit is "1", it is checked whether the right direction rotation bit is set (steps S401, S402). If the right direction rotation bit is set (i.e., the Tv electronic dial 19 is rotated to the right direction), the shutter speed Tv is increased to the maximum shutter speed Tvmax ½ Tv by ½ Tv (steps S402, S403, S404). Conversely, if the right direction rotation bit is reset (i.e., the Tv electronic dial 19 is rotated to the left direction), the shutter speed Tv is decreased ½ Tv by ½ Tv until the minimum shutter speed Tvmin is reached (steps S402, S405, S406). Thereafter, the Tv dial change bit is cleared and the Tv right direction rotation bit is reset (step S407).

With respect to the Av dial check, if the Av electronic dial 17 is rotated to the right direction, the diaphragm value Av is increased ½ Av by ½ Av until the maximum diaphragm value Avmax is reached (steps S411∼S414). Thereafter, the Av dial change bit is cleared and the Av right direction rotation bit is reset (step S418). Conversely, if the Av electronic dial 17 is rotated to the left direction, the diaphragm value Av is decreased ½ Av by ½ Av until the minimum diaphragm value Avmin is reached (steps S411, S412, S415, S416). Thereafter, the Av dial change bit is cleared, the Av right direction rotation bit is reset (step S418), and control is returned. The sub-routines of FIGS. 31 and 32 are called at the Tv dial set and the Av dial set, respectively, which will be discussed hereinafter.

SELECTION OF EXPOSURE MODE

Figure 33:
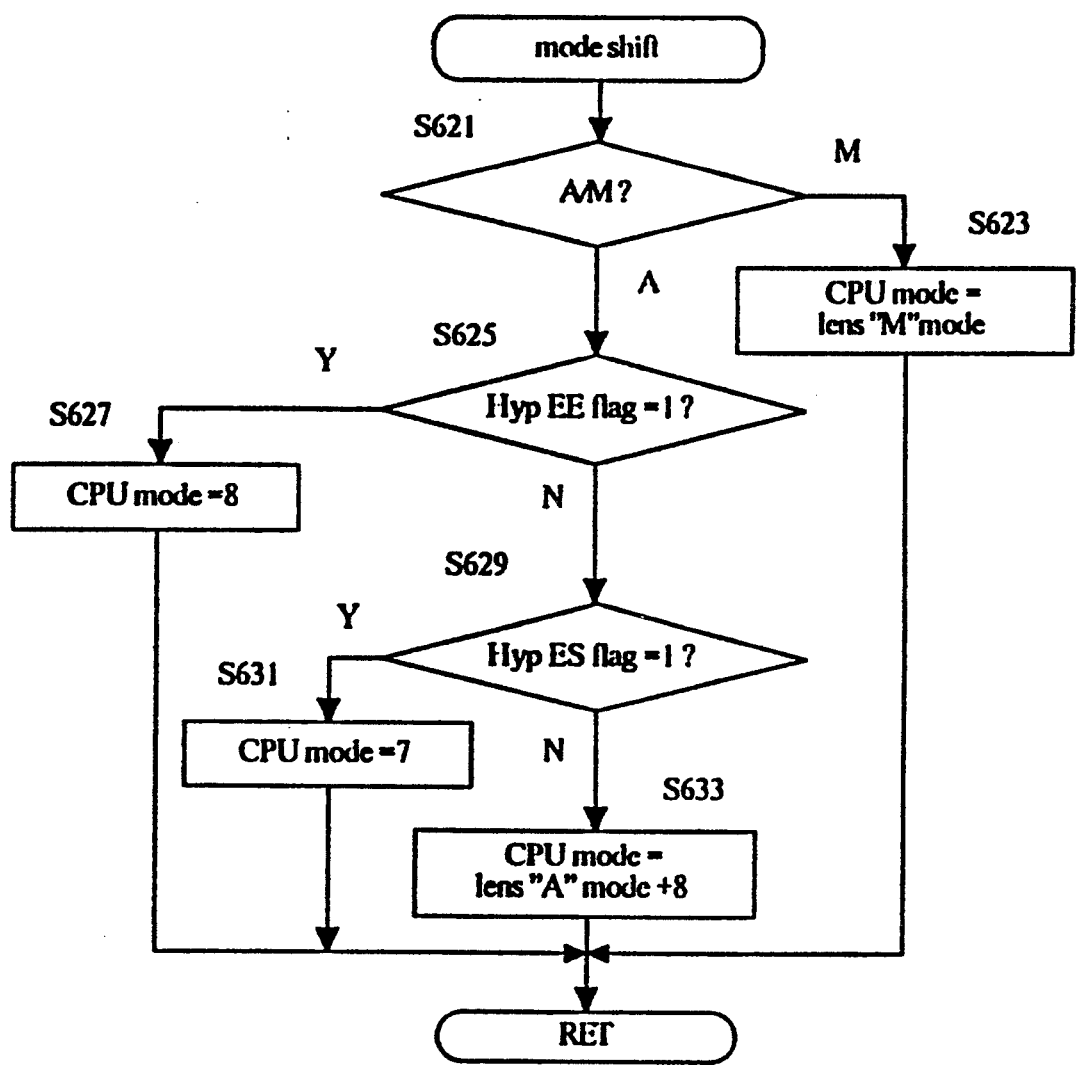
FIG. 33 is a flow chart of a mode shifting operation.
Figure 34A:
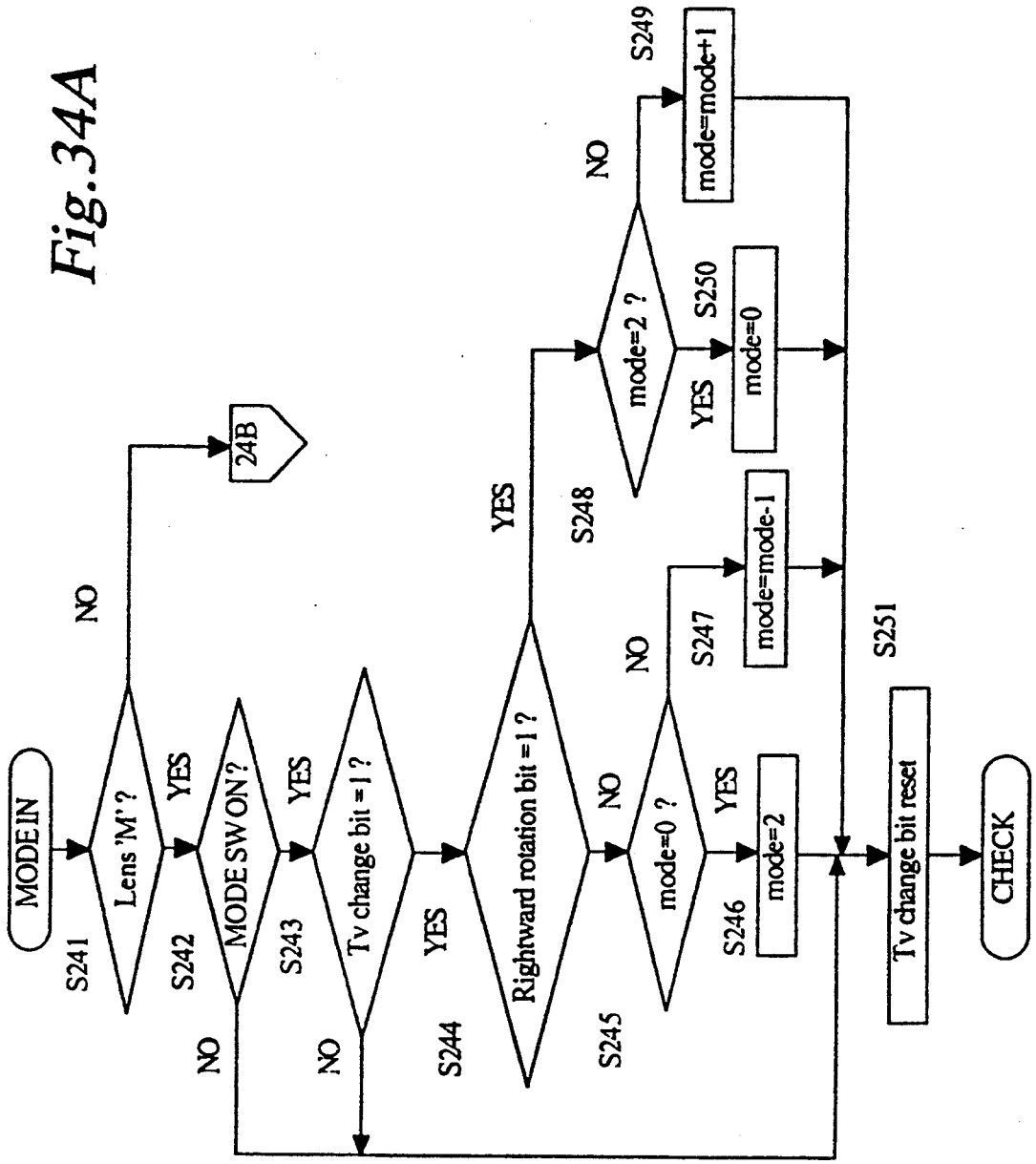
FIGS. 34A and 34B illustrate a flow chart of a mode selecting operation.
Figure 34B:
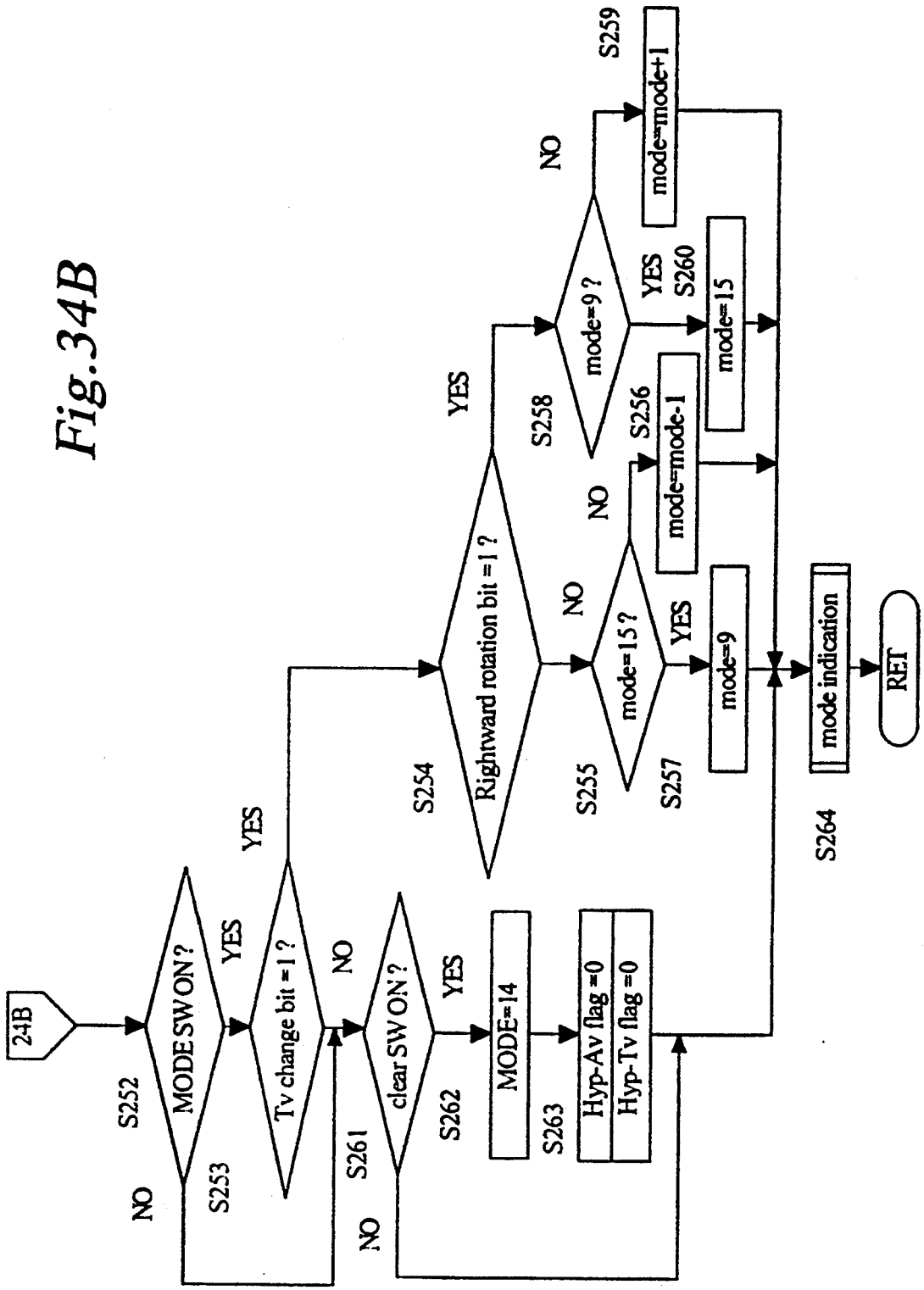
Figure 35:
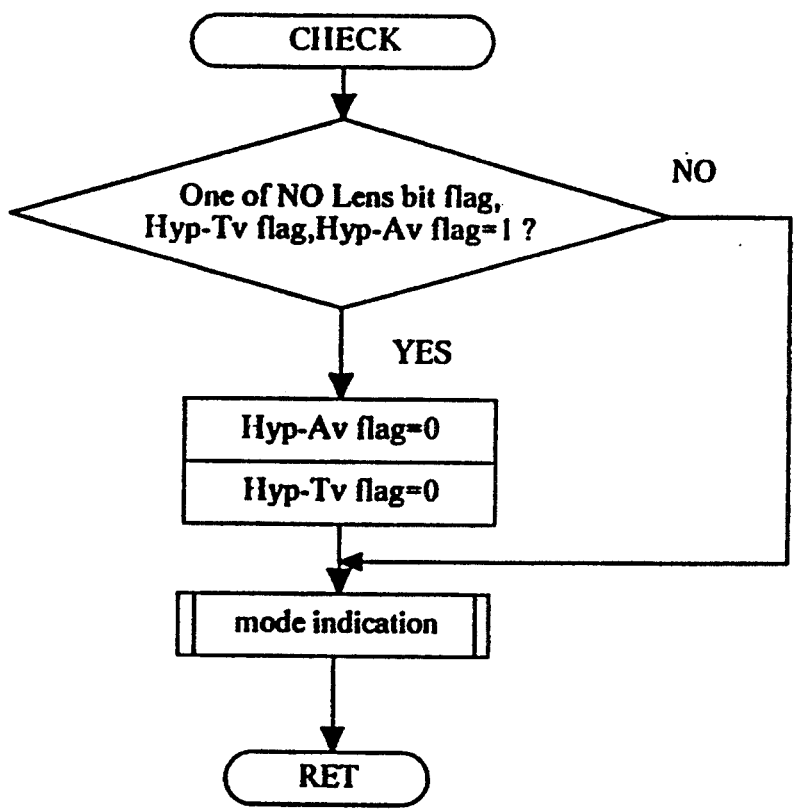
FIG. 35 is a flow chart of a checking operation.

FIGS. 33, 34A and 34B show sub-routines of the selection or modification operation of the exposure modes. The change of the exposure modes is effected by IPU 43 in accordance with the program memorized in the internal ROM 43a of IPU 43.

MODE SHIFT

The mode shift operation is effected to convert the IPU exposure mode to the CPU exposure mode. Namely, the IPU mode, which is used in IPU 43, is converted to the CPU mode which is used in CPU 41. Table 4 (attached to the and of the specification) shows a relationship between the IPU mode NO. and the CPU mode No.

In the mode shift operation (FIG. 33), IPU 43 checks the lens diaphragm mode. If the lens diaphragm mode is a manual mode, the CPU mode is set to be the lens-manual mode (i.e., one of IPU modes LB (0∼2) is set as the CPU mode) and control is returned (steps S621 and S623). If the hyper-Tv flag and the hyper-Av flag are both cleared in the lens-auto mode, the CPU mode corresponds to the lens-auto mode plus 8, and control is returned. If the hyper-Tv flag is set, the CPU mode is set at "8", and control is returned (steps S621, S625, S629 and S631).

MODE-IN

The mode-in operation (step S235) is performed as a sub-routine of the SW-IN operation (step S224) when the exposure mode/drive lever 29 is moved to the MODE side i.e., when the exposure mode switch SWMODE is turned ON, during the intermittent operation by the 32 ms timer. The variation of the exposure modes is effected by the Tv electronic dial 17 when the exposure mode/drive lever 29 moved to the MODE side. The exposure modes corresponding the exposure mode numbers are shown in Table 4 mentioned above.

The mode-in operation will be described below in more detail with reference to FIGS. 34A and 34B. The hyper-EE and hyper-ES modes have no independent mode No. and have an exposure mode No. (14) which is the same as that of the hyper program. The hyper-EE and hyper-ES modes can be discriminated by the Hyp-TV and Hyp-Av flags, respectively.

The taking lens in the illustrated embodiment has an auto/manual selection switch SWA/M that is actuated by the diaphragm ring thereof. When the auto/manual selection switch SWA/M is moved to the manual side, the diaphragm is set on the taking lens side. If the lens-manual mode is detected at step S241, control proceeds to step S242 to select a desired exposure mode from among the LM diaphragm priority (ES) automatic exposure mode (exposure mode 2), the LM hyper-manual exposure mode (exposure mode No. 1) and the LM bulb exposure mode (exposure mode No. 0). The LM diaphragm priority automatic exposure mode (exposure mode No. 2) is the initial exposure mode.

At step S242, it is determined whether the mode switch SWMODE is turned ON. If the mode switch SWMODE is turned ON, it is checked whether the Tv electronic dial 17 is actuated (i.e., the Tv dial change bit is set). If there is no change, the Tv dial change bit is reset and control then proceeds to the checking sub-routine If there is a dial change, the direction of rotation of the dial is checked (steps S243, S244 and S251).

When the Tv electronic dial 17 is rotated to the leftward direction (counterclockwise direction), i.e., if the right direction bit is "0", the exposure mode is switched from the LM diaphragm priority mode to the LM hyper-manual mode and the LM bulb mode, in this order one by one. After the Tv dial change bit is reset, control jumps to the check sub-routine (steps S241~S247 and S251).

When the Tv electronic dial 17 is rotated in the right direction (the right direction bit is "1"), the exposure mode is changed in the order opposite to the above-mentioned order. After the Tv dial change bit is reset, control jumps to the check sub-routine (steps S244, S248~S251).

the exposure mode switch SWMODE is turned OFF, or if the Tv electronic dial 17 is not actuated (the Tv dial change bit is "0"), the Tv dial change bit is reset without modifying the exposure mode, so that control jumps to the check sub-routine (steps S242, S243 and S251).

CHECK SUB-ROUTINE

In the check sub-routine, if one of the NOLens bit flag, the hyper-Av flag, or the hyper-Tv flag is set, the mode indication operation is carried out after the hyper-Av flag and the hyper-Tv flag are reset. The hyper-Av flag and the hyper-Tv flag represent the AE mode. Namely, although the hyper-EE mode and the hyper-ES mode are not included in the types of AE modes, the hyper-EE mode and the hyper-ES mode can be discriminated by the hyper-Av flag and the hyper-Tv flag, respectively.

Consequently, hyper program No. 14 and the hyper Tv flag are set in the hyper-EE mode, and the hyper program No. 14 and the hyper Av flag are set in the hyper-ES mode, respectively.

To return the mode from the hyper-EE mode or hyper-ES mode to the respective hyper program modes, the hyper-Av flag or the hyper Tv flag is reset. The hyper-Av flag and the hyper-Tv flag are always reset in the lens-manual mode by the check sub-routine. Accordingly, when the auto/manual selection switch SWA/M is switched from "MANUAL" to "AUTO", or when the taking lens is detached from, and again attached to the camera body, the exposure mode is initialized to be the hyper-program exposure mode.

If the taking lens is the auto-lens, and accordingly, the auto/manual selection switch SWA/M is switched to "AUTO", the exposure mode is switched mode by mode in the following order: program mode→hyper-program mode→limited program mode→ . . . →LA bulb mode→program mode. The exposure mode is indicated (steps S241, S251~S257, S264) when the exposure mode switch SWMODE is turned ON and the Tv electronic dial 17 is rotated in the leftward direction. If the Tv electronic dial 17 is rotated to the right direction, the exposure mode is changed in the order opposite to the above-mentioned order and is then indicated (steps S258~S260 and S264).

If the taking lens is an auto-lens and if one of the exposure mode switch SWMODE or the Tv electronic dial 17 is turned OFF, exposure selection operation is not effected (steps S241, S251~S253, S261). If the clear button 23 is not turned ON (i.e., clear switch SWCL is not turned the latest exposure mode is indicated (steps S261 and S264).

If the clear button 23 is turned ON, and if the exposure mode is the hyper-EE mode or the hyper ES mode, the exposure mode is initialized to be the hyper-program mode. If the exposure mode is neither the hyper-EE mode nor the hyper ES mode, the current exposure mode is maintained. Namely, since the hyper-Tv flag or the hyper-Av flag is set when the exposure mode is the hyper-EE mode or the hyper-ES mode, the flag is reset (steps S261 and S263). Consequently, when the photographer presses the clear button 23, the hyper-EE automatic exposure mode or the hyper-ES automatic exposure mode is returned to the hyper-program exposure mode.

In the exposure mode selection operation mentioned above, it is impossible to directly select the hyper-EE or hyper-ES automatic exposure mode. The selection of the hyper-EE or hyper-ES automatic exposure mode is effected by the electronic dial 17 or 19 when the hyper-program exposure mode is selected. Namely, when the electronic dial 17 or 19 is actuated at the hyper-program mode, the hyper-Tv flag or the hyper-Av flag is set, so that the mode can be compulsively changed to the hyper-EE or hyper-ES automatic exposure mode. Furthermore, when the electronic dial 17 or 19 is actuated at the hyper-EE or hyper-ES program mode, the mode can be compulsively changed to The hyper-ES or hyper-EE automatic exposure mode, respectively. If the clear button 23 is turned ON, the hyper-EE or hyper-ES automatic exposure mode can be compulsively changed to the respective hyper-program exposure modes. The indication of the compulsive change of the exposure mode is performed in the exposure mode indication operation which will be discussed hereinafter.

Figure 36:
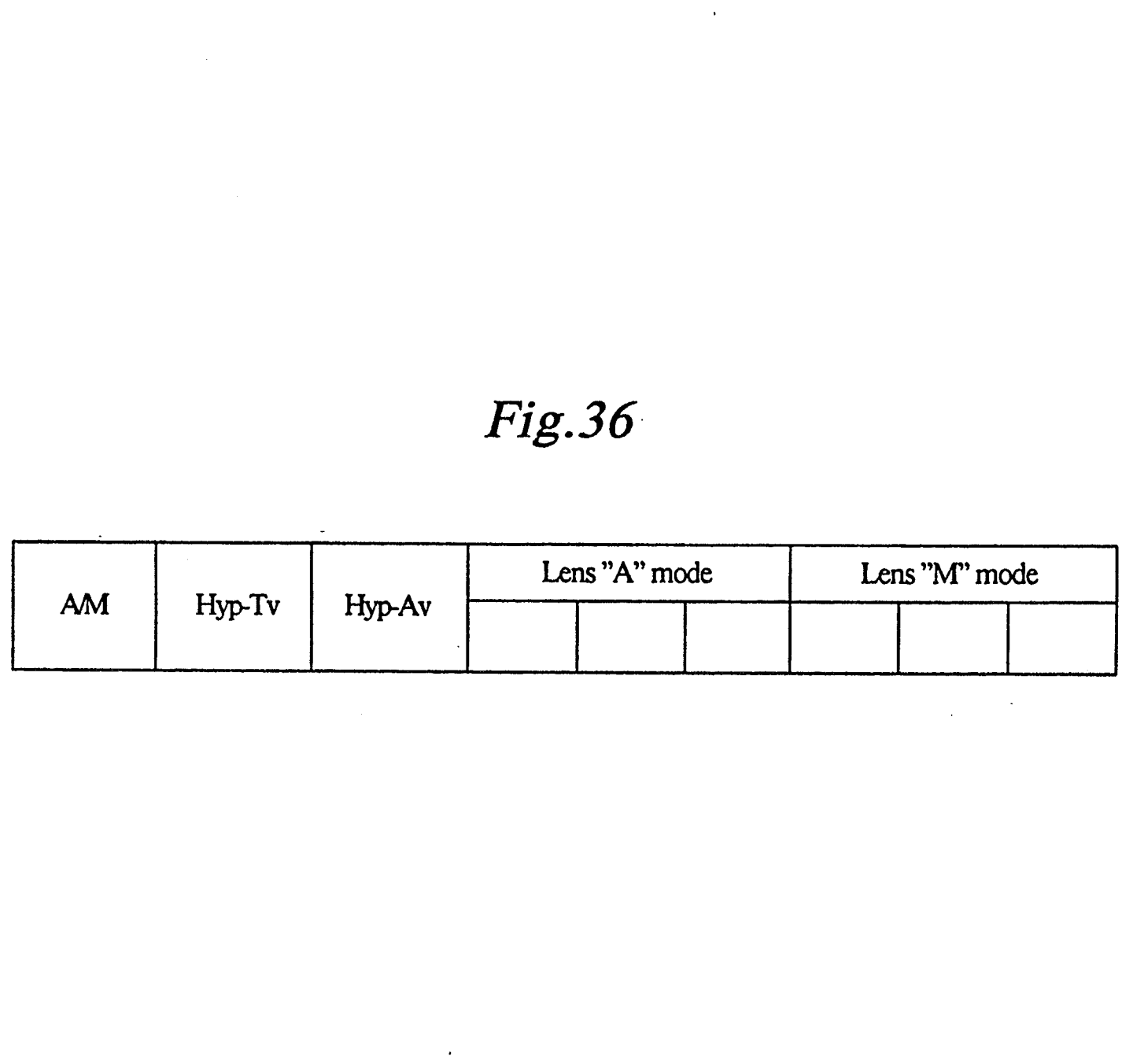

In the illustrated embodiment, the exposure modes in the lens-auto mode and the lens-manual mode are designated with serial numbers. However, in practice, the exposure modes in the lens-auto mode and the exposure modes in the lens-manual mode are stored in the memory of IPU 43 as separate data. Furthermore, the lens-auto/lens-manual (A/M) data, the Hyp-Tv flag and the Hyp-Av flag are separately allocated in the memory of IPU 43, as can be seen in FIG. 36.

The exposure mode is determined in accordance with the 3-bits for the lens-auto mode and the Hyp-Tv or Hyp-Av flag when the auto/manual data (A/M terminal), which is switched by the diaphragm ring of the taking lens, is "AUTO", i.e., "0". On the other hand, when the auto/manual data (A/M terminal) is "MANUAL", i.e., "1", the exposure mode is determined in accordance with the 2-bits for the lens-manual mode.

The exposure mode data of 4-bits including both the auto exposure mode and the manual exposure mode is sent to CPU 41. The correspondence in the exposure modes (IPU mode and CPU mode) between the IPU and CPU is shown in Table 4 listed above.

MEMORY LOCK

Figure 38:
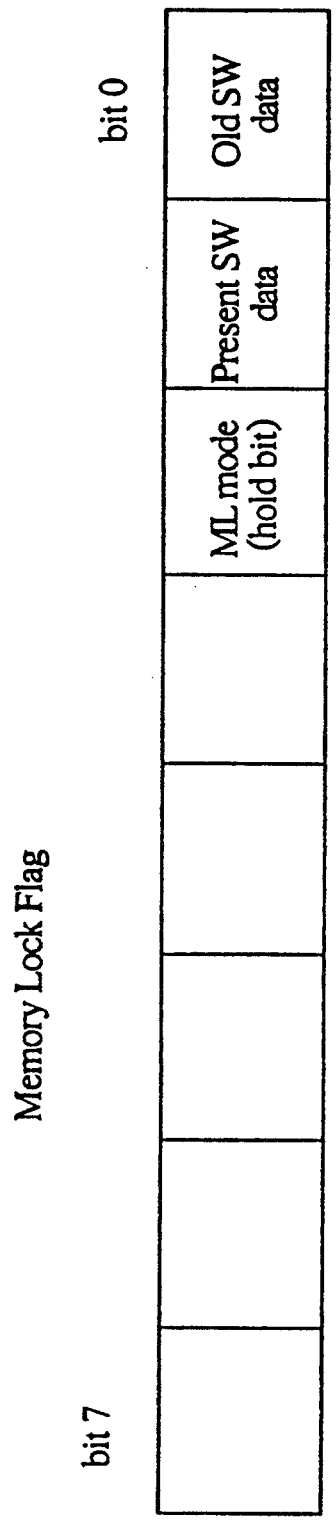
FIG. 38 is an example of a memory locking flag in a RAM of an IPU.

In the memory lock operation, the exposure value Ev is locked in the memory when the hold button 25 is pressed once and the lock is released when the hold button 25 pressed twice. Namely, every time the hold button 25 is turned ON and OFF, the memory lock of the exposure value Ev and the release thereof are repeated. For example, 3 bits within the memory lock flag data in the RAM 43b are employed in the memory lock operation. As can be seen in FIG. 38, one bit is the ML mode flag (hold bit), another bit is the present hold switch data, and another bit is the old hold switch data. All of these data are cleared at the initial state.

Figure 37:
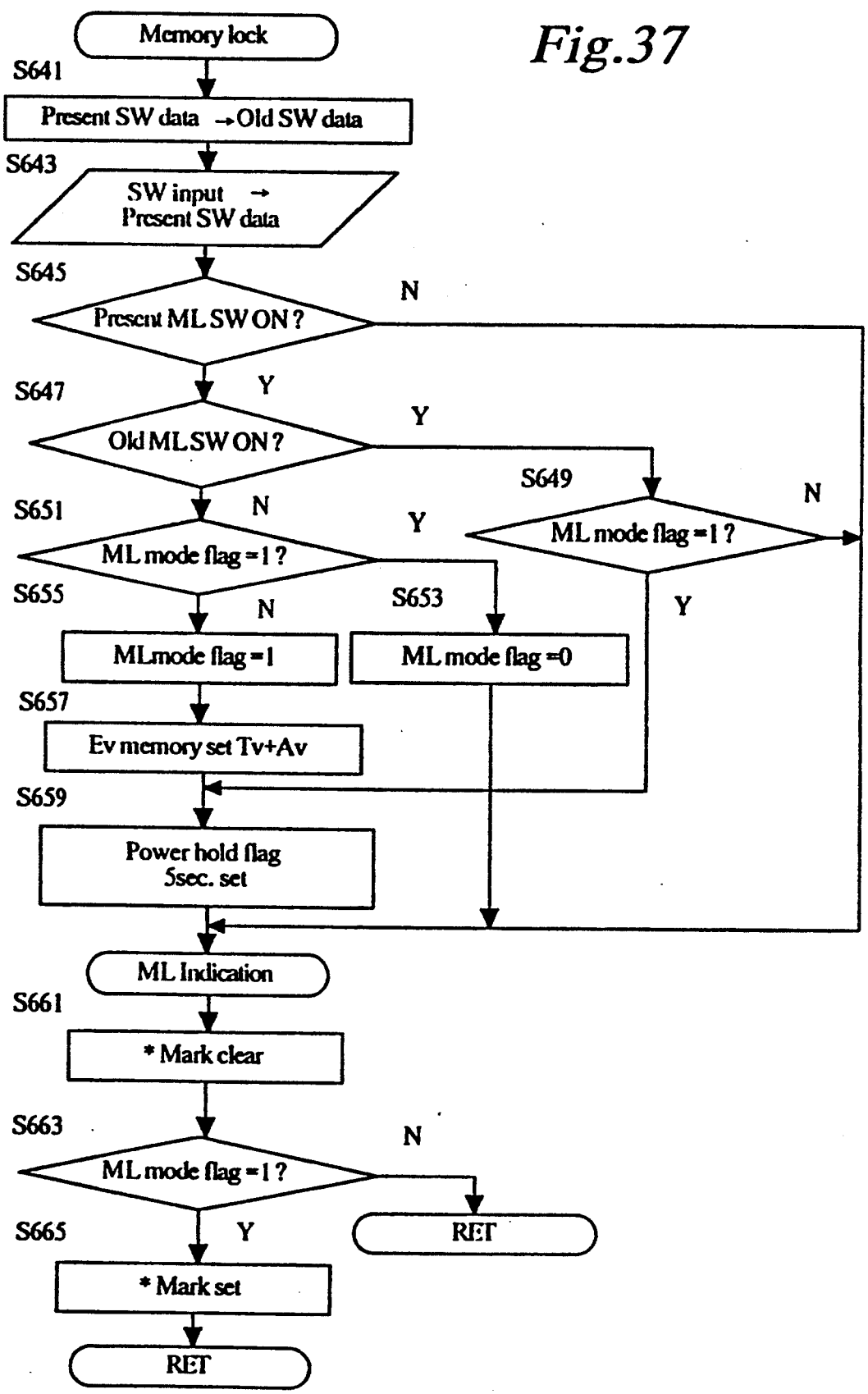
FIG. 37 is a flow chart of a memory locking operation.

The memory lock operation at step S236 is performed as follows (FIG. 37): In this operation, every time the hold switch 25 is ON and OFF, the ML mode flag is set and reset.

First, the present hold switch data is transferred to the old hold switch data, so that the ON/OFF state of the hold switch 25 is input to the present hold switch data (steps S641 and S643). Namely, when the hold switch is turned ON and OFF, the ML mode flag is set at "0" and reset is set at "1", respectively. The hold switch 25 is a normally open self-returning type. Generally speaking, since the processing time of the microcomputer is extremely short, the memory lock sub-routines are repeated several times while the photographer actuates the hold switch 25.

Thereafter, the state of the present hold switch data is checked (step S645). Since the ML mode flag is reset when the hold switch 25 is turned OFF, control proceeds to the memory lock indication operation. Since when the hold switch 25 is turned ON, the ML mode flag is set, control proceeds to step S647 to check the old hold switch data. Upon the first operation when the hold switch 25 is turned ON, or upon the second and subsequent operations when the hold switch 25 is turned OFF, the ML mode flag is reset. Accordingly, the control proceeds to step S651. Upon the second and subsequent operations when the hold switch 25 is turned ON or upon the first operation when the hold switch 25 is turned OFF, the ML mode flag is set. Accordingly, the control proceeds to step S649.

Whether the ML mode flag is set is checked at step S651. If the ML mode flag is set, the flag is cleared. If the flag is cleared, the ML mode flag is set (steps S655 and S653). When the ML mode flag is set, the current exposure value Ev is stored (locked), and the power hold flag is set for 5 sec. Thereafter, control proceeds to a ML indication operation (steps S655, S657 and S659). If the ML mode flag is cleared, control directly proceeds to the ML indication operation (steps S651 and S653).

At step S649, it is determined whether the ML mode flag is set. When the hold switch 25 is turned ON, the ML mode flag is set. Accordingly, the control proceeds to step S659. Conversely, when the hold switch 25 is turned OFF, the ML mode flag is cleared. Accordingly, control directly proceeds to the ML indication operation.

In the ML indication operation, the asterisked mark indication flag is cleared. If the ML mode flag is reset, the control is returned. If the ML mode flag is set, the asterisked mark indication flag is set, and then the control is returned (steps S663 and S665). When the hold switch 25 is turned OFF, the present ML switch data, the old ML switch data and the ML mode flag are all cleared.

EXPOSURE MODE INDICATION; MODE AND SET VALUE MODIFICATION

Figure 41A:
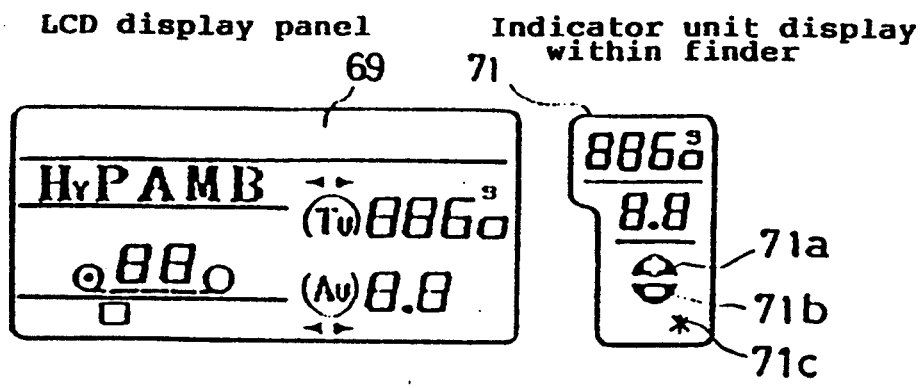
FIGS. 41A, 41B, 41C, 41D, 41E, and 41F show an indication of an LCD panel and an indication unit within a finder shown in various initial indication positions.
Figure 41B:
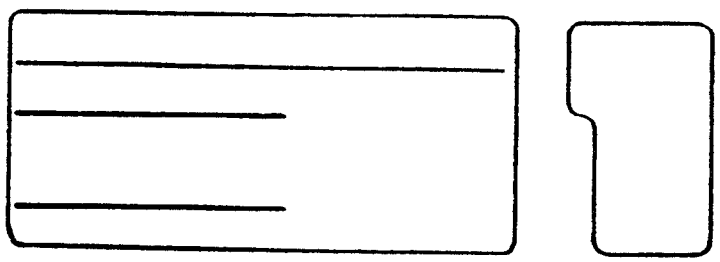

Examples of the indication of the LCD panel 69 and the indicator unit 71 within the finder are shown side by side to the left and right, respectively, in FIGS. 41A through 41F, FIGS. 42A through 42F, and FIGS. 43A through 43C. In FIG. 41A, all the indicating elements (liquid crystal segments) such as letters, marks, symbols and figures, etc., constituting the indication information are shown. FIG. 41B shows the indication (display) when the main switch SWMAIN is turned OFF. The other figures show various indication examples. The relationship between the exposure mode indication operation and the indication (display) will be described below with reference to FIGS. 39A through 39D. The exposure mode indication operation is carried out by the IPU 43 in accordance with program stored in the ROM 43a of IPU 43.

When the taking lens attached to the camera body is an auto-lens, the control proceeds to step S302 from step S301 to perform the following operations:

HYPER-PROGRAM EXPOSURE MODE

Figure 42A:
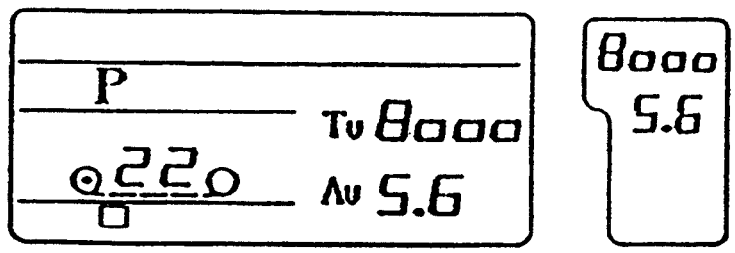
FIGS. 42A, 42B, 42C, 42D, 42E, 42F, 42G and 42H show various exposure modes indicated on an LCD panel and an indication unit within a finder.
Figure 42B:
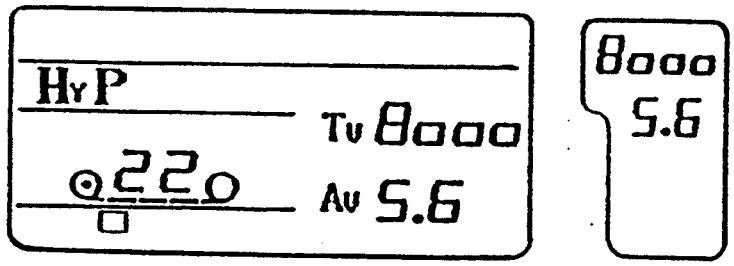

If the hyper-program exposure mode is set, but none of the electronic dials 17 and 19 are actuated, the hyper-program exposure mode is indicated, as shown in FIG. 42B. Namely, "Hy P", representing the hyper-program exposure mode, "Tv 8000", representing the initial value (1/8000 sec.) of the shutter speed, "Av 5.6" (=F5.6), representing the initial value of the diaphragm value, "22", representing the number of the photographed frames of film all appear in the LCD panel 69, and the initial values of the the shutter speed Tv and the diaphragm value Av appear in the indicator unit 71 within the finder (steps S302 through S308).

IPU 43 reads the optimum shutter speed Tv (transferring shutter speed TVT) and the optimum diaphragm value Av (transferring diaphragm value AVT), calculated in the hyper-program exposure sub-routine by CPU 41, provided that power to CPU 41 is held (remains ON) and stores the data in RAM 43b at predetermined addresses thereof (steps S309 and S310). The transferring shutter speed TVT and the transferring diaphragm value AVT, stored in the RAM 43b are indicated in the LCD panel 69 and the indicator unit 71 within the finder, provided that power to CPU 41 is held.

Figure 42C:
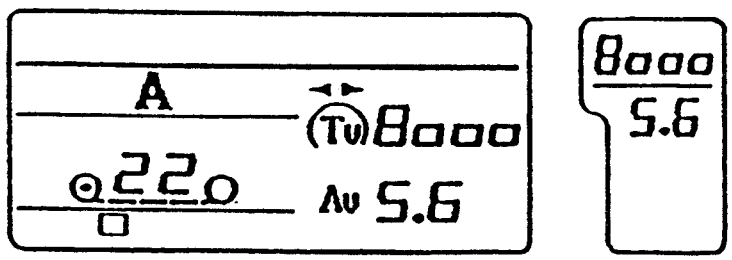

When the Tv electronic dial 17 is actuated when the Tv dial change bit is set at "1"), the hyper-Tv flag is set and the hyper-Av flag is reset, thereby actuating the hyper-EE automatic exposure mode (steps S303 and S311). Thereafter, the shutter speed Tv is modified in accordance with the operation of the Tv electronic dial 17, with the modified shutter speed being stored in RAM 43b at a predetermined address thereof, and the hyper-EE automatic exposure mode and the set shutter speed Tv, etc., being indicated in the LCD panel 69 and the finder indicator unit 71, as shown in FIG. 42G (steps S312 and S313).

The initial value of the set diaphragm value Av is a value calculated at the hyper-program exposure mode or the hyper-EE exposure mode. Note that in FIG. 42G, the three quarter circle which surrounds the symbol "Tv" and the two black arrows located above the symbol "Tv", in the LCD panel, and the line underlining the numeral "4000" in the finder indicator unit 71 represent the feasibility of the shutter speed Tv modification by rotation of the Tv electronic dial 17.

While the power to the CPU 41 is held, IPU 43 reads (or receives) data (AVT) corresponding to the optimum diaphragm value Av (AVD), calculated in the hyper-EE automatic exposure sub-routine, and stores the data in RAM 43b, while indicating the same in the LCD panel 69, etc. (steps S314 and S315).

When the Av electronic dial 19 is actuated (i.e., when the Av dial change bit is "1"), the hyper-Av flag is set and the hyper-Tv flag is reset, thereby actuating the hyper-ES automatic exposure mode (steps S304 and S316). The diaphragm value Av is varied in accordance with the direction of rotation of the Av electronic dial 19, so that the modified diaphragm value Av is stored in RAM 43b. The hyper-ES automatic exposure mode and the modified diaphragm value Av are indicated in the LCD panel 69 and the finder indicator unit 71, as shown in FIG. 42H (steps S317 and S318).

The initial value of the set diaphragm value Av is a value calculated in the hyper-program exposure mode or the hyper-EE exposure mode. Note that in FIG. 42H, the three quarter circle which surrounds the symbol "Av" and the two black arrows located below the symbol "Av", in the LCD panel, and the line underlining the numeral "8.0" in the finder indicator unit 71 represent the feasibility of the diaphragm value Av modification by rotation of the Av electronic dial 19.

IPU 43 reads data (TVT) corresponding to the optimum shutter speed Tv (TVD) calculated in the hyper-ES automatic exposure sub-routine and stores the data in RAM 43b, provided that power to CPU 41 is held. The stored data is indicated in the LCD panel 69 and the finder indicator unit 71 (steps S319 and S320).

When the hyper-EE or ES automatic exposure mode is selected (i.e., when the hyper-Tv or hyper-Av flag has already been set), the IPU 43 stores optimum transferring shutter speed TVT and the optimum transferring diaphragm value AVT, calculated in the hyper-ES or hyper-EE automatic exposure sub-routine by the CPU 41, into RAM 43b and displays the same on the LCD panel 69, etc., even if neither of the electronic dials 17 or 19 are actuated. Nevertheless, IPU 43 does not perform the modification of the diaphragm value Av or the shutter speed Tv (steps S303~S305, S313~S315 or 5303~S306, S319~S320).

Thus, the photographer can rotate the Tv electronic dial 17 to switch the hyper-program exposure mode to the hyper-EE automatic exposure mode and select the shutter speed Tv. Similarly, it is possible for the photographer to switch the hyper-program exposure mode to the hyper-ES automatic exposure mode and select the diaphragm value Av by rotating the Av electronic dial 19. In the illustrated embodiment, upon switching exposure modes, the optimum shutter speed or the optimum diaphragm value, calculated the previous exposure mode, become the initial value of the exposure factor (i.e., the shutter speed or the diaphragm value), which can be set at the newly selected exposure mode. The initial value of the exposure factor, set at the newly selected exposure mode, can again be varied by the subsequent operation of the electronic dial 17 or 19. Alternatively, it is possible to adopt a control system in which the exposure factors are modified at the time the exposure mode is changed.

As can be understood from the above discussion, the mode can be switched from the hyper-EE automatic exposure mode or the hyper-ES automatic exposure mode to the hyper program exposure mode when the clear button 23 is turned ON. The change from the hyper-EE automatic exposure mode to the hyper-ES automatic exposure mode and vice versa can be effected by the rotation of the Av electronic dial 19 and the Tv electronic dial 19, respectively. In the illustrated embodiment, when the hyper-program exposure mode is selected, the diagrams shown as a solid line, a dotted line and a dotted and dashed line in FIG. 10 can be easily obtained by actuating the clear button 23 and the electronic dials 17 and 19, respectively.

As mentioned above with reference to FIGS. 33 and the hyper Tv and Av flags are released when either the clear button 23 is turned ON (steps S261~S263), the hyper-program exposure mode is selected, the main switch SWMAIN is turned OFF or the taking lens is detached from the camera body. When the main switch SWMAIN is turned ON or when the taking lens is attached, the mode is returned to the initial mode, i.e., the hyper-program automatic exposure mode.

PROGRAM EXPOSURE MODE

When the ordinary program exposure mode is selected, "P", which represents the program exposure mode, is indicated in the LCD panel 69 (steps S301, S302, S321~S323). Furthermore, when power hold of CPU 41 is effected, IPU 43 reads the communication TVT, AVT data corresponding to the the optimum shutter speed Tv and the optimum diaphragm value Av, calculated in the program exposure sub-routine, and stores the data in RAM 43b. The data is indicated in the LCD panel 69, etc., as shown in FIG. 42A (steps S324 and S325).

LIMITED PROGRAM EXPOSURE MODE

In the limited program exposure mode, the photographer can modify the upper and lower limits of the shutter speed and the diaphragm value, both varying along the program diagrams, by actuating the electronic dials 17 and 19 and the hold switch 25.

Figure 41C:
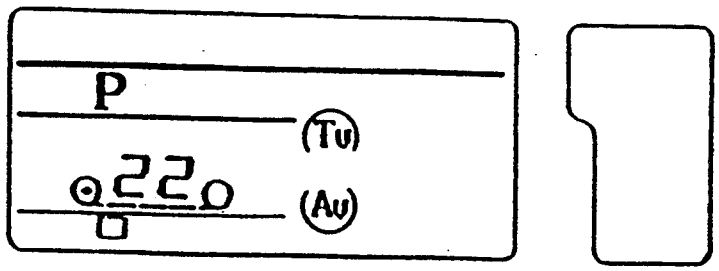
Figure 41E:
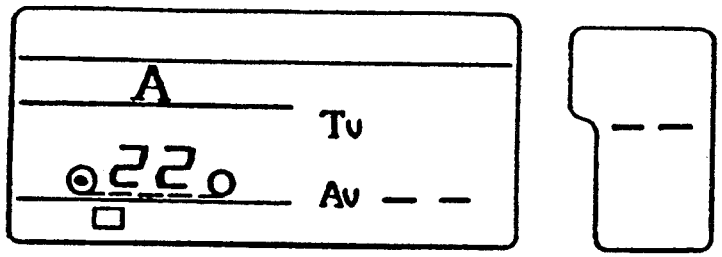
Figure 41D:
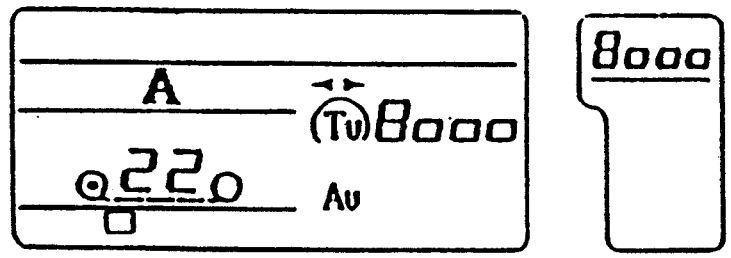
Figure 41F:
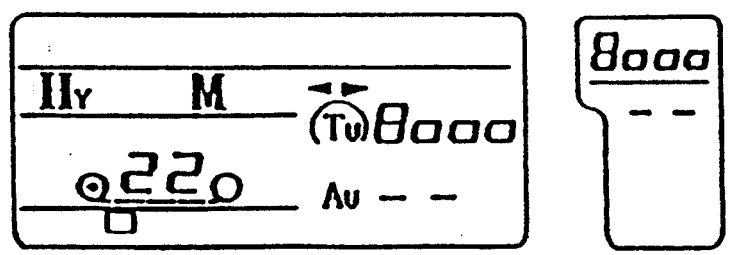

Selection of the limited program exposure mode is indicated by illuminating the three quarter circle surrounding the symbols "Av" and "Tv", as shown in FIG. 41C (steps S461 and S462).

When the clear switch SWCL is turned ON, the lower and upper limits TV1 and TV2 of the shutter speed and the lower and upper limits AV1 and AV2 of the diaphragm value are initialized (steps S463-1, S463-2). The initial values of the shutter speed limits and the diaphragm value limits at the limited program exposure mode in the illustrated embodiment are as follows: Namely, TV1=TVMIN=30 (sec.); TV2=TVMAX=1/8000 (sec.), AV1=AVMIN; AV2=AVMAX. These initial values are set when the limited program exposure mode is selected for the first time after the battery is changed. If the clear switch SWCL is turned OFF, control proceeds to step S464 to check the photometering switch SWS without initializing the shutter speed limits TV1 and TV2 and the diaphragm value limits AV1 and AV2. Namely, the limits set by the photographer in accordance with the following processes are initialized when the clear button 23 (clear switch SWCL) is turned ON.

When the photometering switch SWS is turned ON or when the power is held, even if the photometering switch SWS is turned OFF, control proceeds to step S485 (steps S464, S465-1). When the photometering switch SWS is turned OFF and when power to CPU 41 is held, the limit value is modified, and control then proceeds to step S485 (steps S465-1, S465-2, S466~S486). At step S485, it is determined whether power to the CPU 41 is held. If the power is held, CPU 41 reads the optimum diaphragm value Av and the optimum shutter speed Tv calculated at the limited program exposure mode and stores the data in RAM 43b. The data is indicated in the LCD panel 69, etc. Thereafter, control is returned. If the power is not held, control is directly returned (step S486).

Change of the limit values is effected as follows (step S465-2 and steps subsequent thereto):

When the Tv electronic dial 17 is actuated, the limits of the shutter speed Tv are increased or decreased in accordance with the direction of rotation of the Tv electronic dial 17. The limits are stored in RAM 43b and indicated (steps S465-2, S466).

When the hold button 25 is turned ON, the upper and lower limits TV1 and TV2 of the shutter speed are set. Namely, when the hold button 25 is turned ON for the first time or an odd number of times, since the ML mode flag is set, the set Tv data is modified to the lower limit TV1 (steps S467~S470). When the hold button 25 is turned ON the second time or an even number of times, the set Tv data is modified to the upper limit TV2. Control then proceeds to step S485 (steps S467, S468, S469,S472). If the hold button 25 is not turned ON, a change of the shutter speed is not effected (steps S467, S485).

On the other hand, when the Av electronic dial 19 is turned ON, the limits of the diaphragm value are changed simultaneously with the limits of the shutter speed Tv. Namely, the diaphragm value is increased or decreased in accordance with the direction of rotation of the Av electronic dial 19. The diaphragm value is consequently stored in RAM 43b and indicated in the LCD panel 69. etc. , (steps S475, S476). If the hold button is turned ON for the first time or an odd number of times, since the ML mode flag is set at "1", the set Av data is modified to the lower limit AV1, and when the hold button 25 is turned ON the second time or an even number of times (M1 mode flag is "0"), the set Av data is modified to the upper limit AV2, and control proceeds to step S485 (steps S478, S479, S482).

Upon completion of the modification of the limits TV1 and TV2 and AV1 and AV2 of the shutter speed and the diaphragm value, CPU 41 reads the optimum shutter speed Tv and diaphragm value Av calculated in the limited program exposure mode and stores the data in RAM 43b, provided that the power to CPU 41 is held (steps S485, S486). The stored data is indicated in the LCD panel 69 and the indicator unit within the finder.

As can be understood from the foregoing, in the limited program exposure mode, the shutter speed and the diaphragm value set by the photographer are changed to the upper or lower shutter speed limit and the upper or lower diaphragm limit when the hold switch 25 is turned ON. In an alternative, to change the shutter speed limits or the diaphragm limits every time the electronic dial 17 or 19 is actuated, it is possible to skip the operations at steps S467 and S477.

LA ES AUTOMATIC EXPOSURE MODE

Figure 42D:
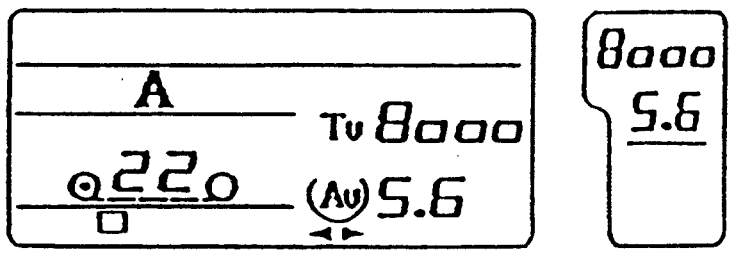

When the body-set diaphragm priority (ES) automatic exposure mode (lens-auto ES automatic exposure mode) is selected, the LCD panel 69 and the indicator unit 71 within the finder are displayed as shown in FIG. 42D (steps S301, S302, S321, S461, S331~S333). When the Av electronic dial 19 is rotated, the diaphragm value Av is increased or decreased in accordance with the direction of rotation thereof, stored as the set diaphragm value Av in RAM 43b, and indicated in the LCD panel 69, etc. When the power to CPU 41 is held, the IPU 43 outputs diaphragm value AVT, calculated in the diaphragm priority automatic exposure mode, to CPU 41, which reads the optimum shutter speed Tv calculated in the LA diaphragm priority automatic exposure sub-routine, stores the data in RAM 43b and indicates the same in the LCD panel 69, etc. (steps S334~S338).

LA EE AUTOMATIC EXPOSURE MODE

When the shutter speed priority (EE) automatic exposure mode is selected, the display of the LCD panel 69 and the indicator unit 71 within the finder is as shown in FIG. 42C, in which the initial value (1/8000 sec.) of the shutter speed Tv appears (steps S301, S302, S321, S331, S341~S343). When the Tv electronic dial 17 is rotated, the shutter speed Tv is increased or decreased in accordance with the direction of rotation thereof, stored as the set shutter speed Tv in RAM 43b, and indicated in the LCD panel 69, etc. When the power to CPU 41 is held, IPU 43 outputs the shutter speed TVT calculated in the shutter speed priority automatic exposure mode to CPU 41, which reads the optimum transferring diaphragm value AVT calculated in the EE automatic exposure sub-routine, stores the data in RAM 43b, and indicates the same in the LCD panel 69, etc., respectively, as shown in FIG. 42C (steps S344~S348).

HYPER-MANUAL EXPOSURE MODE

In the hyper-manual exposure mode in the illustrated embodiment, the function equivalent to the calculation of the shutter speed Tv and/or the diaphragm value Av in the program exposure mode, the EE automatic exposure mode or the ES automatic exposure mode is achieved by actuating the clear button 23.

Figure 42E:
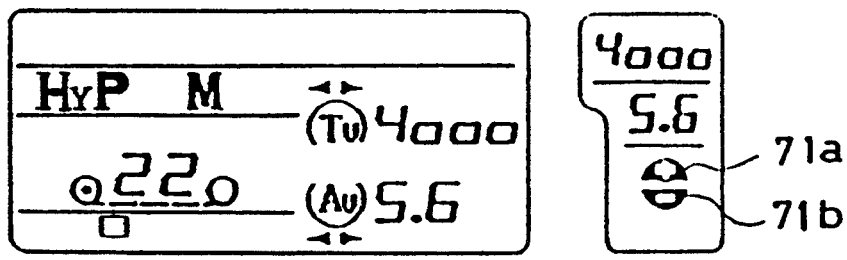

When the body-set hyper-manual exposure mode is selected, the display of the LCD panel 69, etc., is as shown in FIG. 42E (steps S301, S302, S321, S461, S331, S341, S379~S351). When the Ev check sub-routine is performed, the shutter speed Tv and the diaphragm value Av which are increased or decreased in accordance with the direction of rotation of the electronic dials 17 and 19 are set in RAM 43b and indicated in the LCD panel 69. etc., respectively (step S352).

If the power to CPU 41 is held, the shutter speed TVT and the diaphragm value AVT selected in the manual exposure mode are outputted to CPU 41, which reads the specific point LED bit calculated in the body-set manual exposure sub-routine, stores the same in RAM 43b, and controls the illumination of the exposure indicating elements 71a and 71b (steps S353~S360).

LA BULB EXPOSURE MODE

Figure 42F:
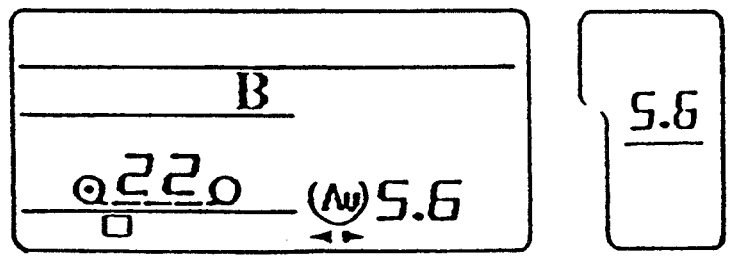
Figure 42G:
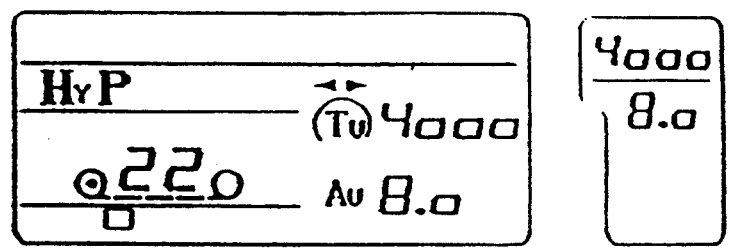
Figure 42H:
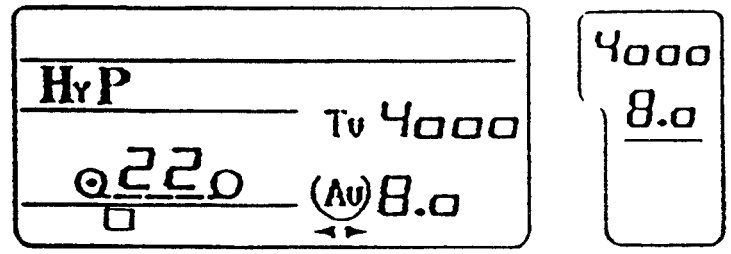
Figure 44A:
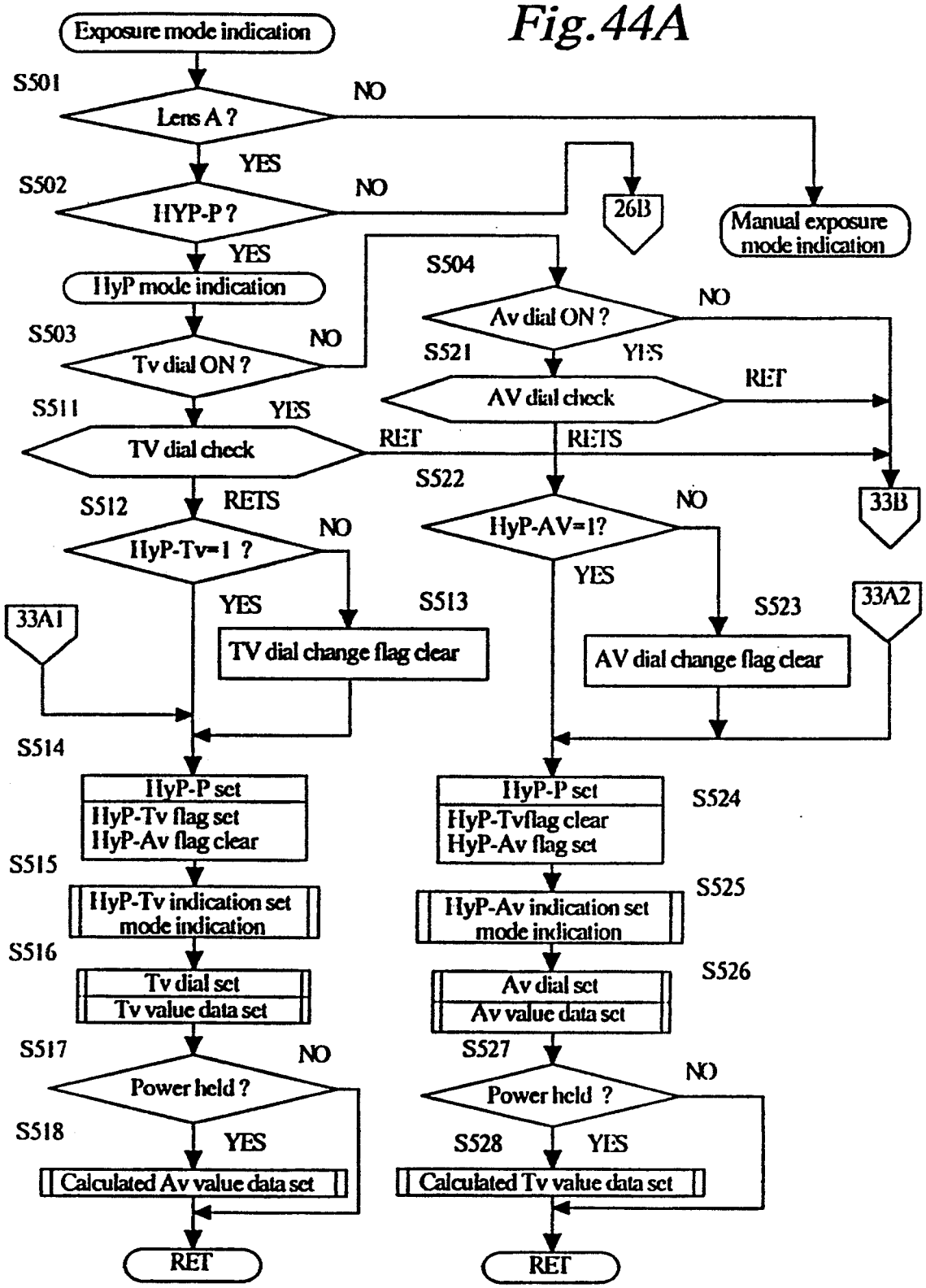
FIGS. 44A and 44B are modified flow charts of an indicating operation of a hyper-program shown in FIG. 39A.
Figure 44B:
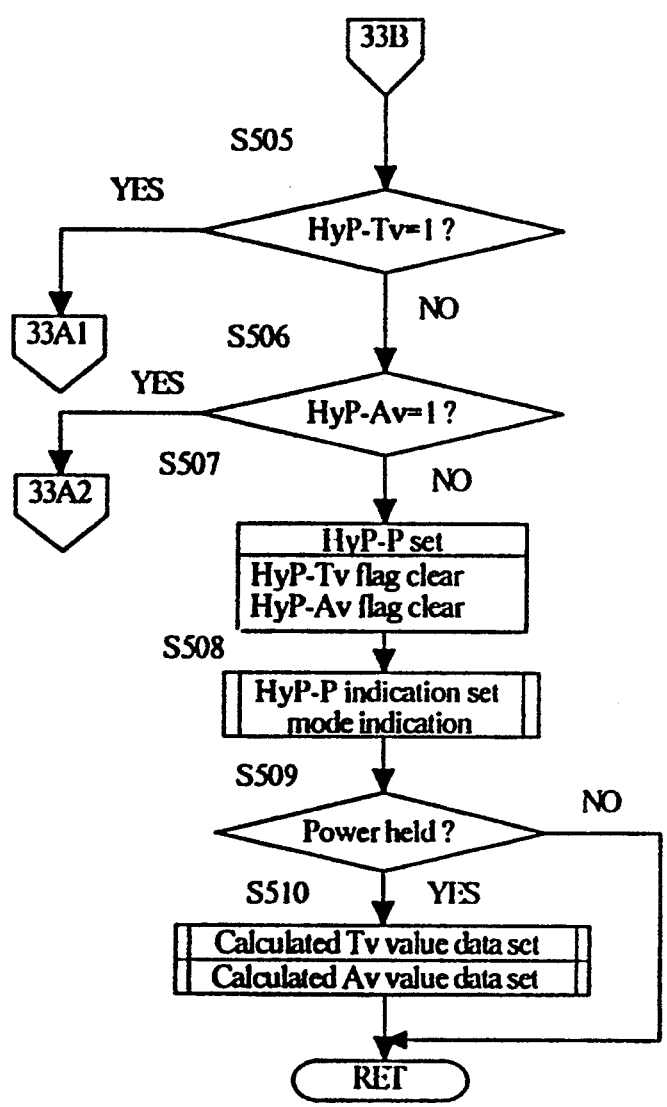

When the body-set bulb exposure mode is selected, the display of the LCD panel 69, etc., is as shown in FIG. 42F (steps S301, S302, S321, S461, S331, S341, S349, S361~S362). When the Av electronic dial 19 is rotated, the diaphragm value Av is increased or decreased in accordance with the direction of rotation of the Av electronic dial 19, stored in RAM 43b, and indicated in the LCD panel 69 and the indicator unit 71 (steps S363~S365).

In the body-set shutter priority exposure mode, diaphragm priority exposure mode, manual exposure mode and bulb exposure mode, as mentioned above, the photographer can set the shutter speed Tv and the diaphragm value Av by actuating the electronic dials 17 and 19. In this case, the three quarter circle, the arrows, and the letters "Tv" and "Av" appear in the LCD panel 69. Also, the shutter speed Tv or the diaphragm value Av is underlined, as mentioned above. Accordingly, the photographer is alerted that the shutter speed Tv and the diaphragm value Av can be manually set by actuating the electronic dials 17 and 19, respectively.

Furthermore, when the hold button 25 is turned the asterisk mark of indicating element 71c is illuminated in the indicator unit 71 within the finder. Accordingly, the photographer is alerted that the memory is locked.

LENS-MANUAL MODE

Indication of the exposure mode in the lens-manual mode, in which the diaphragm value is set on the taking lens side, is effected by IPU 43 as follows:

LM HYPER-MANUAL EXPOSURE MODE

Selection of the LM hyper-manual exposure mode is indicated in the LCD panel 69, etc., as shown in FIG. 43A (steps S301, S371~S373). When the Tv electronic dial 17 is rotated, the shutter speed Tv which is increased or decreased in accordance with the direction of rotation thereof, is stored in RAM 43b as the set shutter speed Tv, and indicated in the LCD panel 69 and the indicator unit 71 within the finder (steps S374~S376).

Furthermore, when power to CPU 41 is held, the shutter speed TVT and the diaphragm value AVT selected in the manual exposure mode are outputted to the CPU 41, which reads the exposure indication bit set in the LA manual exposure sub-routine, stores the read data in the RAM 43b, and controls the illumination of the indicating elements 71a and 71b (steps S377 and S378). FIGS. 43A, (a), (b) and (c) to designate or optimum exposure, over exposure, and under exposure, respectively.

LM MANUAL ES AUTOMATIC EXPOSURE MODE

The lens-manual diaphragm priority (ES) automatic exposure mode is indicated in the LCD panel 69, as shown in FIG. 43B (steps S301, S381~S383). If power to CPU 41 is held, CPU 41 reads the shutter speed TVT calculated in the lens-manual ES automatic exposure sub-routine and stores the data in RAM 43b. The data is indicated in the LCD panel 69, etc., and control is returned (steps S384, S385).

LM BULB EXPOSURE MODE

When the lens-set bulb exposure mode is selected, the shutter speed Tv is set at "B" (bulb), which is indicated in the LCD panel 69, as shown in FIG. 43C (steps S301, S371, S381, S391, S392).

Ev CHECKING SUB-ROUTINE

Figure 40:
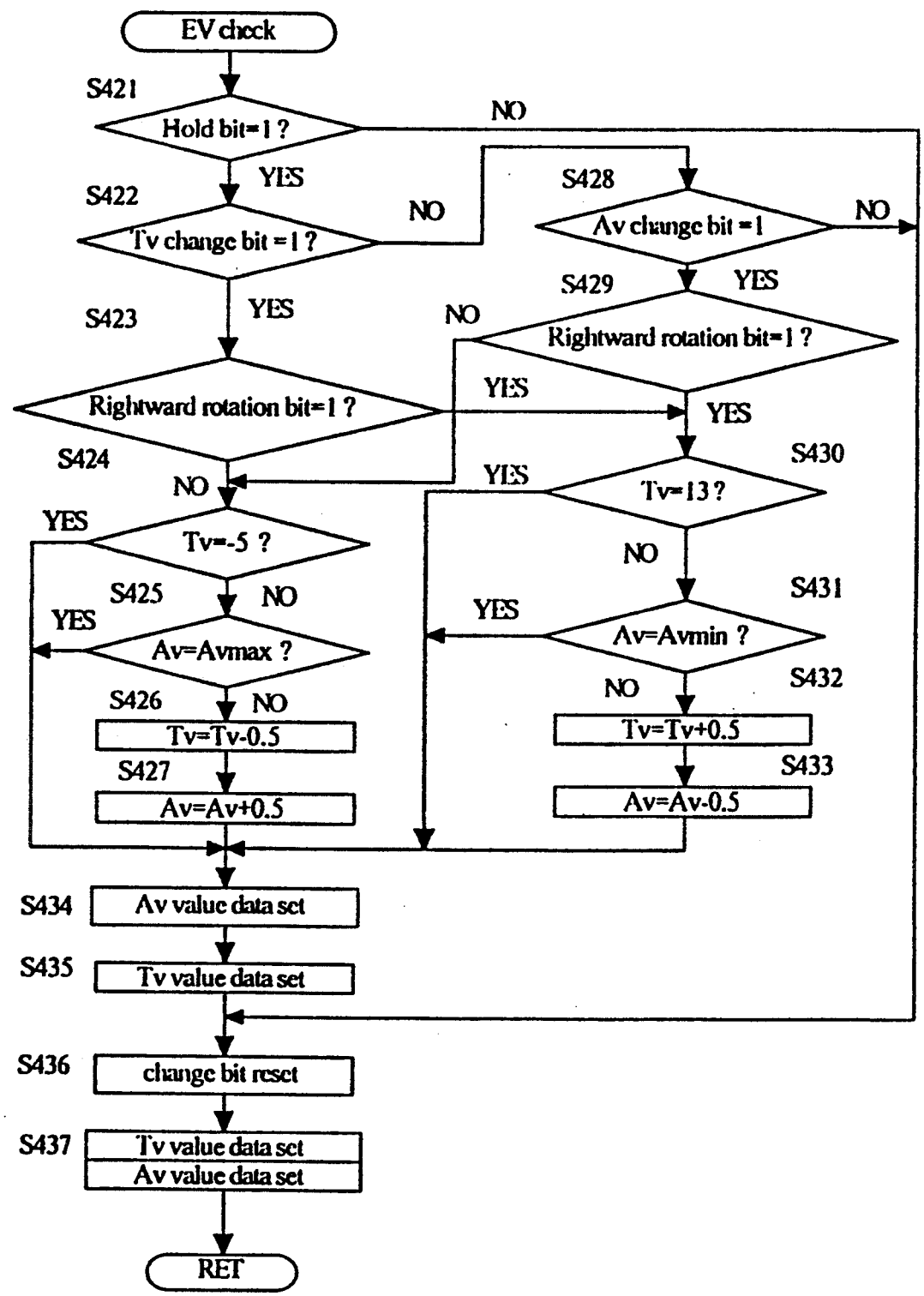
FIG. 40 is a flow chart of an Ev checking operation, according to the present invention.

In the Ev check operation, when the hold switch 25 is turned ON, the optimum exposure value at that time is locked, and if the electronic dial 17 or 19 is actuated thereafter, the associated exposure factor (shutter speed or diaphragm value) is increased or decreased in accordance with the direction of rotation of the electronic dial 17 or 19, and the other exposure factor (diaphragm value or shutter speed) is decreased or increased, respectively, to retain the locked exposure value. In the Ev checking sub-routine at step S352, every time the electronic dial 17 and 19 are rotated by one step when the hold button 25 is turned ON, the increment or decrement of the shutter speed Tv and the diaphragm value Av by ½ Tv and ½ Av takes place, respectively. The Ev checking sub-routine will be discussed below with reference to FIG. 40.

RAM 43b of IPU 43 has a hold bit that corresponds to the switching operation of the hold button 25. If the hold bit is "0", i.e., if the hold button 25 is not turned ON, the shutter speed Tv and the diaphragm value Av, which have already been set are not modified (steps S421, S437). Conversely, if the hold bit is "1", i.e., if the hold button 25 is turned ON, the following operation is performed:

If the Tv electronic dial 17 is rotated in the leftward direction (counterclockwise direction) by one step or more (i.e., the Tv change bit is "0") the shutter speed Tv is decreased ½ Tv by ½ Tv and the diaphragm value Av is increased ½ Av by ½ Av until the shutter speed Tv is equal to -5 (Tv=-5~30 sec.) or the diaphragm value Av is equal to the maximum diaphragm value AVMAX (steps S422~S427). If the Av electronic dial 19 is rotated in the rightward direction (clockwise direction), the same operation as above is performed (steps S422, S428, S429, S424~S427).

If the Tv electronic dial 17 is rotated in the rightward direction (clockwise direction), the shutter speed Tv is increased ½ Tv by ½ Tv and the diaphragm value Av is decreased ½ Av by ½ Av until the shutter speed Tv is equal to 13 (Tv=13~1/8000 sec.) or the diaphragm value Av is equal to the minimum diaphragm value AVMIN (steps S422, S423, S430~S433). If the Av electronic dial 19 is rotated in the leftward direction (counterclockwise direction), the same operation as above is performed (steps S422, S428~S433). The increased or decreased shutter speed Tv and the diaphragm value Av are stored in RAM 43b and the Tv, Av change bits are reset (steps S434~S437).

Thus, both the shutter speed Tv and the diaphragm value Av can be simultaneously adjusted by actuating one of the electronic dials 17 or 19 while maintaining the exposure value Ev constant, when the hold button 25 is turned ON after the optimum shutter speed and the diaphragm value are manually set. For instance, on the assumption that the optimum shutter speed Tv and diaphragm value Av are 1/125 sec., and F8.0, in the hyper-manual mode, respectively, if the hold button 25 is turned ON, the memory is locked. Thereafter, if for example the Tv electronic dial 17 is rotated by two steps, the shutter speed Tv and the diaphragm value Av are changed to 1/60 sec., and F11, respectively, while maintaining exposure at the optimum value. For comparison's sake, if the Tv electronic dial Tv is actuated at the ordinary hyper-manual exposure mode, only the shutter speed is varied, resulting in a change in exposure value. This mode will be cancelled when the hold button is actuated again.

SECOND EXPOSURE MODE INDICATION OPERATION

The second exposure mode indicating operation is different from the first exposure mode indicating operation in that the exposure mode can be changed only when the electronic dials 17 or 19 are rotated by more than two steps in the hyper-program exposure mode.

When neither of the electronic dials 17 or 19 is actuated and both the hyper-Tv and hyper-Av flags are "0" in the lens-auto hyper-program mode (i.e., when the hyper-program exposure mode is selected) the display in the LCD 69 and the indicator unit 71 within the finder is as shown in FIG. 42B (steps S501~S508). The transferring shutter speed TVT and the transferring diaphragm value AVT, calculated by the CPU 41, are stored in RAM 43b (steps S509, S510), provided that power to CPU 41 is held.

When the hyper-EE automatic exposure mode is selected, control proceeds from step S505 to step since the hyper-Tv flag is set. Thereafter, in steps S514~S518, the operations similar to those in steps S311~S315 are effected. On the other hand, if the hyper ES automatic exposure mode is selected, control proceeds from step S506 to step S524, since the hyper-Av flag is set. Thereafter, in steps S524~S528, the operations similar to those in steps S316~S320 are effected.

When the Tv electronic dial 17 or the Av electronic dial 19 is rotated, namely, when the Tv-change bit or the Av-change bit is "1", the operations in the Tv dial or Av dial checking sub-routine are effected. As can be understood from the foregoing, in the Tv dial or Av dial checking sub-routine, the exposure mode is changed only when the Tv or Av electronic dial 17 or 19 is rotated by two or more steps in the same direction.

When the Tv or Av electronic dial 17 or 19 is rotated by one step in a predetermined direction, or when the Tv or Av electronic dial 17 or 19 is rotated thereafter by one step in the opposite direction, control proceeds to step S505 (steps S503, S511, S505 or steps S503, S521~S505).

When the Tv electronic dial 17 is rotated by two steps in the same direction, control proceeds from step S511 to step S512, in which, if the hyper-Tv flag is "0", the Tv dial change flag is reset to permit the mode to be changed to the hyper-EE automatic exposure mode and prevent the shutter speed Tv from being changed, since the hyper-EE automatic exposure mode is not selected. Thereafter, control proceeds to step S514 (steps S512, S513 and S514). If the hyper-Tv flag is "1", since the hyper-EE automatic exposure mode is selected, control proceeds directly to step S514 in which the shutter speed Tv can be adjusted (steps S512, S514).

On the other hand, when the Av electronic dial 17 is rotated by two steps in the same direction, control proceeds from step S521 to step S522, in which, if the hyper-Av flag is "0", the Av dial change flag is reset to permit the mode to be changed to the hyper-ES automatic exposure mode and prevent the diaphragm value Av from being changed, since the hyper-ES automatic exposure mode is not selected. Thereafter, control proceeds to step S524 (steps S521, S522, S523, S524). If the hyper-Av flag is "1", since the hyper-ES automatic exposure mode is selected, control proceeds directly to step S524 in which the diaphragm value Av can be adjusted (steps S521, S522, S524).

Figure 45:
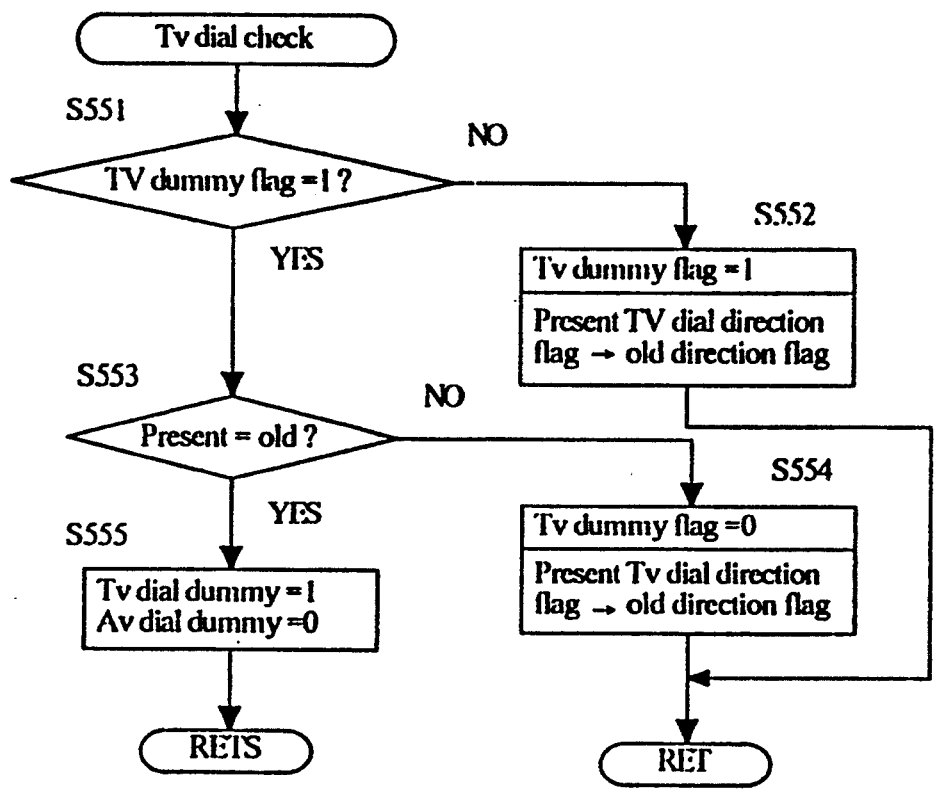
FIG. 45 is a flow chart of a sub-routine of a second Tv dial checking operation.
Figure 46:
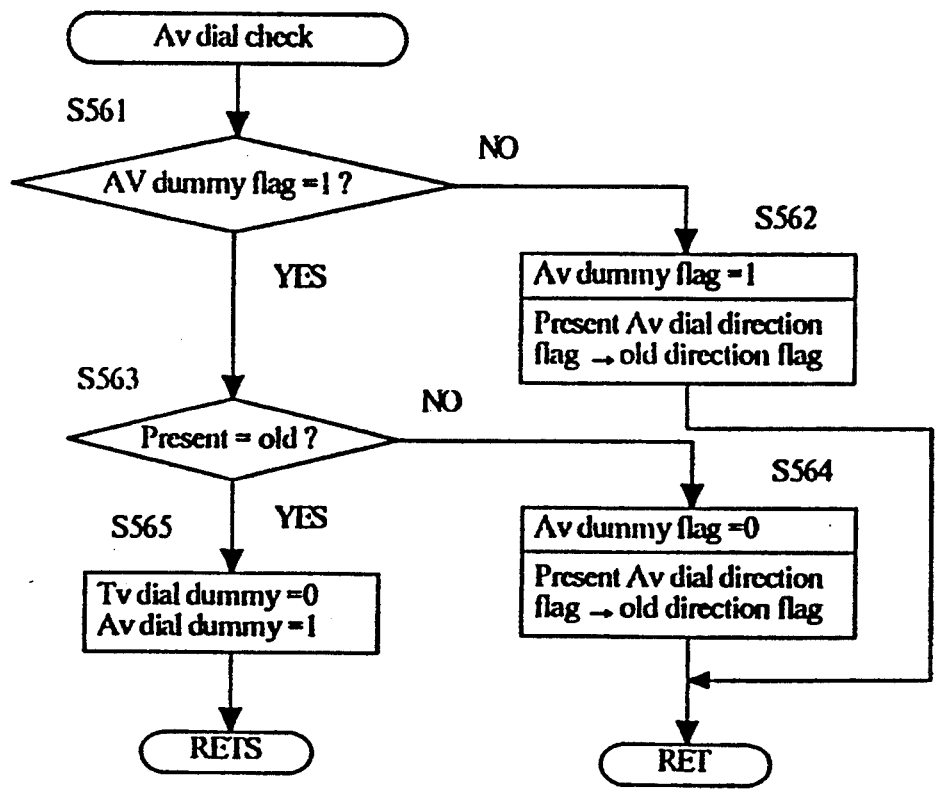
FIG. 46 is a flow chart of a sub-routine of a second Av dial checking operation.

The Tv, Av dial check sub-routines will be discussed below with reference to steps S511 and S521 in FIGS. 45 and 46. In the Tv dial check sub-routine, it is checked whether a Tv dummy flag is "1" at step S551. Since the Tv dummy flag is not initially set, the Tv dummy flag is set and the old Tv dial direction flag is replaced with the present Tv dial direction flag, and control is then returned to step S505 (step S552). The second time through the sub-routine, if the direction of rotation of the Tv electronic dial 17 is the same as that of the first rotation, the Tv dial dummy flag is set and an Av dial dummy flag is reset, since the present Tv dial direction flag is identical to the old Tv dial direction flag (steps S553, S555). After that, control proceeds to step S512.

Conversely, if the direction of the second rotation of the Tv electronic dial 17 is different from that the first rotation, the Tv dial dummy flag is reset and the old Tv dial direction flag is replaced with the present dial direction flag, since the old Tv dial direction flag is different from the present flag (steps S551, S553, S554). After that, control proceeds to step S505.

In the Av dial check sub-routine, it is checked whether the Av dummy flag is "1" at step S561. Since the Av dummy flag is not initially set, the Av dummy flag is set and the old Av dial direction flag is replaced with the present Av dial direction flag, and the control is then returned to step S505 (step S562). The second time through the sub-routine, if the direction of rotation of the Av electronic dial 19 is the same as that of the first rotation, the Av dial dummy flag is set and the Tv dial dummy flag is reset, due to the fact that the present Av dial direction flag is identical to the old Av dial direction flag (steps S563, S565). After that, control proceeds to step S524.

Conversely, if the direction of the second rotation of the Av electronic dial 19 is different from that of the the first rotation, the Av dial dummy flag is reset and the old Av dial direction flag is replaced with the present dial direction flag, since the old Av dial direction flag is different from the present flag (steps S561, S563, S564). After that, control proceeds to step S505.

As can be understood from the above discussion, according to the second indication sub-routine, since there is no change in the exposure mode, as long as the electronic dial 17 or 19 is not rotated by more than two steps, even if the electronic dial 17 or 19 is rotated accidentally or by mistake, the mode is not changed. In an alternative embodiment, it is possible to realize a control system in which a mode change does no take place if the electronic dial 17 or 19 is successively rotated twice within an extremely short space of time.

The following discussion will be directed to an embodiment in which the exposure value Ev can be locked in the lens-manual (lens-set) manual exposure mode, with reference to FIGS. 47 through 51.

Figure 47:
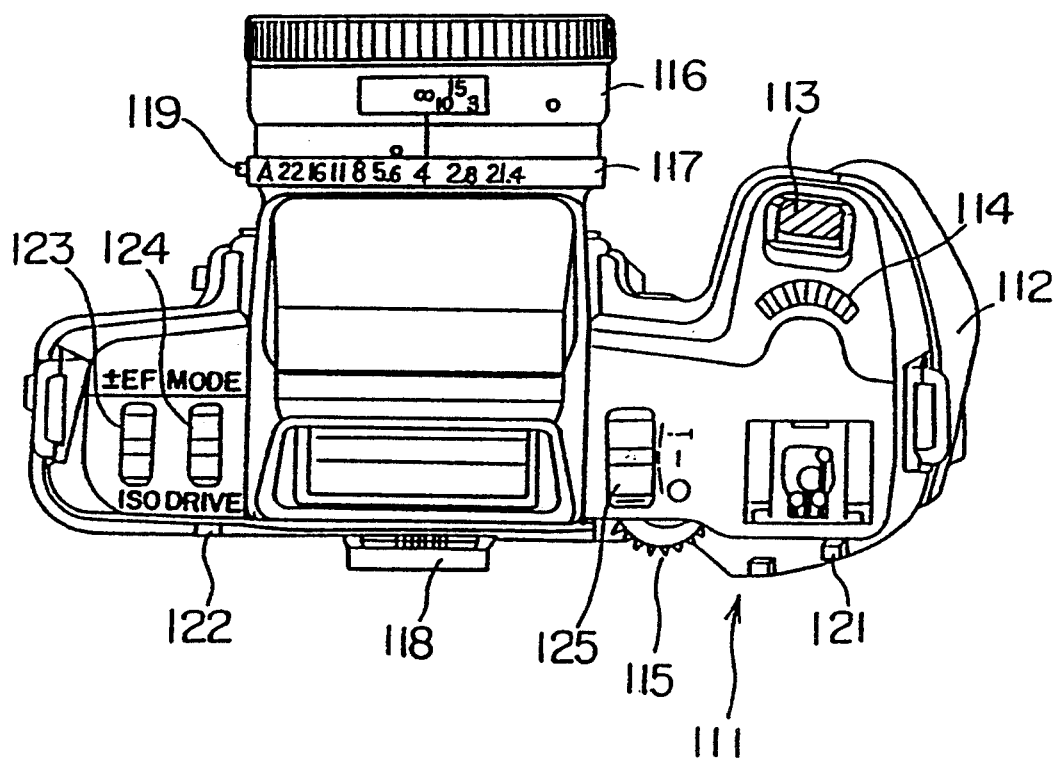
FIG. 47 is a plan view of a single lens reflex camera having an exposure control apparatus according to the present invention.

FIG. 47 shows a plan view of a single-lens reflex camera having an exposure control apparatus according to the present invention.

In FIG. 47, camera body 111 has a grip portion 112. A shutter button 113 is provided on a frontal portion of the top surface of a grip portion. A Tv electronic dial 114 and an Av electronic dial 115 are provided behind the shutter button 113 and on the upper portion of the back surface of the grip portion 112, respectively.

Both the Tv electronic dial 114 and the Av electronic dial 115 are in the form of rotary dials which are rotatable in the clockwise and counterclockwise directions. When the Tv electronic dial and the Av electronic dial are rotated, the shutter speed and the diaphragm value can be changed respectively. The adjustment of the diaphragm value by the Av electronic dial 115 is effected when a diaphragm ring 117, provided in a taking lens 116, is adjusted to an automatic position (AUTO) designated by "A". When the diaphragm ring 117 is adjusted to a position other than the AUTO position, i.e., to a position corresponding to a manual exposure control mode, the adjustment of the diaphragm value is effected by rotation of the diaphragm ring 117. The diaphragm ring 117 can be locked at the position AUTO so as not to rotate, and the lock can be released by depressing an unlocking button 119.

A clear button 121 is provided on the upper portion the back surface of the camera body 111 in the vicinity of the Av electronic dial 115. A hold button 122 is provided opposite the side of the clear button 121 with respect to the finder 118 on the back surface of the camera body 111.

A slidable exposure correction/ISO lever 123 and a slidable exposure mode/drive lever 124, both slidable from central, neutral position in opposite directions, are provided on the upper surface of the camera body 111 and on the left side of the finder 118. A main switch 125 is provided on the upper surface of the camera body 111 and on the right side of the finder 118 and may be slidably adjusted to occupy three different positions.

Figure 48:
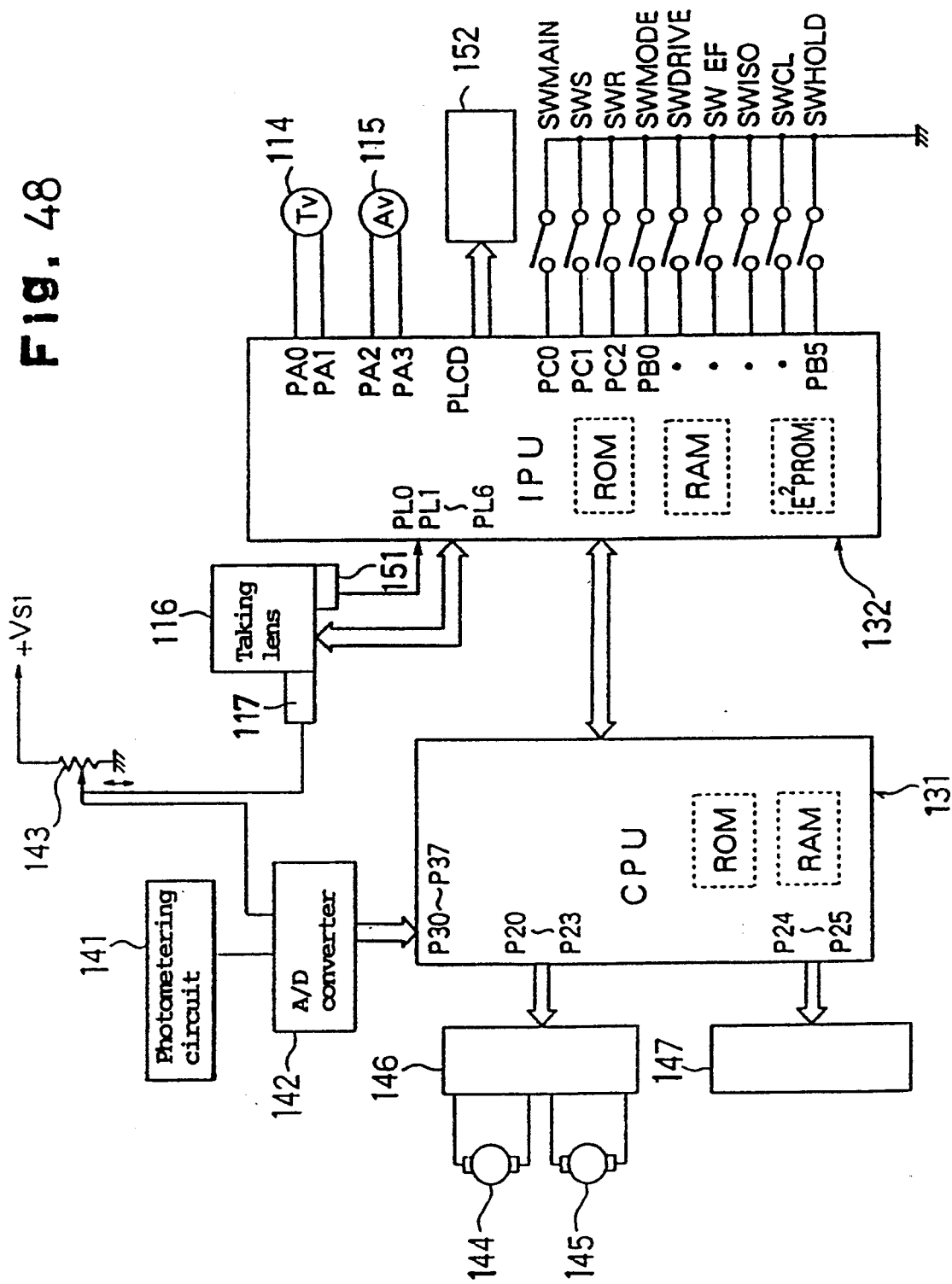
FIG. 48 is a block diagram of a control circuit of the exposure control apparatus shown in FIG. 47.

FIG. 48 shows a circuit diagram of a control unit camera system according to the present invention.

A photometering circuit 141 is connected to a CPU 131 through an A/D converter 142, to which a diaphragm volume 143 is connected. The diaphragm volume 143, associated with the diaphragm ring 117 (FIG. 47) of the taking lens 16, outputs a diaphragm voltage representing the diaphragm value and corresponding to the angular position of the diaphragm ring 117. The diaphragm voltage is converted to a digital value corresponding to the diaphragm value Av by the A/D converter 142. The digital value is outputted to CPU 131. CPU 131 actuates the A/D converter 142 at a predetermined time, reads the object brightness signal and The diaphragm value signal set in the taking lens 116, and converts the signals to corresponding APEX values.

A winding motor 144 winds and rewinds the film, and a mirror motor 145 moves a mirror up and down. The operations the motors 144 and 145 are controlled by CPU 131 through a motor driving circuit 146.

IPU 132 is connected to a CPU or RAM of the taking lens 116. IPU 132 communicates with the taking lens 116 and reads lens data, such as, an open F number Fmin, a maximum F number Fmax, a focal length f, etc. The taking lens 116 has a lens-auto/lens-manual selection switch 151 which is effected to switch a manual diaphragm mode to an automatic diaphragm mode and vice versa, in association with the diaphragm ring 117. The lens-auto/lens-manual selection switch 151 is connected to IPU 132. IPU 132 determines the existence of the manual diaphragm mode or the automatic diaphragm mode in accordance with the signal inputted from the lens-auto/lens-manual selection switch 151. The "lens-auto mode" referred to means an automatic diaphragm mode in which the diaphragm value is set on the camera body side, i.e., the stop-down of the diaphragm value continues until the diaphragm value becomes a predetermined value set in the camera body. The "lens-manual mode" referred to means a manual diaphragm mode in which the diaphragm value is manually set by the diaphragm ring 117 on the taking lens 116.

Input ports of IPU 132 are connected to a main switch SWMAIN, a photometer switch SWS, a release switch SWR, an exposure mode switch SWMODE, a drive switch SWDRIVE, an exposure correcting switch SWEF, an ISO sensitivity setting switch SWISO, a clear switch SWCL and a hold switch SWHOLD, respectively. The function of IPU 132 and the connection thereof to these switches are fundamentally the same as those in the aforementioned embodiments.

The main switch SWMAIN is associated with main switch 125. The photometer switch SWS and the release switch SWR are associated with the shutter button 113. The photometer switch SWS is turned ON when the shutter button 113 is depressed half-way. The release switch SWR is turned ON when the shutter button 15 is fully depressed. The exposure mode switch SWMODE and the drive switch SWDRIVE are associated with the exposure mode/drive lever 124. The exposure correcting switch SWEF and the ISO sensitivity setting switch SWISO are associated with the exposure-correction/ISO lever 123. The clear switch SWCL and the hold switch SWHOLD, which are both normally open, are associated with the clear button 121 and the hold button 122, respectively.

The Tv electronic dial 114 and the Av electronic 115 are connected to IPU 132. Each of the Tv and Av electronic dials 114 and 115 has a click-stop rotation mechanism per se known. For example, a pair of input ports PA0 and PA1 are in a floating state at a click-stop position, and when the Tv electronic dial 114 is rotated in a clockwise or counterclockwise direction, the level of one of the input ports first drops to "L", and then, the level the other drops to level "L". Thereafter, the level of the input port which has dropped to level "L" prior to the other is returned to the floating state before the other. Since the order of change in the level of the input ports PA0 and PA1 depends on the rotation of the Tv electronic dial, IPU 132 can discriminate the direction of tune rotation based on the order of change. The same is true for the Av electronic dial 115.

IPU 132 is connected to an LCD panel 152 which is controlled by IPU 132 to indicate various photographic information, such as the exposure modes, the shutter speed Tv, the diaphragm value Av, the number of taken frames of a film, etc.

Figure 49:
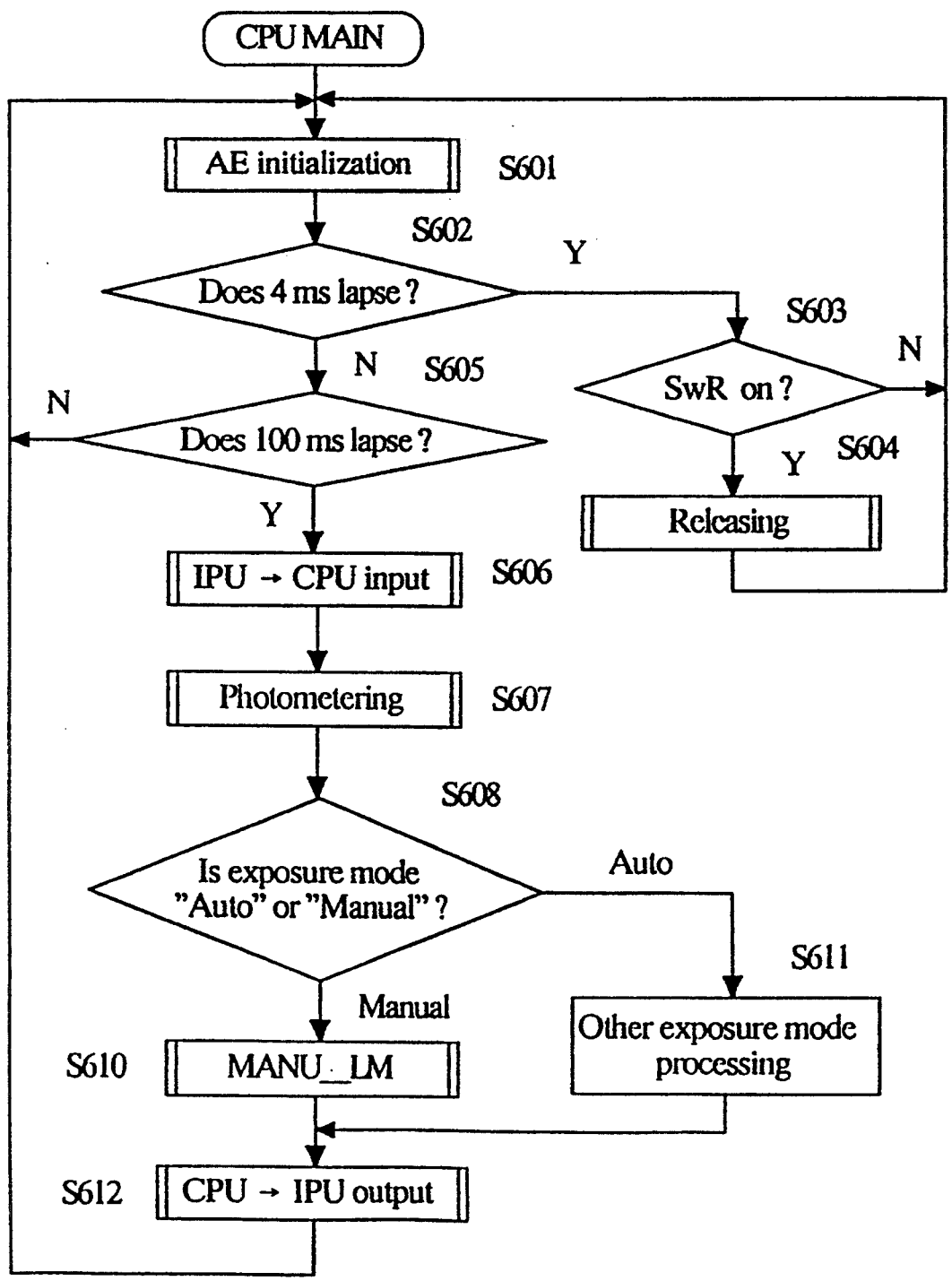
FIG. 49 is a flow chart of a main operation of a CPU of a control circuit shown in FIG. 48; and, FIGS. 50 and 51 are flow charts of a manual exposure control of the control circuit shown in FIG. 48.

The operation of the embodiment shown in FIG. 47 is as follows (FIGS. 49 through 51):

FIG. 49 shows a flow chart of the main program.

At step S601, the initialization on the automatic exposure (AE) is effected. Namely, data necessary for the calculation of the exposure control is read out from an E²PROM of IPU 132. Control proceeds to step S603 from step S602 to check whether the release switch SWR has been turned ON during a time interval of 4 ms beginning at a predetermined time. If the release switch SWR has been turned ON, the releasing is carried out at step S604. If the release switch SWR has not been turned ON at step S603, it is determined or if 4 ms has not elapsed at step S602, whether there is a lapse of time of 100 ms from the predetermined time, corresponding to 25 4 ms cycles, at step S605. If there is no lapse of 100 ms, control is returned to step S602. Conversely, if 100 ms has elapsed, control proceeds to step S606.

At step S606, the necessary data is sent to CPU 131 from IPU 132. The data includes data which, for example, represents the type of exposure modes, the exposure control modes of the taking lens 116 (lens-auto mode or lens-manual mode), etc.

At step S607, photometering is effected to calculate the exposure value (Ev) detected in the photometering operation, based on the brightness of an object to be taken. Whether the exposure control mode of the taking lens 116 is the lens-auto mode or the lens-manual mode is checked at step S608. If the mode is the lens-manual mode, the manual exposure control is effected at step S610, and if the mode is the lens-auto mode, the automatic exposure control is effected at step S611. At step S612, the indicating data for the LCD panel 152 is inputted from CPU 131 to IPU 132.

Figure 50:
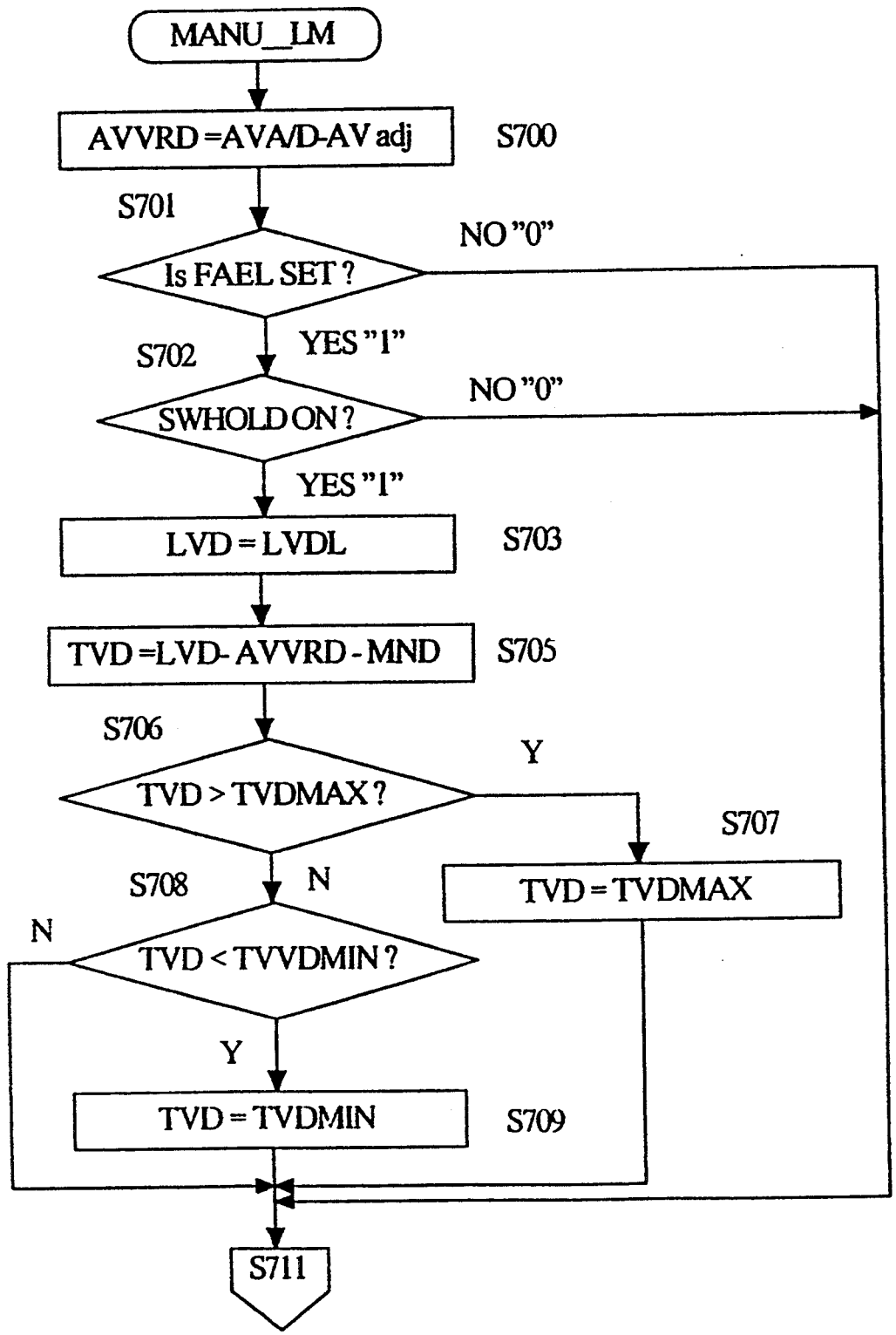
Figure 51:
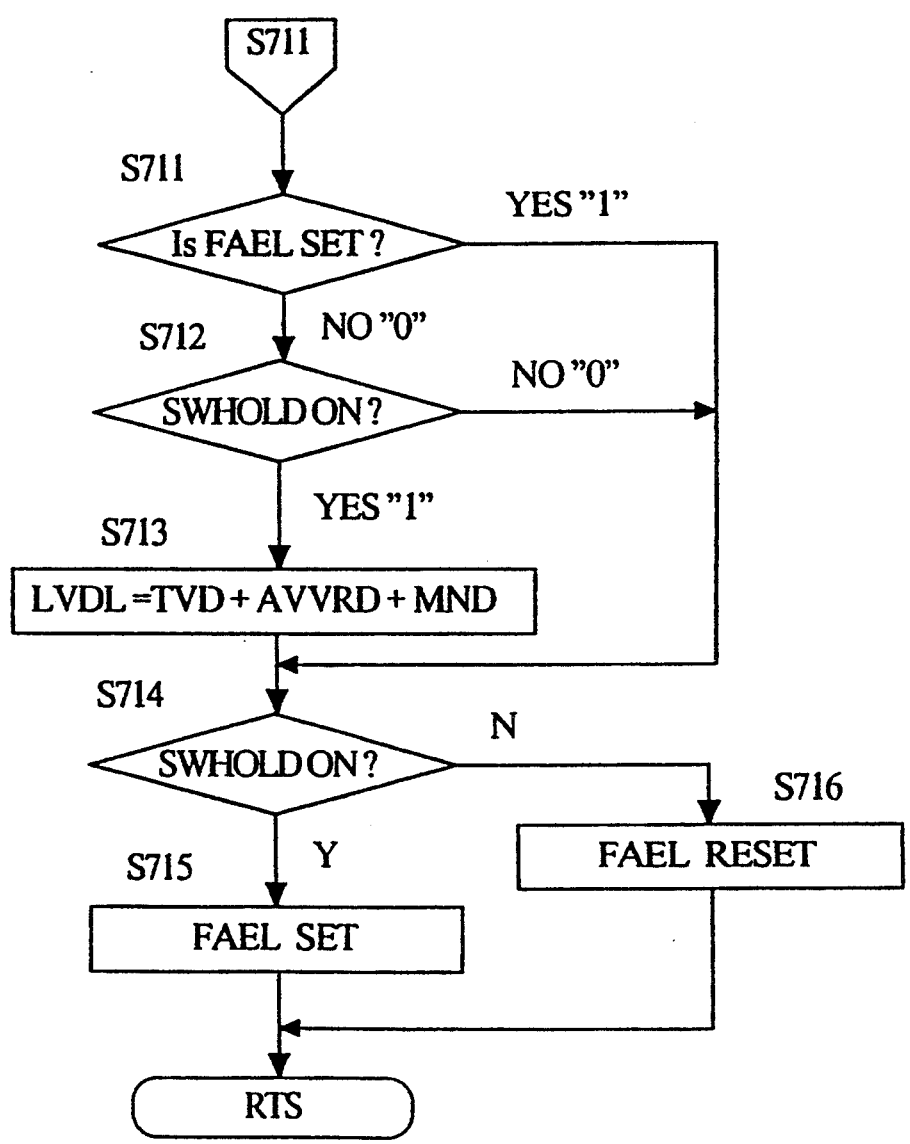

FIGS. 50 and 51 show a program of the manual exposure control which is carried out at step S610, i.e., the lens-manual diaphragm priority exposure mode in the diaphragm value is set by the diaphragm ring 117 of the taking lens 116.

In the manual exposure control, as will be discussed below, the Ev value is fixed when the hold button 122 is depressed. Thereafter, when the diaphragm value is varied by the diaphragm ring 117, the shutter speed is varied in accordance with the fixed Ev value.

Figure 39H:
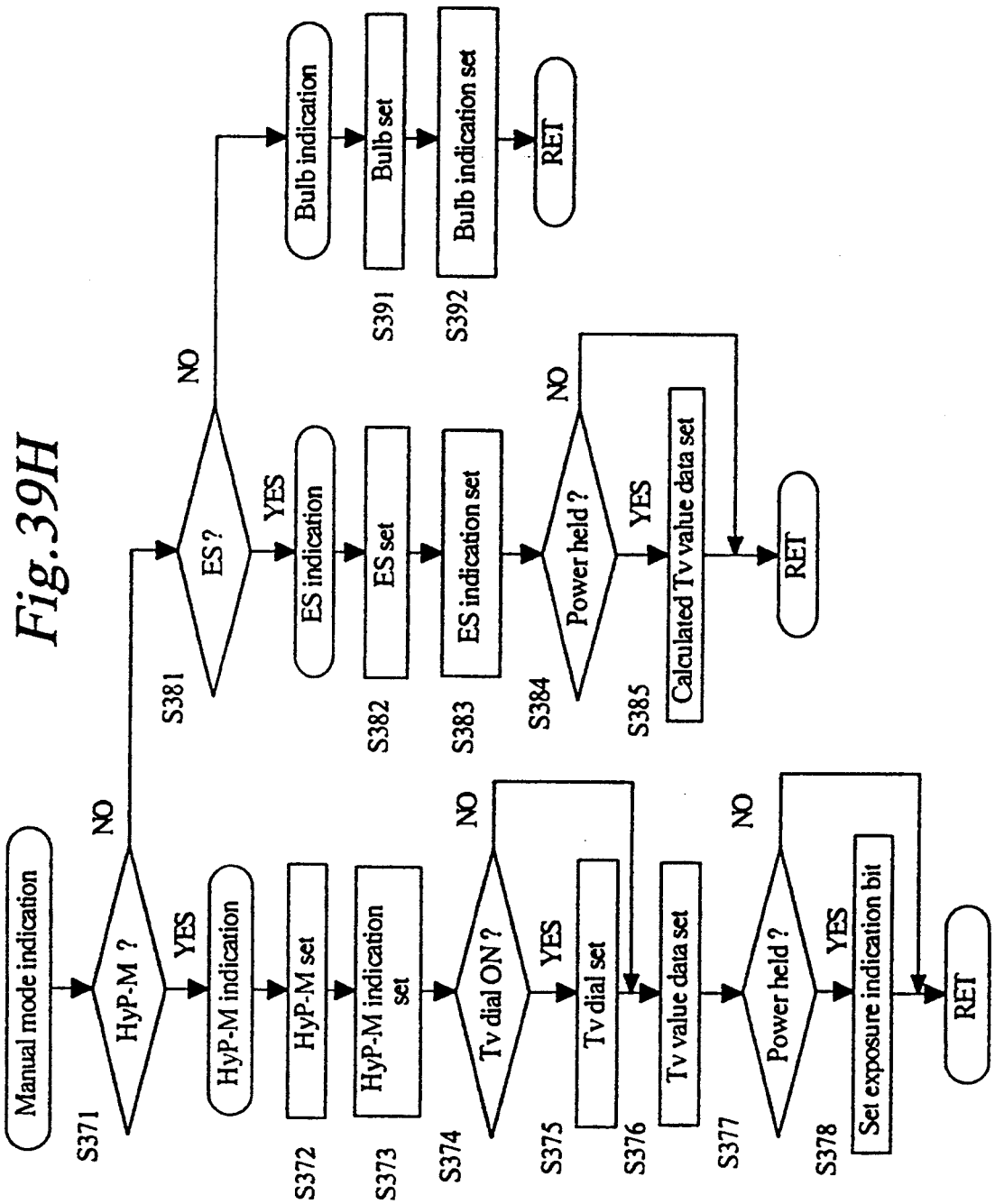

Before a picture is taken, as the hold button 122 is not depressed, the Ev value is not fixed. Consequently, flag FAEL is not set at "1", control proceeds to steps S700, S701, S711, and S712 in this order. At step S700, the calculating diaphragm value AVVRD is first calculated, based on the diaphragm value AVA/D set by the diaphragm ring 117 and the inherent adjusting value Avadj of the camera body 111. Whether the hold button 122 has been depressed is checked at step S712. If the hold button has not been depressed, control proceeds to steps S714 and S716 before ending. Although the setting operation of the shutter speed Tv is not shown in the program of FIGS. 50 and 51, the operations similar to those of steps S374 through S376 in FIG. 39H are performed to set the shutter speed Tv.

Here, it is assumed that the photographer actuates the Tv electronic dial 113 and the diaphragm ring 117 to set the shutter speed and the diaphragm value, and then depresses the hold button 122 to fix the Ev value determined by the shutter speed and the diaphragm value. Thereafter, when control enters the sub-routine shown in FIGS. 50 and 51 for the first time, since flag FAEL is not set at "1", control proceeds to steps S700, S701, S711, S712 and S713. At step S713, the locked Ev value LVDL is obtained by adding the calculating shutter speed TVD, the calculating diaphragm value AVVRD and the correction value MND. The correction value MND depends on the taking lens 116. Thereafter, since the hold button 122 is turned ON at step S714, control proceeds to step S715 to set the flag FAEL.

When the program is performed thereafter, flag FAEL is set. Accordingly, the control proceeds to steps S700, S701, S702 and S703. At step S703, the locked Ev value LVDL is substituted for the calculating Ev value LVD. At step S705, the calculating diaphragm value AVVRD and the correction value MND are subtracted from the calculating Ev value LVD to obtain the calculating shutter speed TVD.

Thereafter, at step S706, if the calculating shutter speed TVD is greater than the calculating maximum shutter speed TVDMAX, the calculating shutter speed TVD is set equal to the calculating maximum shutter speed TVDMAX at step S707. If the calculating shutter speed TVD is less than the calculating minimum shutter speed TVDMIN at step S708, the calculating shutter speed TVD is set equal to the calculating minimum shutter speed TVDMIN at step S709.

Thus, the calculating shutter speed TVD is obtained at step S707 or S709, so that CPU 131 controls the shutter in accordance with the shutter speed TVD.

The shutter speed TVD is converted to the communicating shutter speed TVT to be sent to IPU 132 and is indicated in the LCD panel 152.

As can be seen from the foregoing, in the embodiment of the invention shown in FIGS. 48 through 51, when the hold button 122 is depressed after the shutter speed and the diaphragm value are manually set, the exposure value determined by the shutter speed and the diaphragm value is stored. Thereafter, if the diaphragm value is varied by the rotation of the diaphragm ring 117, the shutter speed is also varied in accordance with the exposure value. Therefore, the photographer can take a picture at a desired exposure value without manually adjusting the shutter speed every time the diaphragm ring 117 is rotated.

Furthermore, if the hold button 122 is turned OFF, control proceeds to steps S711, S714 and S716 from step S702 to reset flag FAEL, so that the shutter speed Tv and the diaphragm value Av can be independently set.

The hold button 122 is used to fix the exposure value not only in the manual exposure control mode but also in the automatic exposure control mode.

As can be understood from the above discussion, according to the present invention, it is not necessary for the photographer to adjust the shutter speed every time The diaphragm ring is rotated in the manual exposure control mode, thus resulting in a simple photographic operation.

TABLE 1

| command | name of command | content | number of bytes |
|---|---|---|---|
| 0 | IPU check | communication check with IPC | 1 |
| 1 | CPU → IPU transfer 1 | output all data | 10 |
| 2 | CPU → IPU transfer 2 | output data for indication | 5 |
| 3 | IPU → CPU transfer 1 | input all data | 20 |
| 4 | IPU → CPU transfer 2 | input lens data | 10 |
| 5 | IPU → CPU transfer 3 | input switch data | 1 |
| 6 | IPU → CPU transfer 4 | input exposure mode | 1 |

TABLE 2

| Time (1/sec) | Tv | TvT | TvD |
|---|---|---|---|
| 8000 | 13 | 29 | 18 4/8 |
| 6000 | 12.5 | 28.5 | 18 |
| 4000 | 12 | 28 | 17 4/8 |
| 3000 | 11.5 | 27.5 | 17 |
| 2000 | 11 | 27 | 16 4/8 |
| 1500 | 10.5 | 26.5 | 16 |
| 1000 | 10 | 26 | 15 4/8 |
| 750 | 9.5 | 25.5 | 15 |
| 500 | 9 | 25 | 14 4/8 |
| 350 | 8.5 | 24.5 | 14 |
| 250 | 8 | 24 | 13 4/8 |
| 180 | 7.5 | 23.5 | 13 |
| 125 | 7 | 23 | 12 4/8 |
| 90 | 6.5 | 22.5 | 12 |
| 60 | 6 | 22 | 11 4/8 |

TABLE 2-continued

| Time (1/sec) | Tv | TvT | TvD |
|---|---|---|---|
| 45 | 5.5 | 21.5 | 11 |
| 30 | 5 | 21 | 10 4/8 |
| 20 | 4.5 | 20.5 | 10 |
| 15 | 4 | 20 | 9 4/8 |
| 10 | 3.5 | 19.5 | 9 |
| 8 | 3 | 19 | 8 4/8 |
| 6 | 2.5 | 18.5 | 8 |
| 4 | 2 | 18 | 7 4/8 |
| 3 | 1.5 | 17.5 | 7 |
| 2 | 1 | 17 | 6 4/8 |
| 0"7 | 0.5 | 16.5 | 6 |
| 1" | 0 | 16 | 5 4/8 |
| 1"5 | −0.5 | 15.5 | 5 |
| 2" | −1 | 15 | 4 4/8 |
| 3" | −1.5 | 14.5 | 4 |
| 4" | −2 | 14 | 3 4/8 |
| 6" | −2.5 | 13.5 | 3 |
| 8" | −3 | 13 | 2 4/8 |
| 10" | −3.5 | 12.5 | 2 |
| 15" | −4 | 12 | 1 4/8 |
| 20" | −4.5 | 11.5 | 1 |
| 30" | −5 | 11 | 0 4/8 |

TABLE 3

| FNO. | Av | AvT | AvD | AvD augmentation | 0.5EV indication classification |
|---|---|---|---|---|---|
| 45 | 11 | 11 | 15 4/8 | . | |
| 38 | 10.5 | 10.5 | 15 | . | ↓ F11 |
| 32 | 10 | 10 | 14 4/8 | . | ↓ |
| 27 | 9.5 | 9.5 | 14 | 11 3/8 | ↓ |
| 22 | 9 | 9 | 13 4/8 | 11 2/8 | ↓ |
| 19 | 8.5 | 8.5 | 13 | 11 1/8 | ↑ |
| 16 | 8 | 8 | 12 4/8 | 11 0/8 | ↑ F9.5 |
| 13 | 7.5 | 7.5 | 12 | 10 7/8 | ↓ |
| 11 | 7 | 7 | 11 4/8 | 10 6/8 | ↓ |
| 9.5 | 6.5 | 6.5 | 11 | 10 5/8 | ↑ |
| 8 | 6 | 6 | 10 4/8 | 10 4/8 | ↑ F8 |
| 6.7 | 5.5 | 5.5 | 10 | 10 3/8 | ↓ |
| 5.6 | 5 | 5 | 9 4/8 | 10 2/8 | ↓ |
| 4.5 | 4.5 | 4.5 | 9 | 10 1/8 | ↑ |
| 4 | 4 | 4 | 8 4/8 | 10 0/8 | ↑ F6.7 |
| 3.5 | 3.5 | 3.5 | 8 | 9 7/8 | ↓ |
| 2.8 | 3 | 3 | 7 4/8 | 9 6/8 | ↓ |
| 2.5 | 2.5 | 2.5 | 7 | 9 5/8 | ↑ |
| 2 | 2 | 2 | 6 4/8 | 9 4/8 | ↑ F5.6 |
| 1.7 | 1.5 | 1.5 | 6 | 9 3/8 | ↑ |
| 1.4 | 1 | 1 | 5 4/8 | | |
| 1.2 | 0.5 | 0.5 | 5 | | |
| 1 | 0 | 0 | 4 4/8 | | |

TABLE 4

| exposure mode | IPU mode No. lens 'A' (3 bit) | IPU mode No. lens 'B' (2 bit) | CPU mode No. (4 bit) |
|---|---|---|---|
| Program | 7 | | 15 |
| Hyper Program | 6 | | 14 |
| Program LIMIT | 5 | | 13 |
| EE LA | 4 | | 12 |
| ES LA | 3 | | 11 |
| (Hyper) Manual LA | 2 | | 10 |
| Bulb LA | 1 | | 9 |
| Hyper EE | — | | 8 |
| Hyper ES | — | | 7 |
| ... | | | 6 |
| ... | | | 5 |
| ... | | | 4 |
| ... | | | 3 |
| ES LM | | 2 | 2 |
| (Hyper) Manual LM | | 1 | 1 |
| Bulb LM | | 0 | 0 |

We claim:

1. An exposure control apparatus of a camera, comprising:
   means for setting a manual setting mode in which a diaphragm value and a shutter speed are manually settable, said diaphragm value and said shutter speed being settable independently of a luminance of an object to be photographed with said camera;
   means for locking an exposure value determined in accordance with said diaphragm value and said shutter speed value set in said manual setting mode; and
   means for varying one of said diaphragm value and said shutter speed based on said locked exposure value, when the other of said diaphragm value and said shutter speed is varied in said manual setting mode so as to maintain constant said locked exposure value.

2. The exposure control apparatus of claim 1, wherein said exposure value locking means comprises a lock switch which is turned ON to lock said exposure value.

3. The exposure control apparatus of claim 2, wherein said exposure value locking means unlocks said exposure value, which has been locked by said exposure value locking means, when said lock switch is turned OFF.

4. The exposure control apparatus of claim 3, wherein said exposure value locking means locks and unlocks said exposure value every time said lock switch is turned ON and OFF, respectively.

5. The exposure control apparatus of claim 1, wherein said exposure value locking means comprises a lock switch for locking and holding said exposure value when said lock switch is turned ON.

6. The exposure control apparatus claim 1, wherein said exposure value locking means comprises a lock switch for locking and holding said exposure value when said lock switch is actuated by an odd number of operations.

7. The exposure control apparatus of claim 1, wherein said diaphragm value and shutter speed can be increased and decreased as APEX values of a predetermined step.

8. The exposure control apparatus of claim 7, wherein, when one of said shutter speed or said diaphragm value is increased or decreased by a predetermined value, said varying means decreases or increases the other of said diaphragm value or said shutter speed by an equal value when said exposure value is locked by said exposure value locking means.

9. The exposure control apparatus of claim 1, wherein said camera comprises a camera body, and a taking lens that is detachably attached to said camera body.

10. The exposure control apparatus of claim 9, wherein said means for setting a manual setting mode comprises means, provided in said camera body, for manually setting said shutter speed and means, provided in said taking lens, for manually setting said diaphragm value.

11. The exposure control apparatus of claim 10, wherein said camera body further comprises means for manually setting said diaphragm value.

12. The exposure control apparatus of claim 11, wherein said means for manually setting said diaphragm value provided in said taking lens comprises a diaphragm ring rotatable between a first position, in which said diaphragm value is set by said means for manually setting said diaphragm value provided in said camera body, and a second position, in which said diaphragm value is set by said means for manually setting said diaphragm value provided in said taking lens.

13. The exposure control apparatus of claim 11, wherein, when said exposure value is locked by said exposure value locking means and when said diaphragm value is varied by said means for manually setting said diaphragm value provided in said taking lens, said varying means varies said manually set shutter speed while maintaining said locked exposure value.

14. An exposure control apparatus of a camera, comprising:
   means for manually setting a diaphragm value and a shutter speed in a manual setting mode of said camera, said diaphragm value and shutter speed being settable independently of a luminance of an object to be photographed with said camera;
   exposure value storing means for storing a product of APEX values of said manually set shutter speed and said manually set diaphragm value; and
   means for varying one of said diaphragm value and shutter speed when the other of said diaphragm value and shutter speed is varied by said manual setting means when the product of said APEX values is stored in said exposure value storing means, so as to make a product of said varied diaphragm value and shutter speed equal to said APEX values stored in said exposure value storing means.

15. An exposure control apparatus of a camera, comprising:
   first means for manually setting a shutter speed in a manual setting mode;
   second means for manually setting a diaphragm value in a manual setting mode, said diaphragm value and shutter speed being independently settable with respect to a luminance of an object to be photographed with said camera;
   exposure value locking means for fixing an exposure value to a constant value in accordance with said manually set shutter speed and said manually set diaphragm value; and
   shutter speed varying means for varying, when said exposure value is fixed by said exposure value locking means, said shutter speed in accordance with said fixed exposure value when a diaphragm ring is rotated to vary said diaphragm value so as to maintain said exposure value to said constant value.

16. The exposure control apparatus of claim 15, wherein when one of said shutter speed or said diaphragm value is varied by a predetermined value, the other of said shutter speed or diaphragm value is varied by an equal value.

17. The exposure control apparatus of claim 15, wherein said exposure value locking means locks and unlocks said exposure value every time an associated lock switch is turned ON and OFF, respectively.

18. An exposure control apparatus for a camera, comprising:
   means for manually inputting a shutter speed and a diaphragm value in a manual setting mode, said shutter speed and said diaphragm value being being independently settable with respect to a luminance of an object to be photographed;
   means for locking an exposure value calculated in accordance with said manually inputted shutter speed and manually inputted diaphragm value; and
   means for automatically varying one of said shutter speed and diaphragm value after said exposure value is set by said locking means when the other of said shutter speed and diaphragm value is manually changed so as to maintain constant said locked exposure value.

19. The exposure control apparatus of claim 18, wherein said manual inputting means for inputting said shutter speed is provided in a camera body of said camera, and said manual inputting means for inputting said diaphragm value is provided in a lens of said camera.

20. The exposure control apparatus of claim 18, wherein when one of said shutter speed or said diaphragm value is varied by a predetermined value, said locking means varies the other of said shutter speed or diaphragm value by an equal value.

* * * * *

UNITED STATES PATENT AND TRADEMARK OFFICE
CERTIFICATE OF CORRECTION

PATENT NO. : 5,382,997
DATED : January 17, 1995
INVENTOR(S) : Osamu SATO et al.

It is certified that error appears in the above-indentified patent and that said Letters Patent is hereby corrected as shown below:

At column 46, line 20 (claim 18, line 5), change "being being" to ---being---.

Signed and Sealed this

Fifteenth Day of August, 1995

Attest:

BRUCE LEHMAN

*Attesting Officer*     *Commissioner of Patents and Trademarks*